US011108596B2

(12) United States Patent
Hadaschik et al.

(10) Patent No.: US 11,108,596 B2
(45) Date of Patent: Aug. 31, 2021

(54) CHANNEL ESTIMATION OF FREQUENCY SUB BANDS

(71) Applicant: FRAUNHOFER-GESELLSCHAFT ZUR FOERDERUNG DER ANGEWANDTEN FORSCHUNG E.V., Munich (DE)

(72) Inventors: Niels Hadaschik, Erlangen (DE); Benjamin Sackenreuter, Erlangen (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/394,799

(22) Filed: Apr. 25, 2019

(65) Prior Publication Data

US 2019/0253282 A1    Aug. 15, 2019

Related U.S. Application Data

(63) Continuation of application No. PCT/EP2017/077649, filed on Oct. 27, 2017.

(30) Foreign Application Priority Data

Oct. 27, 2016 (EP) .................................... 16195990

(51) Int. Cl.
*H04L 25/02* (2006.01)
*H04W 64/00* (2009.01)
*H04L 5/00* (2006.01)

(52) U.S. Cl.
CPC ........ *H04L 25/0204* (2013.01); *H04L 25/022* (2013.01); *H04W 64/003* (2013.01); *H04L 5/0007* (2013.01)

(58) Field of Classification Search
CPC ..... H04L 47/10; H04L 43/50; H04L 12/2697; H04L 43/0852; H04L 43/00
(Continued)

(56) References Cited

U.S. PATENT DOCUMENTS

| 5,410,538 A | 4/1995 | Roche et al. |
| 5,583,517 A | 12/1996 | Yokev et al. |

(Continued)

FOREIGN PATENT DOCUMENTS

| CN | 1498454 A | 5/2004 |
| CN | 101170346 A | 4/2008 |

(Continued)

OTHER PUBLICATIONS

Bluetooth, S.I.G. "Bluetooth core specification v5.0," Bluetooth Special Interest Group: Kirkland, WA, USA (2016).

(Continued)

*Primary Examiner* — Pankaj Kumar
*Assistant Examiner* — Sanjay K Dewan
(74) *Attorney, Agent, or Firm* — Perry + Currier

(57) ABSTRACT

The invention concerns a method for receiving and a receiver configured to receive a radio signal carrying information, the radio signal including an overall frequency band having a first frequency sub band and a second frequency sub band. The receiver is further configured to receive during a first time period a first portion of the information carried by the radio signal in the first frequency sub band, and to receive during a second time period a second portion of the information carried by the radio signal in the second frequency sub band. The receiver is further configured to perform channel estimation of the first frequency sub band in order to determine a first phase and to perform channel estimation of the second frequency sub band in order to determine a second phase. The receiver is further configured to determine an overall phase basis of the radio signal using the first and second phases.

44 Claims, 25 Drawing Sheets

(58) Field of Classification Search
USPC .......................................................... 370/252
See application file for complete search history.

(56) References Cited

U.S. PATENT DOCUMENTS

| | | | |
|---|---|---|---|
| 5,596,330 | A | 1/1997 | Yokev et al. |
| 6,731,908 | B2 | 5/2004 | Berliner et al. |
| 6,898,415 | B2 | 5/2005 | Berliner et al. |
| 7,068,704 | B1* | 6/2006 | Orr .......................... G01S 5/02 375/139 |
| 7,405,696 | B2* | 7/2008 | Kennedy, Jr. .......... H04B 1/713 342/174 |
| 7,463,576 | B2* | 12/2008 | Krishnan .............. H04L 25/023 370/203 |
| 7,492,828 | B2 | 2/2009 | Keerthi |
| 7,940,740 | B2* | 5/2011 | Krishnamurthy ..... H04L 5/0007 370/235 |
| 8,023,595 | B2 | 9/2011 | Xu et al. |
| 8,116,817 | B2 | 2/2012 | Noll et al. |
| 8,125,388 | B2 | 2/2012 | Kennedy, Jr. et al. |
| 8,712,475 | B2 | 4/2014 | Noll et al. |
| 2002/0172269 | A1 | 11/2002 | Xu |
| 2003/0012308 | A1* | 1/2003 | Sampath ............. H04L 25/0232 375/340 |
| 2006/0203710 | A1* | 9/2006 | Mukkavilli ........... H04L 25/025 370/208 |
| 2007/0147479 | A1* | 6/2007 | Yamasuge ........... H04L 27/2657 375/131 |
| 2007/0268976 | A1* | 11/2007 | Brink ................... H04B 1/7183 375/260 |
| 2008/0095036 | A1* | 4/2008 | Gorokhov ............. H04W 52/24 370/203 |
| 2008/0101214 | A1 | 5/2008 | Jitsukawa et al. |
| 2009/0003493 | A1 | 1/2009 | Gunturi et al. |
| 2010/0009644 | A1 | 1/2010 | Izumi et al. |
| 2010/0091641 | A1* | 4/2010 | Gaal ....................... H04B 7/068 370/208 |
| 2011/0085453 | A1* | 4/2011 | Wu ........................ H04L 5/0048 370/252 |
| 2014/0050111 | A1* | 2/2014 | Nagata ................ H04L 25/0204 370/252 |
| 2014/0184446 | A1 | 7/2014 | Park et al. |
| 2016/0142158 | A1* | 5/2016 | Li ........................ H04L 27/2657 455/63.1 |
| 2016/0142227 | A1* | 5/2016 | Li ........................ H04L 25/0226 375/295 |
| 2016/0365990 | A1* | 12/2016 | Yum ..................... H04B 17/345 |
| 2017/0214558 | A1 | 7/2017 | Nazarathy et al. |
| 2017/0245313 | A1 | 8/2017 | Kim et al. |
| 2018/0375545 | A1* | 12/2018 | Fan ........................ H04B 7/024 |
| 2019/0229874 | A1* | 7/2019 | Lee ....................... H04W 24/08 |

FOREIGN PATENT DOCUMENTS

| | | | |
|---|---|---|---|
| CN | 102664859 | A | 9/2012 |
| CN | 103733516 | A | 4/2014 |
| CN | 105282081 | A | 1/2016 |
| DE | 2 487 503 | B1 * | 11/2011 ............... G01S 5/02 |
| EP | 2467503 | B1 | 10/2013 |
| JP | 2012191377 | A | 10/2012 |
| WO | WO-2015196629 | A1 | 12/2015 |

OTHER PUBLICATIONS

Capon, Jack. "High-resolution frequency-wavenumber spectrum analysis." Proceedings of the IEEE 57.8 (1969): 1408-1418.
Chen, Xi, and Daji Qiao, "HaND: Fast handoff with null dwell time for IEEE 802.11 networks," 2010 Proceedings IEEE INFOCOM. IEEE, 2010.
Farhang-Boroujeny, Behrouz. "OFDM versus filter bank multicarrier." IEEE signal processing magazine 28.3 (2011): 92-112.
Federal Communications Commission. "FCC 11-107, Notice of Proposed Rulemaking", Minutes & Report, Jul. 2011.
Fettweis, Gerhard P., Marco Krondorf, and Steffen Bittner, "GFDM-Generalized Frequency Division Multiplexing," VTC Spring. No. 69. Apr. 2009.
Glisic, Savo. et al. "Advanced frequency hopping modulation for spread spectrum WLAN." IEEE Journal on Selected Areas in Communications 18.1 (2000): 16-29.
Götz, Aiexander Gerald, Coherent Time Difference of Arrival Estimation Techniques for Frequeney Hopping GSM Mobile Radio Signals. Walter de Gruyter, 2013. [Abstract].
Hadaschik, Niels, et al. "Direct positioning with multiple antenna arrays." 2015 International Conference on Indoor Positioning and Indoor Navigation (IPIN). IEEE, 2015.
Krim, Hamid, and Mats Vlberg, "Two Decades of Ilrray Signal Processing Research." IEEE signal processing magazine (1996).
Myung, Hyung G., Junsung Lim, and David J. Goodman. "Single carrier FDMA for uplink wireless transmission." IEEE Vehicular Technology Magazine 1.3 (2006): 30-38.
Roy, Richard, and Thomas Kailath. "ESPRIT-estimation of signal parameters via rotational invariance techniques." IEEE Transactions on acoustics, speech, and signal processing 37.7 (1989): 984-995.
Schmidt, Ralph. "Multiple emitter location and signal parameter estimation." IEEE transactions on antennas and propagation 34.3 (1986): 276-280.
Speth, Michael, et al. "Optimum receiver design for OFDM-based broadband transmission. II. A case study," IEEE Transactions on communications 49.4 (2001): 571-578.
Scholand, Tobias, et al.. "Physical layer performance of a novel fast frequency hopping OFDM concept" Proceedings of the IST Mobile Summit 2005 (2005): 19-23.
Siohan, Pierre, Cyrille Siclet, and Nicolas Lacaille. "Analysis and design of OFDM/OQAM systems based on filterbank theory." IEEE transactions on signal processing 50.5 (2002): 1170-1183.
Stadius, Kari, et al. "Multitone fast frequency-hopping synthesizer for UWB radio," IEEE transactions on microwave theory and techniques 55.8 (2007): 1633-1641.
Timor, Uzi, "Multitone Frequency-Hopped MFSK System for Mobile Radio," Bell System Technical Journal 61.10 (1982): 3007-3017.
Vanderveen, Michaela C., Constantinos B. Papadias, and Arogyaswami Paulraj, "Joint angle and delay estimation (JADE) for multipath signals arriving at an antenna array." IEEE Communications letters 1.1 (1997): 12-14.
Van Der Veen, A-J., Michaela C. Vanderveen, and A Paulraj. "SI-JADE: an algorithm for joint angle and deiay estimation using shift-invariance properties." First IEEE Signal Processing Workshop on Signal Processing Advances in Wireles Communications. IEEE, 1997.
Weiss, Anthony J., and Alon Amar."Direct position determination of muitiple radio signals." EURASIP Journal on Applied Signal Processing 2005 (2005): 37-49.
WiMEDiA Alliance "Multiband OFDM Physicai Layer Spedfication", Version 1.5, Aug. 2009.
Yilmazer, Nuri, Tapan K Sarkar, and Magdalena Salazar-Palma "DOA Estimation using Matrix Pencil and ESPRIT methods using single and multiple snapshots." 2010 URSI International Symposium on Electromagnetic Theory. IEEE, (pp. 215-218). 2010.
Zhou, Zhou, "Research on Channel Estimation Based on Pilot Sequence in OFDM System" Chinese Excellent Master's Thesis Full-Text Databases (Electronic Journal) Information Science and Technology Series, Nov. 30, 2013 with English abstract on pp. 5-7.
Mary, Philippe, et al. "Reduced complexity MUD-MLSE receiver for partially-overlapping WLAN-like interference." 2007 IEEE 65th Vehicular Technology Conference-VTC2007-Spring. IEEE, 2007.

* cited by examiner

CHANNEL ESTIMATION OF FREQUENCY SUB BANDS

CROSS-REFERENCE TO RELATED APPLICATIONS

This application is a continuation of copending International Application No. PCT/EP2017/077649 filed Oct. 27, 2017, which is incorporated herein by reference in its entirety, and additionally claims priority from European Application No. EP 16195990.3, filed Oct. 27, 2016, which is also incorporated herein by reference in its entirety.

The present invention concerns the field of wireless communication networks or systems, in particular a method for obtaining a reconstructed phase coherency of a broadband signal being transmitted in one or more frequency hopping channels, which may be used, for example, for a localization of user equipment, like mobile terminals, in such a wireless communication network.

BACKGROUND OF THE INVENTION

FIG. 16 is a schematic representation of an example of a network infrastructure, such as a wireless communication network or wireless communication system, including a plurality of base stations $eNB_1$ to $eNB_5$, each serving a specific area surrounding the base station schematically represented by the respective cells $1600_1$ to $1600_5$. The base stations are provided to serve users within a cell. A user may be a stationary device or a mobile device. Further, the wireless communication system may be accessed by IoT devices which connect to a base station or to a user, IoT devices may include physical devices, vehicles, buildings and other items having embedded therein electronics, software, sensors, actuators, or the like as well as network connectivity that enable these devices to collect and exchange data across an existing network infrastructure. FIG. 16 shows an exemplary view of only five cells, however, the wireless communication system may include more such cells. FIG. 16 shows two users UE1 and UE2, also referred to as user equipment (UE), that are in cell $1600_2$ and that are served by base station $eNB_2$. Another user $UE_3$ is shown in cell $1600_4$ which is served by base station $eNB_4$. The arrows $1602_1$, $1602_2$ and $1602_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 16 shows two IoT devices $1604_1$ and $1604_2$ in cell $1600_4$, which may be stationary or mobile devices. The IoT device $1604_1$ accesses the wireless communication system via the base station $eNB_4$ to receive and transmit data as schematically represented by arrow $1606_1$. The IoT device $1604_2$ accesses the wireless communication system via the user $UE_3$ as is schematically represented by arrow $1606_2$.

The wireless communication system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-s-OFDM. Other waveforms, like non-orthogonal waveforms for multiple access, e.g. filter-bank multicarrier (FBMC), may be used.

In a wireless communication network, like the one depicted in FIG. 16, it may be desired to locate a UE with a certain accuracy in a cell. One approach to locate a UE within a cell is based on an observed time difference of arrival (OTDOA) estimation that may be used in cellular communication networks, such as LTE. It is a downlink positioning method that relies on the calculation of time of arrival (TOA) estimates using position reference signals (PRS) received at the user equipment (UE) from one or more surrounding base stations (eNEB). PRS sequences are downlink signals that are designed for positioning purposes and that are broadcast to all radio terminals within a cell. The PRS sequences are radiated with the same transmit power from the antenna of the base station or the remote radio head (RRH) in all directions to cover all users at any location of the cell, i.e., to provide a cell-wide coverage. To distinguish the PRS sequences from different cells, each PRS sequence has associated therewith a cell-specific identifier also referred to as a physical cell identifier (PCI). The PCI is unique in a specific area and is used to identify the cell and thus the PRS sequence. At least three timing measurements from geometrically dispersed base stations are needed, relative to the UE's internal time base, in order to obtain a unique position in a plane. Four base stations are needed to obtain a unique position in a three-dimensional space, As is shown in FIG. 16, the base stations of the wireless communication network include a plurality of antennas ANT, for example formed by an antenna array including a plurality of antenna elements, and the UE may also include more than one antenna. In scenarios in which both the UE and the base station are equipped with a plurality of antennas, location-independent parameters may be exploited in addition to the OTDOA measurements of the LoS (Line of Sight) or NLoS (Non Line of Sight) path components, for example an angle of arrival (AoA) at the UE and an angle of departure (AoD) at the base station may be used. Instead of detecting only NLoS errors and removing the influence of these errors, examples of localization techniques may benefit from the NLoS channel propagation by exploiting the geometrical relationship of possible UE locations implied by the NLoS path components.

The wireless communication networks may use frequency hopping transmission methods. In the present invention, orthogonal frequency division, such as OFDM (Orthogonal Frequency Division Multiplex) may be used for the frequency hopping signal. For multi-user (e.g. LTE, 5G, IEEE 802.11a/g/h/ . . . ) or multi-cell or multi-channel operation (e.g. DVB-T, DVB-T2, DMB), which is practically given for nearly each and every common broadband radio system, a multi-frequency/multi-channel-approach is given in the supporting devices, such as shown in FIGS. 14 and 16.

However, radio localization of frequency hopping radio transmitters needs to exploit the entire bandwidth of the frequency hopping radio signal in order to achieve high accuracy and robustness.

In order to achieve this goal, the present invention suggests a receiver and a method wherein the radio signal is coherent with respect to its phase throughout each and every frequency. For example, the coherency of the phase may be produced or reconstructed by the invention, for example by means of a calibration. However, a minimum effort is desired for this purpose.

With the help of a particular kind of signalization, which may be based on the signalization as commonly used during normal operation, the present invention is enabled to support a more accurate localization by means of a pseudo-coherent bandwidth extension in order to improve a localization based on satellite navigation systems (GNSS) outside of buildings and inside of buildings with an acceptable accuracy.

The conventional technology instead suggests methods wherein the coherency of signals is to be realized by means of Phase-Locked-Loops (PLLs) using a certain reference. A precise timing control (detuning of the PLL) is used to precisely adjust the phase. However, this involves a highly precise and stable reference generation (TCXO, . . . ) as well as deterministic switching times exact in the sub-nanosecond regime.

Otherwise, a coherency of a carrier phase may not be needed in frequency hopping methods.

Bluetooth [bluetooth40] and Wimedia Multiband-OFDM [wimedia 15] describe frequency hops over several sub bands such that a band gap remains between the starting frequency band (source) and the pounced frequency band (sink). The intention behind the band gap is to avoid or reduce interference.

SUMMARY

According to an embodiment, a receiver configured to receive a radio signal carrying information, the radio signal including an overall frequency band $f_{overall}$ having a first frequency sub band and a second frequency sub band, may be configured to receive during a first time period $T_1$ a first portion of the information carried by the radio signal in the first frequency sub band, and to receive during a second time period $T_2$ a second portion of the information carried by the radio signal in the second frequency sub band, to perform a channel estimation of the first frequency sub band in order to determine a first channel estimation result and to perform a channel estimation of the second frequency sub band in order to determine a second channel estimation result, to estimate a relative phase error $\Delta\Phi_{Pa,Pb}$ based on the first channel estimation result and the second channel estimation result, and to determine an overall phase basis of the radio signal under compensation of the relative phase error $\Delta\Phi_{Pa,Pb}$, wherein the first frequency sub band and the second frequency sub band include a spectral overlap in the frequency domain, and wherein the receiver is configured to superimpose the first channel estimation result and the second channel estimation result within the spectral overlap after determining the overall phase basis of the radio signal from the channel estimates in the spectral overlap.

According to another embodiment, a receiver configured to receive a radio signal carrying information, the radio signal including an overall frequency band $f_{overall}$ having a first frequency sub band and a second frequency sub band, may be configured to receive during a first time period $T_1$ a first portion of the information carried by the radio signal in the first frequency sub band, and to receive during a second time period $T_2$ a second portion of the information carried by the radio signal in the second frequency sub band, to perform a channel estimation of the first frequency sub band in order to determine a first channel estimation result and to perform a channel estimation of the second frequency sub band in order to determine a second channel estimation result, to estimate a relative phase error $\Delta\Phi_{Pa,Pb}$ based on the first channel estimation result and the second channel estimation result, and to determine an overall phase basis of the radio signal under compensation of the relative phase error $\Delta\Phi_{Pa,Pb}$, wherein the overall frequency band $f_{overall}$ of the radio signal includes a frequency band gap that is located between the first frequency sub band and the second frequency sub band, wherein the receiver is configured to extrapolate the channel transfer function of the first channel estimation result within the frequency band gap and to extrapolate the channel transfer function of the second channel estimation result within the frequency band gap, and wherein the receiver is configured to determine the overall phase basis of the radio signal based on the extrapolated channel transfer functions within the frequency band gap.

According to another embodiment, a receiver configured to receive predetermined radio signals carrying information, the predetermined radio signals including an overall frequency band $f_{overall}$ having a first frequency sub band and a second frequency sub band, wherein the receiver is configured to receive at least a spectral portion of a first predetermined radio signal during a first time period $T_1$, and to receive at least a spectral portion of a second predetermined radio signal during a second time period $T_2$, wherein the bandwidth of the first predetermined radio signal is larger than the bandwidth of the first frequency sub band and includes the first frequency sub band, and wherein the bandwidth of the second predetermined radio signal is larger than the bandwidth of the second frequency sub band and includes the second frequency sub band, may be configured to perform a first channel estimation in order to determine a first channel estimation result and to perform a second channel estimation in order to determine a second channel estimation result, to estimate a relative phase error $\Delta\Phi_{Pa,Pb}$ based on the first channel estimation result and the second channel estimation result, and to determine an overall phase basis of the first and second predetermined radio signals under compensation of the relative phase error $\Delta\Phi_{Pa,Pb}$, AND a) wherein the receiver is configured to perform the first channel estimation in a frequency band spectrally covering the first frequency sub band and at least a spectral portion of the first predetermined radio signal located outside the first frequency sub band, and to perform the second channel estimation in a frequency band spectrally covering the second frequency sub band and at least a spectral portion of the second predetermined radio signal located inside the second frequency sub band, wherein said spectral portion of the first predetermined radio signal located outside the first frequency sub band spectrally overlaps with at least a portion of said spectral portion of the second predetermined radio signal located inside the second frequency sub band, and to use the spectrally overlapping spectral portions for determining the overall phase basis OR b) wherein the receiver is configured to perform the first channel estimation in a frequency band spectrally covering the first frequency sub band and at least a spectral portion of the first predetermined radio signal located inside the first frequency sub band, and to perform the second channel estimation in a frequency band spectrally covering the second frequency sub band and at least a spectral portion of the second predetermined radio signal located outside the second frequency sub band, wherein said spectral portion of the first predetermined radio signal located inside the first frequency sub band spectrally overlaps with said spectral portion of the second predetermined radio signal located outside the second frequency sub band, and to use the spectrally overlapping spectral portions for determining the overall phase basis, OR c) wherein the receiver is configured to perform the first channel estimation in a frequency band spectrally covering the first frequency sub band and a spectral portion of the first predetermined radio signal located inside the first frequency sub band and a spectral portion of the first predetermined radio signal located outside the first frequency sub band, and to perform the second channel estimation in a frequency band spectrally covering the second frequency sub band and a spectral portion of the second predetermined radio signal located outside the second frequency sub band and a spectral portion of the second predetermined radio signal located inside the second frequency sub band, wherein said spectral portion of the first predetermined radio signal located inside the first frequency sub band spectrally overlaps with said spectral portion of the second predetermined radio signal located outside the second frequency sub band, and wherein said spectral portion of the first predetermined radio signal located outside the first frequency sub band spectrally overlaps with said spectral portion of the second predetermined radio signal located inside the second frequency sub band, and to use the spectrally overlapping spectral portions for determining the overall phase basis.

According to another embodiment, a receiver configured to receive a predetermined radio signal carrying information, the predetermined radio signal including an overall frequency band $f_{overall}$ having a first frequency sub band and a second frequency sub band, may be configured to receive during a second time period $T_2$ at least a spectral portion of the predetermined radio signal being spectrally located inside the second frequency sub band, and to receive during a first time period $T_1$ a spectral portion of the predetermined radio signal, wherein the spectral portion received during the first time period $T_1$ spectrally overlaps with the spectral portion received during the second time period $T_2$, to perform a first channel estimation within a frequency band spectrally covering the first frequency sub band and the spectral portion of the predetermined radio signal received during the first time period $T_1$, to perform a second channel estimation within a frequency band spectrally covering the second frequency sub band and the spectral portion of the predetermined radio signal received during the second time period $T_2$, to estimate a relative phase error $\Delta\Phi_{Pa,Pb}$ based on a channel estimation result of the first channel estimation and on a channel estimation result of the second channel estimation, and to use the spectrally overlapping spectral portions for determining an overall phase basis of the predetermined radio signal under compensation of the relative phase error $\Delta\Phi_{Pa,Pb}$.

According to another embodiment, a receiver configured to receive predetermined radio signals carrying information, the predetermined radio signals including an overall frequency band $f_{overall}$ having a first frequency sub band and a second frequency sub band, may be configured to receive during a first time period $T_1$ at least a spectral portion of a first predetermined radio signal, which spectral portion is located outside the first frequency sub band, to receive during a second time period $T_2$ a second predetermined radio signal, the second predetermined radio signal being located at least partially inside the second frequency sub band and including at least a spectral portion spectrally overlapping with the spectral portion of the first predetermined radio signal, to perform a first channel estimation within a frequency band spectrally covering the first frequency sub band and the spectral portion of the first predetermined radio signal outside the first frequency sub band, to perform a second channel estimation within a frequency band spectrally covering the second frequency sub band and the spectral portion of the second predetermined radio signal spectrally overlapping with the spectral portion of the first predetermined radio signal, to estimate a relative phase error $\Delta\Phi_{Pa,Pb}$ based on a channel estimation result of the first channel estimation and on a channel estimation result of the second channel estimation, and to use the spectrally overlapping spectral portions for determining an overall phase basis of the predetermined radio signal under compensation of the relative phase error $\Delta\Phi_{Pa,Pb}$.

According to another embodiment, a receiver configured to receive during a first time period $T_1$ a first frequency sub band and a spectral portion of a second frequency sub band, and to receive during a second time period $T_2$ a second frequency sub band and a spectral portion of the first frequency sub band, may be configured to perform a first channel estimation in a frequency band spectrally covering the first frequency sub band and the spectral portion of the second frequency sub band both received during the first time period $T_1$, to perform a second channel estimation in a frequency band spectrally covering the second frequency sub band and the spectral portion of the first frequency sub band both received during the second time period $T_2$, wherein the spectral portion of the first frequency sub band received during the second time period $T_2$ spectrally overlaps with a frequency-corresponding spectral portion of the first frequency sub band received during the first time period $T_1$ and/or wherein the spectral portion of the second frequency sub band received during the first time period $T_1$ spectrally overlaps with a frequency-corresponding spectral portion of the second frequency sub band received during the second time period $T_2$, to estimate a relative phase error $\Delta\Phi_{Pa,Pb}$ based on a channel estimation result of the first channel estimation and on a channel estimation result of the second channel estimation, and to use said spectral overlapping portions of the first and second frequency sub bands for determining an overall phase basis of the predetermined radio signal under compensation of the relative phase error $\Delta\Phi_{Pa,Pb}$.

Another embodiment may have a wireless communication network including an inventive receiver and a transmitter.

According to another embodiment, a method may have the steps of: receiving a radio signal carrying information, the radio signal including an overall frequency band $f_{overall}$ having a first frequency sub band and a second frequency sub band, wherein the first frequency sub band and the second frequency sub band include a spectral overlap in the frequency domain, receiving during a first time period $T_1$ a first portion of the information carried by the radio signal in the first frequency sub band, and receiving during a second time period $T_2$ a second portion of the information carried by the radio signal in the second frequency sub band, performing a channel estimation of the first frequency sub band in order to determine a first channel estimation result and performing a channel estimation of the second frequency sub band in order to determine a second estimation result, estimating a relative phase error $\Delta\Phi_{Pa,Pb}$ based on the first channel estimation result and the second channel estimation result, and determining an overall phase basis of the radio signal under compensation of the relative phase error $\Delta\Phi_{Pa,Pb}$ and superimposing the first channel estimation result and the second channel estimation result within the spectral overlap after determining the overall phase basis of the radio signal from the channel estimates in the spectral overlap.

According to another embodiment, a method may have the steps of: receiving a radio signal carrying information, the radio signal including an overall frequency band $f_{overall}$ having a first frequency sub band and a second frequency sub band, receiving during a first time period $T_1$ a first portion of the information carried by the radio signal in the first frequency sub band, and receiving during a second time period $T_2$ a second portion of the information carried by the radio signal in the second frequency sub band, performing a channel estimation of the first frequency sub band in order to determine a first channel estimation result and performing a channel estimation of the second frequency sub band in order to determine a second channel estimation result, estimating a relative phase error $\Delta\Phi_{Pa,Pb}$ based on the first channel estimation result and the second channel estimation result, and determining an overall phase basis of the radio signal under compensation of the relative phase error $\Delta\Phi_{Pa,Pb}$, wherein the overall frequency band $f_{overall}$ of the radio signal includes a frequency band gap that is located between the first frequency sub band and the second frequency sub band, wherein the method includes a step of extrapolating the channel transfer function of the first channel estimation result within the frequency band gap and extrapolating the channel transfer function of the second channel estimation result within the frequency band gap, and determining the overall phase basis of the radio signal based on the extrapolated channel transfer functions within the frequency band gap.

According to another embodiment, a method may have the steps of: receiving predetermined radio signals carrying information, the predetermined radio signals including an overall frequency band $f_{overall}$ having a first frequency sub band and a second frequency sub band, receiving at least a spectral portion of a first predetermined radio signal during a first time period $T_1$, and receiving at least a spectral portion of a second predetermined radio signal during a second time period $T_2$, wherein the bandwidth of the first predetermined radio signal is larger than the bandwidth of the first frequency sub band and includes the first frequency sub band, and wherein the bandwidth of the second predetermined radio signal is larger than the bandwidth of the second frequency sub band and includes the second frequency sub band, wherein the method further includes steps of performing a first channel estimation in order to determine a first channel estimation result and performing a second channel estimation in order to determine a second channel estimation result, estimating a relative phase error $\Delta\Phi_{Pa,Pb}$ based on the first channel estimation result and the second channel estimation result, and determining an overall phase basis of the first and second predetermined radio signals under compensation of the relative phase error $\Delta\Phi_{Pa,Pb}$, AND a) wherein the first channel estimation is performed in a frequency band spectrally covering the first frequency sub band and at least a spectral portion of the first predetermined radio signal located outside the first frequency sub band, and wherein the second channel estimation is performed in a frequency band spectrally covering the second frequency sub band and at least a spectral portion of the second predetermined radio signal located inside the second frequency sub band, wherein said spectral portion of the first predetermined radio signal located outside the first frequency sub band spectrally overlaps with said spectral portion of the second predetermined radio signal located inside the second frequency sub band, and using the spectrally overlapping spectral portions for determining the overall phase basis, OR b) wherein the first channel estimation is performed in a frequency band spectrally covering the first frequency sub band and at least a spectral portion of the first predetermined radio signal located inside the first frequency sub band, and wherein the second channel estimation is performed in a frequency band spectrally covering the second frequency sub band and at least a spectral portion of the second predetermined radio signal located outside the second frequency sub band, wherein said spectral portion of the first predetermined radio signal located inside the first frequency sub band spectrally overlaps with said spectral portion of the second predetermined radio signal located outside the second frequency sub band, and using the spectrally overlapping spectral portions for determining the overall phase basis, OR c) wherein the first channel estimation is performed in a frequency band spectrally covering the first frequency sub band and a spectral portion of the first predetermined radio signal located inside the first frequency sub band and a spectral portion of the first predetermined radio signal located outside the first frequency sub band, and wherein the second channel estimation is performed in a frequency band spectrally covering the second frequency sub band and a spectral portion of the second predetermined radio signal located outside the second frequency sub band and a spectral portion of the second predetermined radio signal located inside the second frequency sub band, wherein said spectral portion of the first predetermined radio signal located inside the first frequency sub band spectrally overlaps with said spectral portion of the second predetermined radio signal located outside the second frequency sub band, and wherein said spectral portion of the first predetermined radio signal located outside the first frequency sub band spectrally overlaps with said spectral portion of the second predetermined radio signal located inside the second frequency sub band, and using the spectrally overlapping spectral portions for determining the overall phase basis.

According to another embodiment, a method may have the steps of: receiving a predetermined radio signal carrying information, the predetermined radio signal including an overall frequency band $f_{overall}$ having a first frequency sub band and a second frequency sub band, receiving during a second time period $T_2$ at least a spectral portion of the predetermined radio signal being spectrally located inside the second frequency sub band, and receiving during a first time period $T_1$ a spectral portion of the predetermined radio signal, wherein the spectral portion received during the first time period $T_1$ spectrally overlaps with the spectral portion received during the second time period $T_2$, performing a first channel estimation within a frequency band spectrally covering the first frequency sub band and the spectral portion of the predetermined radio signal received during the first time period $T_1$, performing a second channel estimation within a frequency band spectrally covering the second frequency sub band and the spectral portion of the predetermined radio signal received during the second time period $T_2$, estimating a relative phase error $\Delta\Phi_{Pa,Pb}$ based on a channel estimation result of the first channel estimation and on a channel estimation result of the second channel estimation, and using the spectrally overlapping spectral portions for determining an overall phase basis of the predetermined radio signal under compensation of the relative phase error $\Delta\Phi_{Pa,Pb}$.

According to another embodiment, a method may have the steps of: receiving predetermined radio signals carrying information, the predetermined radio signals including an overall frequency band $f_{overall}$ having a first frequency sub band and a second frequency sub band, receiving during a first time period $T_1$ at least a spectral portion of a first predetermined radio signal, which spectral portion is located outside the first frequency sub band, receiving during a second time period $T_2$ a second predetermined radio signal, the second predetermined radio signal being located at least partially inside the second frequency sub band and including at least a spectral portion spectrally overlapping with the spectral portion of the first predetermined radio signal, performing a first channel estimation within a frequency band spectrally covering the first frequency sub band and the spectral portion of the first predetermined radio signal outside the first frequency sub band, performing a second channel estimation within a frequency band spectrally covering the second frequency sub band and the spectral portion of the second predetermined radio signal spectrally overlapping with the spectral portion of the first predetermined radio signal, estimating a relative phase error $\Delta\Phi_{Pa,Pb}$ based on a channel estimation result of the first channel estimation and on a channel estimation result of the second channel estimation, and use the spectrally overlapping spectral portions for determining an overall phase basis of the predetermined radio signal under compensation of the relative phase error $\Delta\Phi_{Pa,Pb}$.

According to another embodiment, a method may have the steps of: receiving during a first time period $T_1$ a first frequency sub band and a spectral portion of a second frequency sub band, and receiving during a second time period $T_2$ a second frequency sub band and a spectral portion of the first frequency sub band, performing a first channel estimation in a frequency band spectrally covering the first frequency sub band and the spectral portion of the second frequency sub band both received during the first time period $T_1$, performing a second channel estimation in a frequency band spectrally covering the second frequency sub band and the spectral portion of the first frequency sub band both received during the second time period $T_2$, wherein the spectral portion of the first frequency sub band received during the second time period $T_2$ spectrally overlaps with a frequency-corresponding spectral portion of the first frequency sub band received during the first time period $T_1$ and/or wherein the spectral portion of the second frequency sub band received during the first time period $T_1$ spectrally overlaps with a frequency-corresponding spectral portion of the second frequency sub band received during the second time period $T_2$, estimating a relative phase error $\Delta\Phi_{Pa,Pb}$ based on a channel estimation result of the first channel estimation and on a channel estimation result of the second channel estimation, and using said spectral overlapping portions of the first and second frequency sub bands for determining an overall phase basis of the predetermined radio signal under compensation of the relative phase error $\Delta\Phi_{Pa,Pb}$.

Another embodiment may have a non-transitory digital storage medium having a computer program stored thereon to perform any of the inventive methods when said computer program is run by a computer.

According to the inventive principle, the transmission channel is estimated over all available sub bands. The determined transmission channel may be exploited for position detection or localization of a receiver within a wireless communication network.

A particular focus for localization is the so-called Time of Arrival. In case that group antennas are available at one or more receivers, also the estimation of the direction of incidence of the first propagation path will become more precise. These time-related information or data are fed into a position detection unit or localization unit, respectively, in order to detect the position of the receiver within a wireless communication network. Methods that may be used in connection with the present invention are computations using time differences, e.g. TDoA (Time Difference of Arrival), incident angles, e.g, DoA (Direction of Arrival), as well as mixed forms of both types.

A further method that may be used in connection with the present invention is the direct position detection wherein the position is estimated directly from raw data. Such raw data may, for instance, be a complex output of an Analog-Digital-Converter (ADC) or of a digital mixer in Inphase- and Quadrature phase components.

Additionally or alternatively, a channel estimation in amplitude, phase and direction may serve as an observation from which the times of arrival of detected channel paths can be estimated. Demodulated OFDM-subcarrier, e.g. from a pilot carrier, represent the simplest special case of such a channel estimation.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
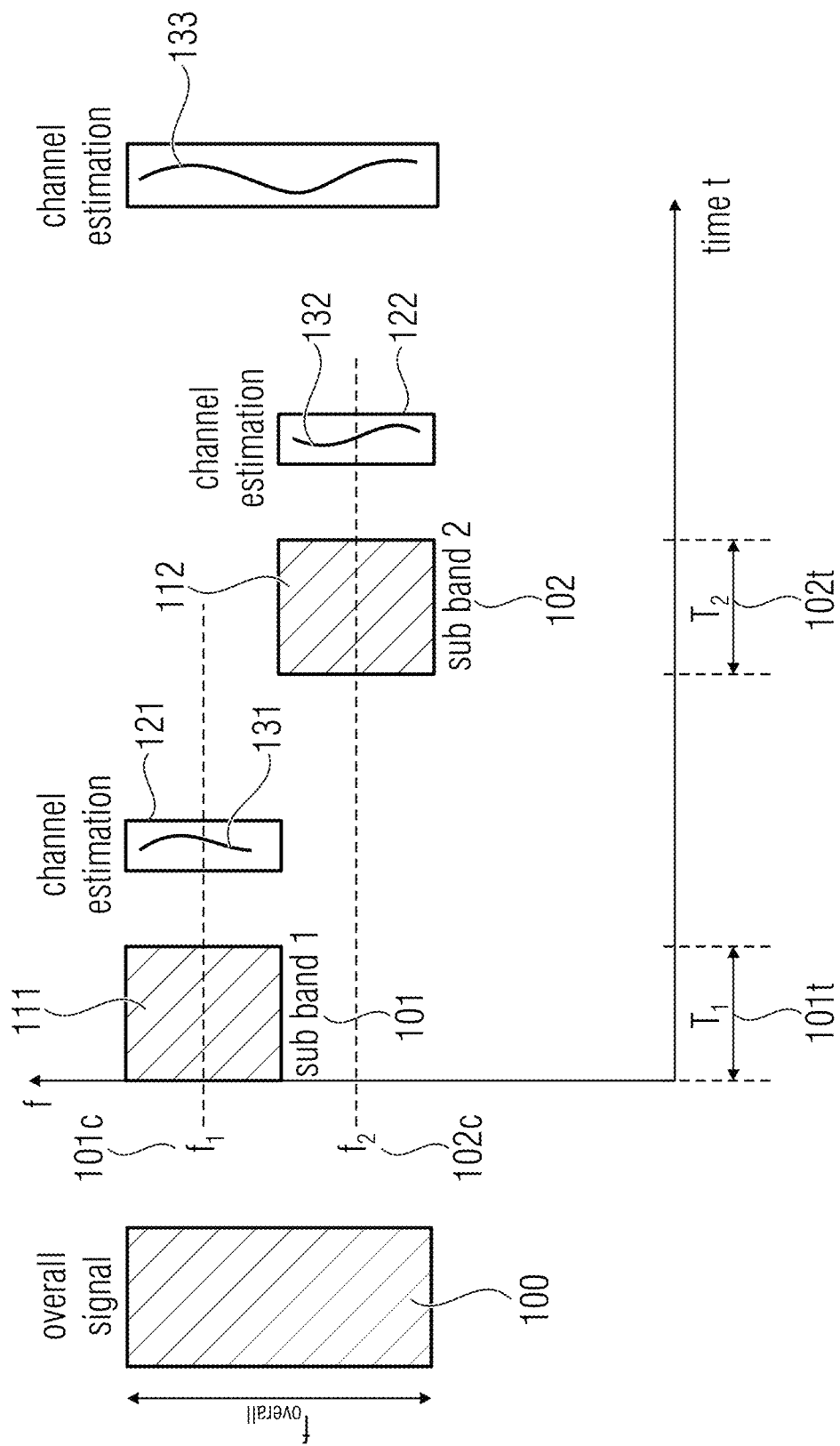
FIG. 1 shows a block diagram of the inside of an inventive receiver.

Equal or equivalent elements or elements with equal or equivalent functionality are denoted in the following description by equal or equivalent reference numerals.

FIG. 1 shows the inside mechanism of an inventive receiver that is configured to receive a radio signal 100 carrying information. The radio signal 100 comprises an overall frequency band $f_{overall}$ having a first frequency sub band 101 and a second frequency sub band 102. The first frequency sub band 101 is arranged around a first center frequency $f_1$ 101c and the second sub band 102 is arranged around a second center frequency $f_2$ 102c.

The first frequency sub band 101 and the second frequency sub band 102 are arranged adjacent to each other, i.e. the two frequency sub bands 101, 102 do not overlap. However, according to some examples of the present invention, the first and second frequency sub bands 101, 102 may overlap to a certain extent in the frequency domain (see e.g. FIGS. 2 to 9).

According to the invention, the receiver is configured to receive during a first time period $T_1$ 101t a first portion 111 of the information carried by the radio signal 100 in the first frequency sub band 101, and to receive during a second time period $T_2$ 102t a second portion 112 of the information carried by the radio signal 100 in the second frequency sub band 102.

According to the invention, the receiver is further configured to perform a channel estimation 121 of the first frequency sub band 101 in order to determine a first phase 131 and to perform a channel estimation 122 of the second frequency sub band 102 in order to determine a second phase 132.

According to the invention, the receiver is further configured to determine an overall phase basis 133 of the radio signal 100 using the first and second phases 131, 132.

As will be described in detail below, the receiver is configured to determine a relative phase error $\Delta\Phi_{Pa,Pb}$ between the first phase 131 and the second phase 132, and to determine the overall phase basis 133 under compensation of the relative phase error $\Delta\Phi_{Pa,Pb}$.

Accordingly, since the relative phase error $\Delta\Phi_{Pa,Pb}$ between the first and second phases 131, 132 is compensated, the overall phase basis 133 may represent a coherent overall phase that is coherently aligned over the bandwidth of at least the first and second sub bands 101, 102. This reconstruction of the single phases 131, 132 of the one or more frequency sub bands 101, 102 leads to a coherent overall phase basis 133 even though the portions 111, 112 of the radio signal 100 are transmitted portion-wise in separate sub bands 101, 102, e.g., by means of a frequency hopping transmission mode. Accordingly, this reconstruction of the phases 131, 132 of several sub bands 101, 102 under compensation of the relative phase error $\Delta\Phi_{Pa,Pb}$ between said phases 131, 132 may lead to a coherent overall phase basis 133 having a larger bandwidth than the single phases 131, 132. Therefore, the inventive principle allows for an extension of the overall bandwidth of portion-wise transmitted radio signals, e.g. frequency hopping signals 111, 112. The reconstructed signal comprising said extended overall bandwidth and a coherent overall phase basis 133 may, for instance, be exploited for location estimation purposes, whereby the larger the bandwidth of the received signal the better the result of the location estimation.

Due to propagation characteristics of the radio signal, for example in multipath environments, the receiver may receive the respective signal portion carried within one of the first and the second sub bands 101, 102 with certain propagation delays. Accordingly, the phases of the sub band signals arriving at the receiver may vary. Thus, if multipath propagation may be considered, the receiver may not only determine one single phase but rather a group of phases in each of the sub bands 101, 102. However, according to the invention, at least one phase in each of the sub bands 101, 102 is determined by the receiver, wherein said one phase may be included in a group of phases.

According to an example, the receiver is configured to compare the first phase 131 with the second phase 132 in order to determine the above mentioned overall phase basis 133 of the radio signal.

To do so, the receiver may be configured to determine a relative phase error between the first phase 131 and the second phase 132. The receiver may further be configured to determine the overall phase basis 133 of the radio signal 100 under compensation of the relative phase error. That means, the first phase 131 and the second phase 132 may comprise a phase shift between each other, wherein the receiver may determine the amount of the phase shift, which is also called the phase error. When the receiver reconstructs the overall phase basis 133 from the first phase 131 and the second phase 132, the receiver is configured to compensate the determined phase error, such that the two phases 131, 132 are correctly (i.e. coherently) aligned and combined to the overall phase basis 133. In result, the overall channel is reconstructed with a coherent overall phase basis 133.

According to an example, the receiver may be configured to coherently align the first phase 131 and the second phase 132 by a phase shift, wherein one of the first and the second phases 131, 132 serves as a reference phase for the phase shift of the other one of the first and the second phases 131, 132, in order to determine a coherent overall phase basis 133 of the radio signal 100. As mentioned above, the receiver may be configured to reconstruct the overall phase basis 133 from the first phase 131 and the second phase 132, thereby taking into account the previously determined phase error. That is, the receiver has to take one phase as the reference phase to which the receiver aligns all of the remaining phases. According to this example, the receiver may take the first phase 131 of the first channel 101 as a reference phase. The receiver then shifts all remaining determined phases, such as the second phase 132 and all following phases, and aligns them to the reference phase (first phase) 131.

However, according to the inventive principle, any of the determined phases, i.e. any channel or sub band, may serve as the reference for the phase shift.

Since the receiver may align all of the received phases to said one selected reference phase, one could say that the receiver may determine a common basis for all of the phases when reconstructing the overall radio signal 100. Accordingly, said common basis may also be referred to as the overall phase basis 133 for reconstructing the overall radio signal 100.

Generally speaking, the present invention suggests a variant of broadband modulation with frequency hops, wherein signals 100, such as e.g. OFDM-signals or similar modulations, are transmitted in (possibly) overlapping sub bands 101, 102. Generally, the phase 131, 132 is changed arbitrarily after a frequency hop (timely non-coherent transmitter due to frequency synthesis). However, a phase relation within the sub bands 101, 102 exists.

After determining the relative phase differences (or phase errors) within the sub bands 101, 102, the signals 111, 112 are processed with their correct phase. In result, the bandwidth may be virtually broadened over several frequency hops. According to theory, the bandwidth enlargement allows for a more precise estimation of times of arrival (ToA or TDoA). Also the estimation of the direction or angle (Angle of Arrival; AoA), and combined estimations of times of arrival and angles of arrival, as well as direct position detection may profit from an enlargement of bandwidth and measurement frequency.

Thus, the invention may be suitable to perform a position detection of the inventive receiver within a wireless communication network, which will be explained in more detail with reference to FIGS. 8 to 12. However, first of all the general principles of the inventive concept shall be explained and their mathematical background shall be discussed in the following.

As mentioned above, according to an example of the present invention, the first frequency sub band 101 and the second frequency sub band 102 may at least partially overlap in the frequency domain.

Figure 2:
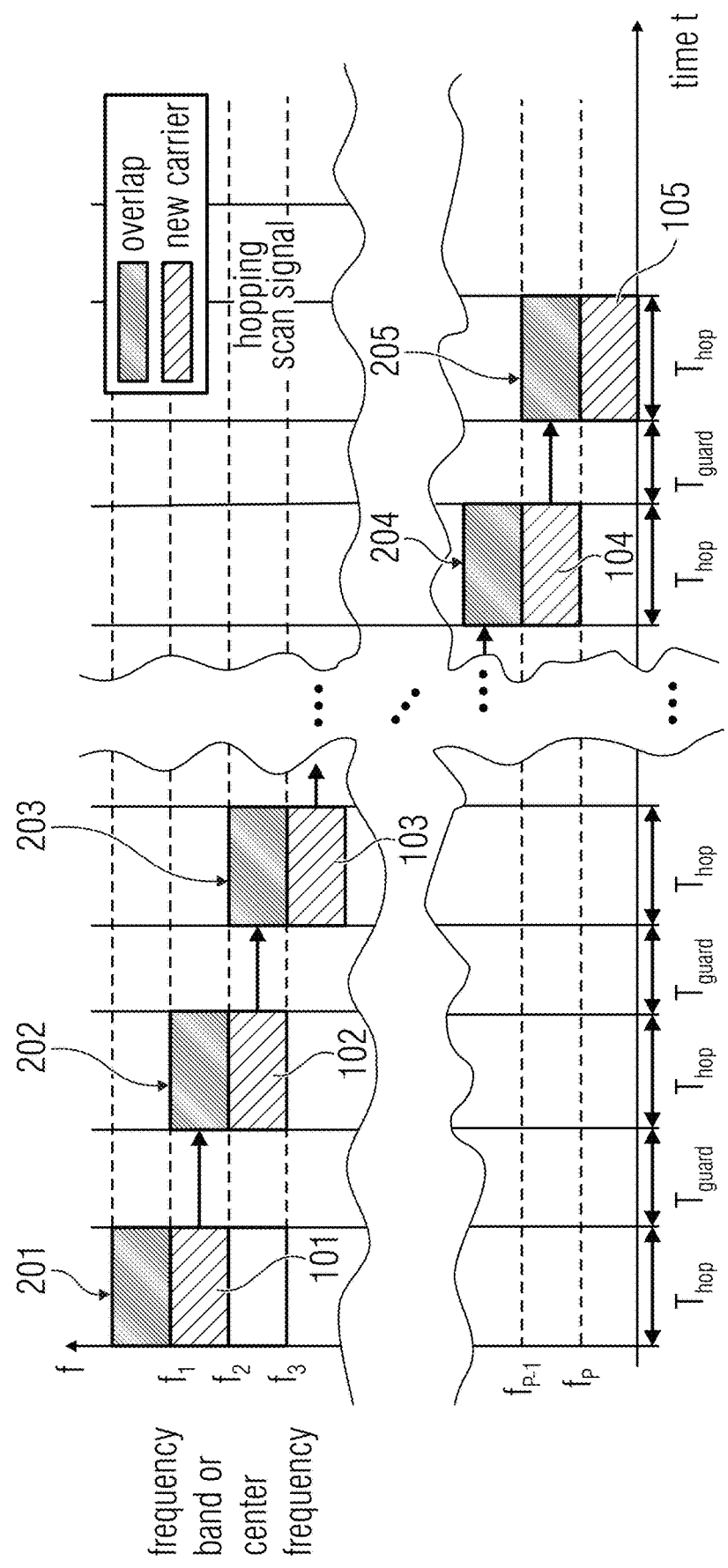
FIG. 2 shows a frequency band distribution over several hops in a descending frequency stair according to an embodiment.

FIG. 2 shows how the utilized sub bands 101 to 105 according to the invention may overlap spectrally, i.e. in the frequency range. In FIG. 2 five exemplary frequency sub bands 101, 102, 103, 104, 105, each carrying a portion of an overall information of an overall broadband radio signal 100 (such as discussed with reference to FIG. 1), are distributed within the overall frequency band $f_{overall}$ of the radio signal 100. Each of the depicted frequency sub bands 101 to 105 is arranged around a certain center frequency $f_1$, $f_2$, $f_3$ to $f_{p-1}$, $f_p$.

As can be seen, each of the sub bands 101 to 105 overlaps its respective subsequent sub band by about 50% in the frequency domain. That is, the first and subsequent second sub bands 101, 102 spectrally overlap at 202; the second and subsequent third sub bands 102, 103 spectrally overlap at 203; the p-1$^{th}$ sub band 104 and previous sub band (not shown) spectrally overlap at 204; the p-1$^{th}$ sub band 104 and the subsequent p$^{th}$ sub band 105 spectrally overlap at 205.

The spectral overlap of every pair of sub bands is shown in crosshatched lines.

According to a further example of the present invention, the first frequency sub band 101 and the second frequency sub band 102 may comprise a spectral overlap of at least 10%, advantageously of at least 20% and more advantageously between 20% to 50%.

Figure 3:
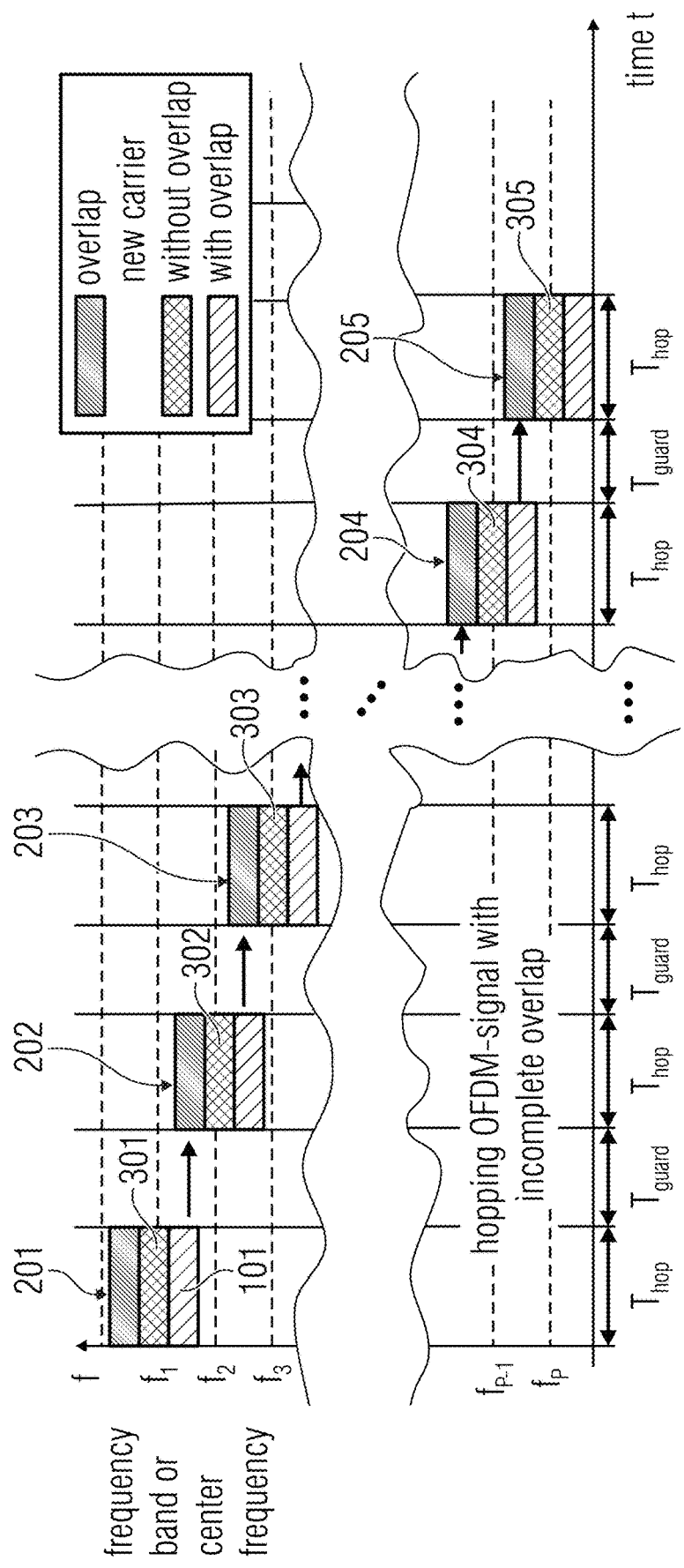
FIG. 3 shows a frequency band distribution over several hops in a descending frequency stair according to a further embodiment.

FIG. 3 shows such an example, wherein an overlapping spectral portion of a first sub band 101 and a subsequent second sub band 102 is less than 50% of the band width of the respective sub band 101, 102. In the example shown in FIG. 3, the spectral overlap is between 20% to 50%, and more advantageously about 30%.

Figure 4:
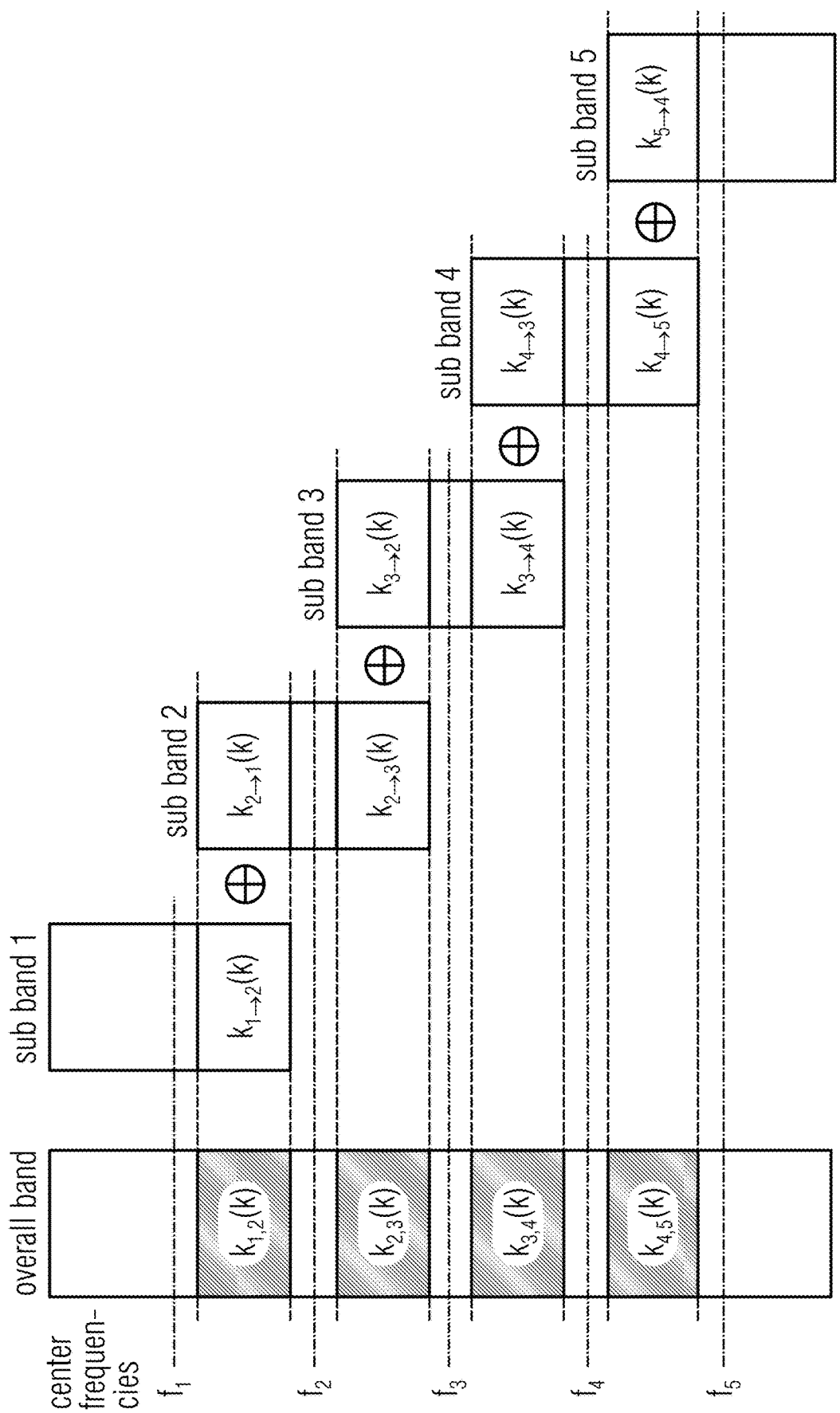
FIG. 4 shows a generalized frequency band distribution over several hops according to a further embodiment.

FIG. 4 shows and describes the above mentioned frequency hops and spectral overlaps of the sub bands 101 to 105 in more general terms. The signals of two frequency hops $p_a$ and $p_b$ overlap in the subcarriers $\kappa_{a \to b}(k)$ in the sub band of $p_a$ or $\kappa_{b \to a}(k)$ in the sub band of $p_b$, respectively. The mappings if $\kappa_{a \to b}(k)$ and $\kappa_{b \to a}(k)$ describe the selection of the respective overlapping subcarriers between $p_a$ and $p_b$. Mapping $\kappa_{a,b}(k)$ in FIG. 4 describes their allocation/mapping in relation to the overall subcarrier space.

The above described frequency hops may, for instance, be used within local networks (e.g. WLAN or WiFi) in the freely available ISM-Bands. In the ISM-Band from 2.4 GHz to 2.48 GHz, for example, the frequency sub bands having a width of 20 MHz overlap within a range of 15 MHz (when using all bands) or within a range of 10 MHz (when using every second band). There is no OFD-based WiFi-standard known that entirely exploits said 20 MHz bandwidth of the sub bands. The signal of IEEE 802.11gth has an effective bandwidth of about 53/64*20 MHz=16.5625 MHz at a 64-point DFT (Discrete Fourier Transformation), 52 used carriers and a zero-carrier in the middle of the band. Similar conditions apply for WiFi-standards using channel bundling, e.g. IEEE 802.11n. ISM and U-NII-band above 5 GHz do not provide for any overlapping sub bands.

In the following, the mathematical principles behind the invention shall be explained. Afterwards, a discussion of possible embodiments will follow.

It is one of several goals of the present invention to combine the channel estimations (or ADC-measurements) of each frequency sub band having center frequencies $f_p$ to a reconstructed overall signal 133. This may be done either in the frequency domain or in the time domain. Due to the retuning of the oscillator, the phase of the local frequency synthesis in the transmitter and the receiver adjusts itself rather randomly or arbitrarily.

According to the invention, the relative common phase error of the symbols (e.g. in OFDM) or of the transmission channel, respectively, is estimated for each frequency hop. The term 'relative' in this context means that only the phase change from one frequency hop to the next frequency hop is determined. Since the oscillators are usually free running and since no global phase reference exists, an arbitrarily chosen channel, for example from the first frequency sub band having a center frequency $f_1$, is used as a reference.

According to an example, the comparison with the reference may be made from overlapping carriers of the demodulated OFDM-data words. The transmission duration of one frequency hop interval $T_{hop}$ is at least one OFDM-symbol. A guard interval $T_{guard}$ may be arranged between two frequency hops, which guard interval covers the switching-, detuning- and settling-processes, such that stable center frequencies or carrier frequencies, respectively, are used during the transmission. In FIG. 2, for instance, a frequency hop pattern having the shape of a frequency-staircase is depicted.

The frequency symbols may occupy K subcarriers and may work with a cyclic prefix of length $N_{gd}$. Thus, NT= $(K+N_{gd})T$ is the overall temporal expansion of the OFDM-symbol in the time domain at a processing rate of 1/T. The usage of an alternative postfix of zero-symbols, i.e. a Zero-Padded-Postfix, or the usage of filter bank OFDM (alternatively called FBMC) and Unique-Word-OFDM does not change anything of the principles of the invention.

The signal, i.e. the radio signal 100, may be digitally generated. Thus, the phase $\phi_{TXLO,p,k} = \phi_{TXLO,p}$ of the free running oscillator for the carrier synthesis in the transmitter may be arbitrary in the frequency hop interval p, but it stays the same for each and every subcarrier k. The receiver system may comprise an additional delay term or a frequency-dependent term $$\phi_{RXLO,i,p,k,l} = \phi_{RXLO,i,p} - 2\pi f_k \tau_{i,l}.$$

Therein, it is considered that L channel paths with index l arrive at the receiver i. From this, the overall phase results as follows:

$$\phi_{i,p,k,l} = \phi_{TXLO,p} - \phi RXLO,i,p - 2\pi f_k \tau_{i,l}.$$

Within one frequency hop interval p, the local phase $\phi_{TXLO,p}$ of the transmitter and the local phase $\phi_{RXLO,i,p}$ of the receiver are independent from the respective subcarrier k. Thus, the following common phase error results:

$$\phi_{LO,i,p} = \phi_{TXLO,p} - \phi_{RXLO,i,p}.$$

The transmit-symbol at subcarrier k in the $m^{th}$ OFDM-symbol of the $p^{th}$ frequency hop is $S_{p,m,k} = S_p(f_k, mNT)$. Usually its modulation is phase coded, e.g. by means of PSK (Phase Shift Keying), or quadrature-amplitude-modulated, e.g. by means of Quadrature Amplitude Modulation (QAM). Subsequent to an Inverse Discrete Fourier Transformation (IDFT) of the transmit-vector $S_{p,m} = (S_{p,m,1}, S_{p,m,2}, \ldots, S_{p,m,K})^T$, the following cyclic prefix may be added:

$$s_m = \text{add}_{prefix}(\text{IDFT}(S_{p,m})) = (s([0+mN]T), s([1+mN]T), \ldots, s([N-1+mN]T))^T.$$

Afterwards the signal may be converted into an analog signal and mixed into the high-frequency range (amplifications and filter are omitted for ease). Accordingly, the following signal may result after mixing and sampling in the base band in the $i^{th}$ receiver node:

$$r_{i,p}([n+mN]T) = \sum_{l}^{L} \beta_{i,p,l} \cdot \exp(j\phi_{i,p,l}) \cdot s([n+mN]T - \tau_{i,l}) + w_{i,p}((n+mN)T)$$

After removal of the cyclic prefix (inherently happened in the formula) and DFT, the receiving signal may comprise the following form:

$$R_{i,p,m} = DFT \begin{pmatrix} r_{i,p}((N_{gd}+mN)T) \\ r_{i,p}((N_{gd}+1+mN)T) \\ \vdots \\ r_{i,p}(((m+1)N-1)T) \end{pmatrix}$$

$$= \exp(j\phi_{i,p}) \cdot H_{i,p} \cdot S_{p,m} + W_{i,p,m}.$$

The channel may be represented by the diagonal matrix $H_{i,p} = \text{diag}(H_{i,p})$ of complex channel coefficients, which may be construed from a superposition of every channel path according to delay and amplitude. The common phase error $\exp(j\phi_{i,p})$ has been extracted from the channel, but it can generally only be estimated as part of $H_{i,p}$. $W_{i,p,m}$ is the frequency domain representation of the thermal noise.

The signal $S_{p,m}$ may also be a known signal preamble or an (overlapping) sequence of OFDM-pilots. Also a subsequent demodulation after a complete signal decoding and recoding and remodulation of the user data in the OFDM frame may be possible and may allow for a complete usage of all OFDM signal portions. The demodulated signal may be represented by $$\bar{R}_{i,p,m,k} = \frac{R_{i,p,m,k}}{S_{p,m,k}}.$$

As shown in FIG. 4, the signals of two frequency hops $p_a$ and $p_b$ overlap in the subcarriers $\kappa_{a \to b}(k)$ in the sub band of $p_a$ or $\kappa_{b \to a}(k)$ in the sub band of $p_b$, respectively. The mappings $\kappa_{a \to b}(k)$ and $\kappa_{b \to a}(k)$ describe the selection of the respective overlapping subcarriers between $p_a$ and $p_b$. Mapping $\kappa_{a,b}(k)$ in FIG. 4 describes their allocation mapping in relation to the overall subcarrier space.

The differential phase or the differential phasor $\Delta\Phi_{p_a,p_b} = \exp(j\phi_{i,p_a}) \exp(-j\phi_{i,p_b})$ may be estimated, for example from $$\Delta\Phi_{p_a,p_b} = \arg\left\{\sum_{m=1}^{M} \sum_{k=1}^{K_{overlap}} \bar{R}_{i,p_a,m,\kappa_{a \to b}(k)} \cdot \bar{R}^*_{i,p_b,m,\kappa_{b \to a}(k)}\right\}.$$

For an identical transmit-sequence on $p_a$ and $p_b$ the previous demodulation, i.e. the division through $S_{p,m,\kappa_{a \to b}(k)}$ or through $S_{p,m,\kappa_{b \to a}(k)}$, respectively, may even be omitted. In this case, the demodulation may have to be executed explicitly or implicitly in the channel estimation. Other estimators of the differential phase may be derived from $$(\Delta\phi_{p_a,p_b,l}) = \max_{\Delta\phi} \left| \sum_{m=1}^{M} \sum_{k=1}^{K_{overlap}} \bar{R}_{i,p_a,m,\kappa_{a \to b}(k)} + \exp(-j\phi)\bar{R}_{i,p_b,m,\kappa_{b \to a}(k)} \right|.$$

When such a phasor $\Delta\Phi_{p_a p_b}$ or the related phase $\Delta\phi_{p_a p_b} = \arg\{\Delta\Phi_{p_a p_b}\}$ is determined from every overlapping spectral portion, and when all measurements are completely connected with each other, the overall channel may be computed from a superposition of every estimated sub channel 101, 102 or every received signal 111, 112. Therefore, the sub channels 101, 102 or the demodulated signals, respectively, are superimposed in the frequency domain with the correct phase.

A simple exemplary calculation may superimpose the two unmodulated receiving-symbols additively $$\bar{R}_{i,overall,m,\kappa_{a,b}(k)} = \frac{1}{2} \cdot (\bar{R}_{i,p_a,m,\kappa_{a \to b}(k)} + \exp(-j\Delta\Phi_{p_a p_b}) \cdot \bar{R}_{i,p_b,m,\kappa_{b \to a}(k)}).$$

If more than two demodulated OFD M signals per sub band are superimposed, the sum extends accordingly. The superposition may also directly influence the overall channel estimation, for example in a Wiener-Filter [speth01] that has been particularly modeled therefore.

The higher the overlap—in the frequency and in the time domain—the more precise the estimation of the relative phase error $\Delta\Phi_{p_a p_b}$ of the second (overlapping) channel 102 will be. The timely overlap is fixedly given by the length of the training sequence (preamble), or in the case of a complete decoding, by the length of the transmission between two frequency hops.

The resulting overall channel estimation in the spectral $\hat{H}_{overall}$ provides a much higher spectral resolution presented by the terms $\exp(j2\pi f_k \tau_i)$ in overlapping spectral ramps on the channel over every subcarrier. Their pitch or gradient is determined by their times of arrival $$\tau_{i,l} = \tau_{prop,i,l} + \Delta T_i$$

of the L paths. These paths or channels, respectively, may then be estimated by means of MUSIC-Algorithm, ESPRIT-Algorithm or similar methods, wherein particularly preprocessing by means of forward-backward-averaging and smoothing may be used.

For low signal-to-noise ratio or for imprecise channel estimation values $\hat{H}_p$ in the sub bands, an imprecise estimation of the relative phase error $\Delta\Phi_{p_a p_b}$ of the overall channel may result. Accordingly, also the estimation of the overall channel $\hat{H}_{overall}$ or the times of arrival $\tau_{i,t}$ may only reach low quality. The channel estimation of the overall channel may then be more imprecise than the channel estimation (the estimation of the times of arrival) of the sub bands. It is expected that the inventive concept may have a SNR-threshold.

Figure 10:
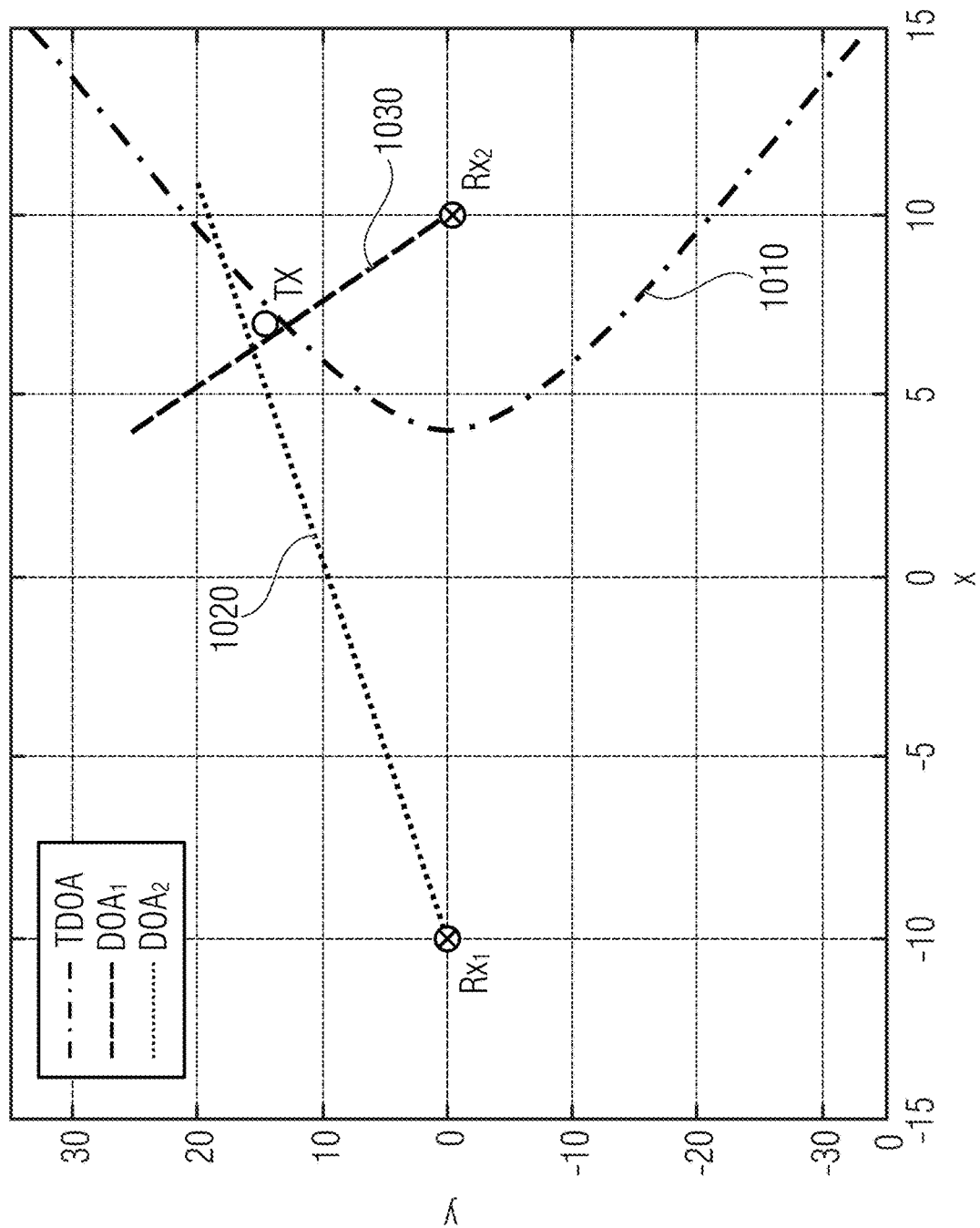
FIG. 10 shows a diagram for localization of a transmitter using DoA and TDoA.

For synchronized receivers the time deltas are $\Delta T_i = \Delta T$, such that (possibly ambiguous) delay differences $$\Delta \tau_{i_1 i_2, l} = \tau_{i_2, l} - \tau_{i_1, l} - \tau_{prop, l_2, l} + \Delta T - \Delta T - \tau_{prop, i_3, l}$$

may result. Thus, a position estimation may exploit differences in the times of arrival (TDoA) and therefore also differences of distance $$\Delta \tau_{i_1, i_2, 0} = \frac{d_{i_2} - d_{i_1}}{c_0}$$

within one radio cell of a wireless communication network (e.g. FIG. 14), such as shown by means of a hyperbola in FIG. 10.

A demodulated OFDM signal may already be regarded as a channel estimation value. Additionally or alternatively, also the overlapping subcarriers from a smoothed OFDM channel estimation of the sub bands may be used. Since the OFDM signal is generated from discrete sampling values, it has a cyclic-periodical spectrum in the frequency domain afterwards. Accordingly, the smoothed channel is cyclically continued over the (sub) band boundaries. The real progression of the channel at the boundaries of the frequency range is therefore altered. This may not be of further relevance with respect to data transmission because the same effect concerns to the same extent the data signals on the subcarriers. However, this is not desired for determining the common phase error because it distorts the phase relation in the overlapping area. However, for other reasons, all common OFDM systems put zero-carriers at the band edges such that the region of overlap may be limited but the available signals will be less distorted.

The inventive method may also be used for broadband technologies other than OFDM:

CDMA (Code Division Multiple Access) such as used in, e.g. UMTS and HSPA. Spreading of the signal in the time domain leads to a spectrum that is broadened by the factor of the spreading. An equalization in the frequency domain has been widely suggested in particular for high-rate variants (e.g. HSPA). Based thereon, the signal in the frequency domain may be modulated like OFDM, wherein the modulation in the frequency domain $S_{p,m,k}$ is calculated by the DFT of the sent time signal $s_{p,m,n}$. Channel estimation, difference phases between the frequency hops, estimation of the overall channel and detection of the times of arrival are used in the frequency domain as described. The basic standard IEEE 802.11(b) is based on a Direct-Sequence Spread Spectrum (DSSS) implementation. It is contained as a compatibility mode in almost every WiFi implementation.

SC-FDMA (e.g. LTE-uplink) [myungo6, 3gpp] or MC-CDMA are techniques which involve, like OFDM and OFDMA in their basic implementations, a frequency analysis based on a DFT anyway. Thus, the inventive method can be used as described, advantageously without any modifications.

Generalized Frequency Division Multiplexing (GDFMA) [fettweis09], Filterbank-Multicarrier (FBMC) modulation [farhang11] and OFDM/OQAM (offset QAM) [siohano2] are further similar techniques with information spreading onto orthogonal subcarriers with high spectral efficiency. GDFM and FBMC, which are in discussion for the fifth generation of mobile communication (5G), entirely omit complete orthogonality. Also for these techniques, the inventive method can be used for frequency hops through overlapping sub bands without substantial modifications.

Since the mathematical background of the invention has been described above, several examples of the invention shall now be described.

FIGS. 3, 5, 6 and 7 show exemplary implementations or patterns of a frequency hopping method in which the inventive principle may be used. FIG. 3 shows a frequency staircase with an overlap of the used sub bands 101 to 105 around the center frequencies $f_1 \ldots f_p$ of less than 50% of the bandwidth of the respective subcarriers 101 to 105, Thus, the subcarriers 101 to 105 do not overlap spectrally in the middle of the respective sub bands, as can be seen by portions 301 to 305. Such a realization is advantageous because practically each OFDM standard uses zero-carriers (without a signal) at the edge of the sub bands.

A common use case may be imaginable as a probing-method according to which WiFi devices of the IEEE 802.11-family scan the sub bands for responses of access points by means of a transmitted probe-signal. However, WiFi-systems use DSSS-signals according to IEEE 802.11 (b) for compatibility reasons, which does, however, not prevent the usage of the inventive method. The channel residence time of 40 ms is very high at the moment [chen10]. The mobile device transmits a "probe request" and waits for a "probe response" of the access points before it switches to the next channel.

Figure 5:
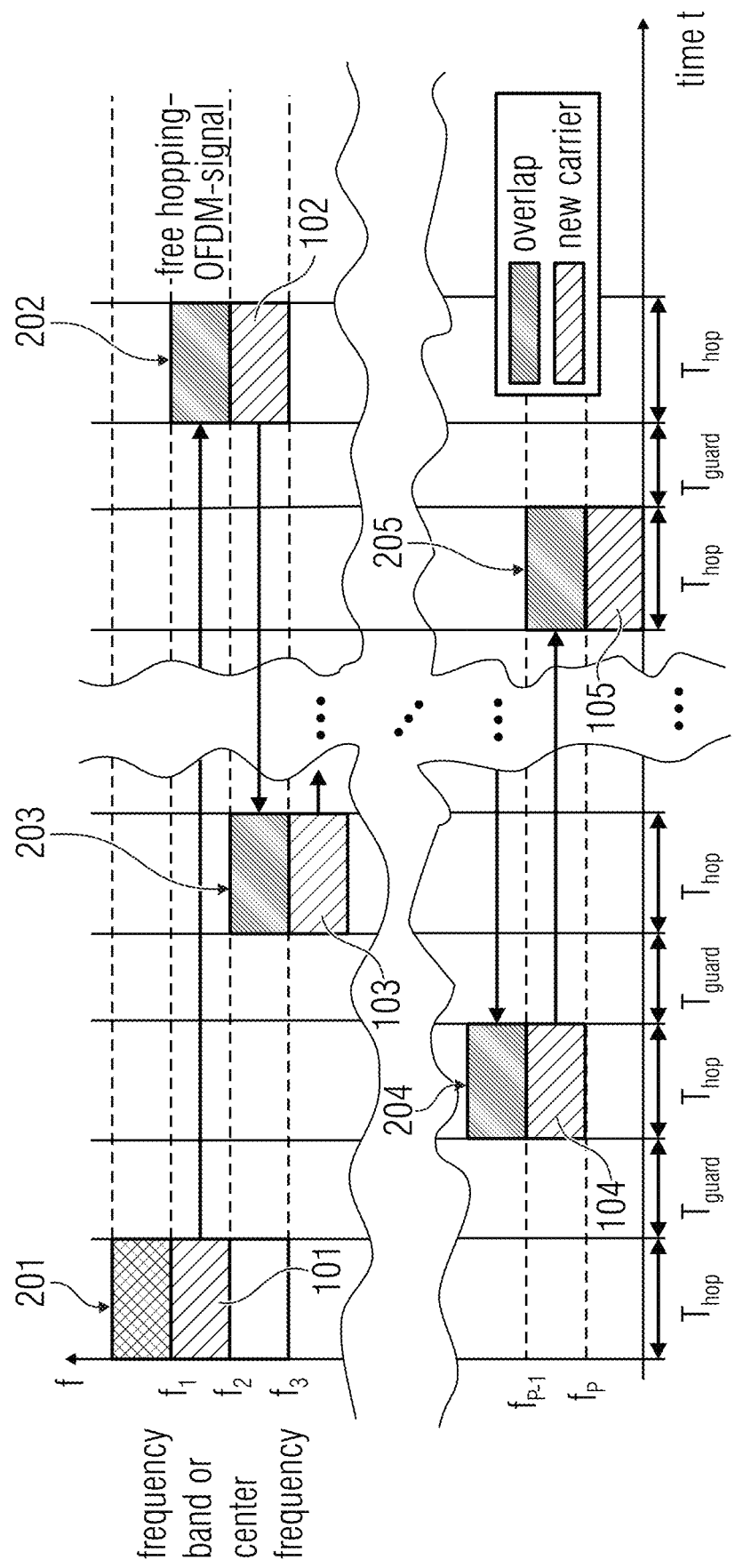
FIG. 5 shows an arbitrary frequency band distribution over several hops according to a further embodiment.

As an alternative to the above mentioned frequency-staircase, FIG. 5 shows an uneven distribution pattern of frequency hop frequencies, i.e. an uneven distribution of the sub bands 101 to 105. In this example, the sub bands 101 to 105 comprise spectral overlaps 201 to 205 of about 50%.

According to an example, the receiver may be configured to receive a plurality of consecutive frequency sub bands 101 to 105 in a randomized order in the time domain, wherein the plurality of frequency sub bands 101 to 105 contains the first and second frequency sub bands 101, 102 and at least one further frequency sub band 103, 104, 105 containing a further portion of the information carried by the radio signal 100.

Accordingly, each of the frequency sub bands 101 to 105 contains a portion of the information that is contained in the overall signal 100 (see FIG. 1). As mentioned above, the sub bands 101 to 105 may arrive at the receiver in a randomized order in the time domain, as shown in FIG. 5. A randomized order in the time domain means that the sub bands 101 to 105 may arrive at the receiver at different points in time. In the example shown in FIG. 5, the first sub band 101 receives first, then the p-1$^{th}$ sub band 104 follows, then the third sub band 103 arrives at the receiver, then the p$^{th}$ sub band 105 arrives, and least the second sub band 102 arrives.

However, since the frequency bands itself do not change in the frequency domain, their respective spectrally overlapping portions remain the same as described before. That is, the first sub band 101 and the second sub band 102 comprise an overlapping spectral portion 202, the second sub band 102 and the third sub band 103 comprise an overlapping spectral portion 203, and so on.

The usage of such several different, partly uneven patterns, reduces the interferences in multi-user or multi-cell systems and is therefore advantageous. Mutual interference becomes more seldom or unlikely, just like in Bluetooth [bluetooth40] or Wimedia UWB [wimedia15].

Figure 6:
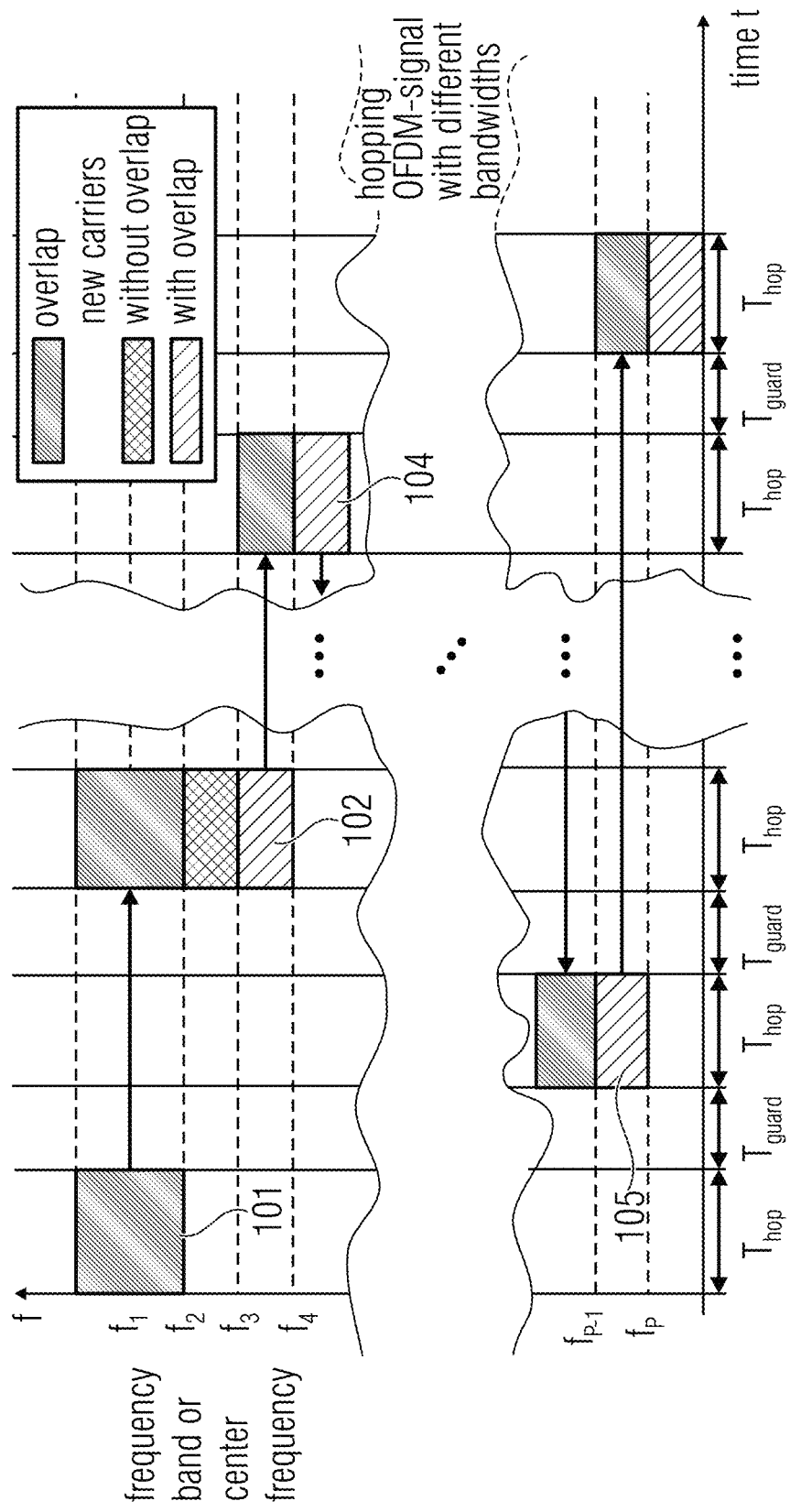
FIG. 6 shows an arbitrary frequency band distribution over several hops with channel bundling according to a further embodiment.

WiFi standards from 802.11n and later as well as cellular standards offer the possibility of a so-called channel bundling, such that an OFDM-signal reaches over several sub bands. An example is shown in FIG. 6 in the second hop, i.e. between the p-1$^{th}$ sub band 105 and the second sub band 102.

According to an example, the receiver may be configured to receive a plurality of consecutive frequency sub bands 101 to 106 in a randomized order in the time domain, wherein the plurality of frequency sub bands 101 to 106 contains the first and second frequency sub bands 101, 102 and at least one further frequency sub band 103, 104, 105, 106 containing a further portion of the information carried by the radio signal 100.

According to a further example, at least one of the plurality of frequency sub bands 101 to 106 may be channel-bundled together with at least one further consecutive frequency sub band 101 to 106 to form a channel-bundled frequency band 102, wherein the receiver is configured to receive the channel-bundled frequency band 102.

As mentioned above, channel bundling may be used, for instance, in WiFi standards from 802.11n and later. As can be seen in the exemplary diagram shown in FIG. 6, the second frequency sub band 102 is channel-bundled. That is, the second sub band 102 may have the center frequency $f_2$, wherein the bandwidth of channel $f_2$ spans a broader bandwidth than the remaining channels or sub bands 101, 104, 105, 106. In particular, the second sub band 102 covers the bandwidth of the first sub band 101 and the bandwidth of the third sub band 103. Accordingly, the second sub band 102 is channel-bundled with the first sub band 101 and with the third sub band 103.

According to this example, the second frequency sub band 102 has a larger bandwidth than the first frequency sub band 101, wherein the bandwidth of the second frequency sub band 102 covers the first frequency sub band 101 and optionally at least one further sub band, namely also the third sub band 103, to form a channel bundled frequency sub band 102, which is also referred to as channel bundling.

Accordingly, an overlap of the sub bands can be omitted in this case. However, this does not change anything of the general concept, FIG. 7 shows the distribution of an OFDM-signal, e.g. into a preamble-portion 701 to 705 and a user data portion 711 to 715.

As can be seen, each frequency sub band 101 to 105 comprises a preamble portion 701 to 705 and a user data portion 711 to 715. The preamble portions 701 to 705 at least partly overlap in the frequency domain, i.e. they comprise a spectral overlap of at least 50%, or at least 20%, or between 20% and 50%.

In particular, the preamble portions 701 to 705 spectrally overlap at 722, 723, 724 and 725.

Figure 7:
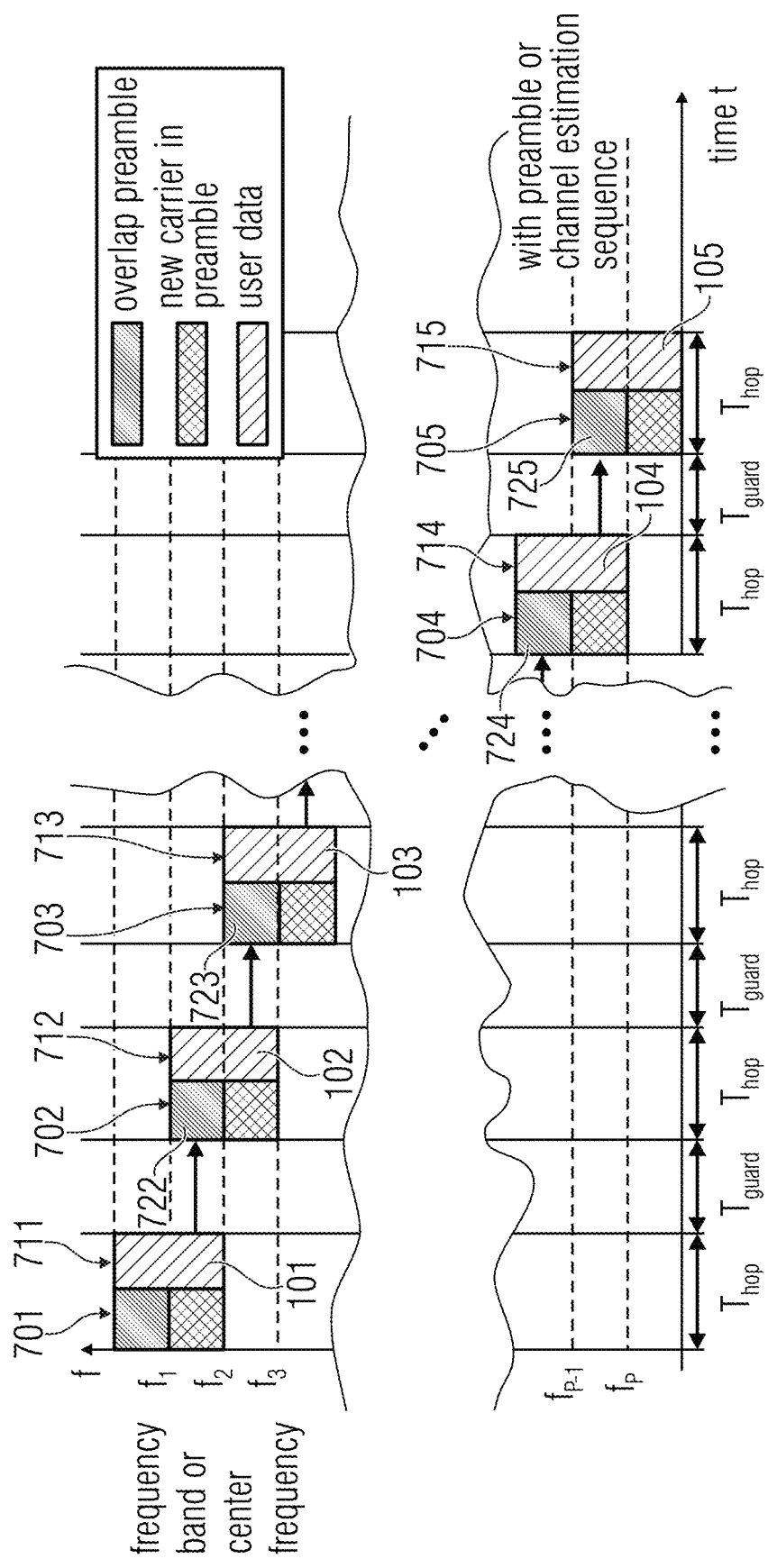
FIG. 7 shows a frequency band distribution over several hops in a descending frequency stair, wherein sub bands comprising preamble and user data portions, according to a further embodiment.

In the example of FIG. 7, each of the sub bands 101 to 105 comprise a spectral overlap 722 to 725 of about 50% with its respective subsequent sub band (i.e. subsequent in the time domain).

As mentioned above, each of the sub bands 101 to 105 contains a portion of the information that is carried by the overall signal 100. Furthermore, in this example, each sub band 101 to 105 contains a preamble portion 701 to 705 and a user data portion 711 to 715. The preamble may contain training data.

According to an example, the first portion of the information carried by the radio signal in the first frequency sub band 101 and the second portion of the information carried by the radio signal in the second frequency sub band 102 each contains a preamble portion 701 to 705 and optionally a user data portion 711 to 715, wherein the receiver is configured to perform the channel estimation for each of the first and the second frequency sub bands, 101, 102, wherein the channel estimation is based on the respective preamble portion 701 to 705.

Accordingly, the preamble portions 701 to 705 spectrally overlap, wherein the above described channel estimation for determining the phase of each sub band 101 to 105 is based on the preamble portions 701 to 705 instead of the user data portion 711 to 715. In a simplified embodiment only training data of a signal is used.

Figure 8:
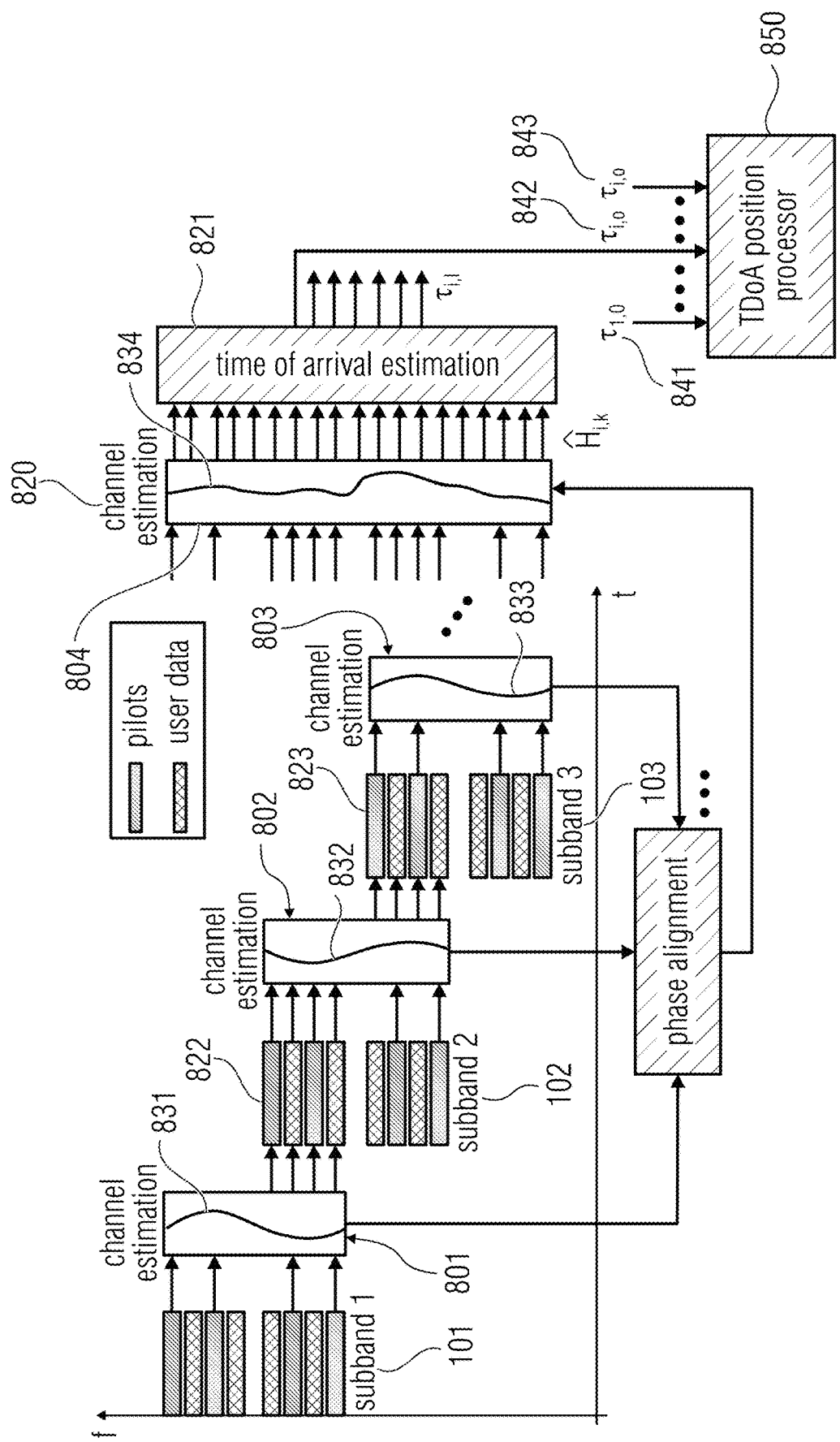
FIG. 8 shows a channel estimation and phase alignment according to an embodiment.

Besides the above described preamble portion, also pilot data may be used for channel estimation which pilot data may be distributed over the spectrum of a sub band 101 to 105, such as shown in the algorithm in FIG. 8.

Each sub band 101, 102, 103 contains a user data portion and a pilot portion, wherein the pilots are (e.g. evenly) distributed within the respective frequency sub band 101, 102, 103. Each of the sub bands 101, 102, 103 at least partially overlaps its subsequent (i.e. subsequent in time domain) sub band 101, 102, 103 in the frequency domain. In particular, the first sub band 101 and the second sub band 102 spectrally overlap at 822, and the second sub band 102 and the third sub band 103 spectrally overlap at 823.

According to an example, the receiver may be configured to compare the first phase 831 of the first sub band 101 with the second phase 832 of the second sub band 102 within the spectral overlap 822 in order to determine the overall phase basis 834 of the radio signal.

As can be seen, a channel estimation is executed in each of the sub bands 101, 102, 103. In particular a first channel estimation 801 is executed with respect to the first sub band 101, a second channel estimation 802 is executed with respect to the second sub band 102, and a third channel estimation 803 is executed with respect to the third sub band 103. By means of each channel estimation 801, 802, 803 the receiver determines the phase 831, 832, 833 of the respective channel or sub band 101, 102, 103.

Due to the overlapping nature of the overlapping portions 822, 823 there is a phase correlation between the overlapping parts of the sub bands 101, 102, 103. However, since the oscillators may be free running, the phases 831, 832, 833 may be shifted, i.e. a relative phase error may exist, between each hop.

According to an example, the receiver may be configured to determine the relative phase error between the first phase 831 of the first sub band 101 and the second phase 832 of the second sub band 102, and to determine the overall phase basis 834 of the radio signal under compensation of the relative phase error.

That is, the receiver is configured to reconstruct the overall phase basis 834 of the overall radio signal 100, wherein the receiver is configured to compensate the relative phase error between each hop and coherently align the single phases 831, 832, 833 to each other in order to achieve the overall phase basis 834.

Since a global reference is missing, the receiver may choose one of the phases 831, 832, 833 as a reference phase to which all other phases are aligned. It is advantageous to choose the phase of the sub band which arrives first in time at the receiver as the reference phase.

According to an example, the receiver is configured to coherently align the first phase 831 and the second phase 832 by a phase shift, wherein one of the first and the second phases 831, 832 serves as a reference phase for the phase shift of the other one of the first and the second phases 831, 832, in order to determine a coherent overall phase basis 834 of the radio signal.

As mentioned above, the inventive principle may be used for detecting a position of a receiver within a wireless communication network. In order to achieve this, the receiver may determine a time of arrival of the reconstructed overall signal based on the reconstructed overall phase basis 834 of the overall signal. Again, the overall phase basis 834 is determined by means of a channel estimation 804, wherein each channel or sub band 101, 102, 103 is estimated separately in a separate channel estimation 801, 802, 803. Accordingly, the receiver may determine a time of arrival of the overall signal based on the phase of the reconstructed phase basis 834 of the overall signal.

Therefore, the receiver may be configured to execute a time of arrival (ToA) estimation 821 by means of the reconstructed coherent overall phase basis 834. For each received and reconstructed overall signal, the ToA-estimation may yield a particular time delay 841, 842, 843 which may be fed to a position detection processor 850.

According to an example, the receiver may be configured to determine a delay 841, 842, 843 of the information carried by the radio signal by using the overall phase basis 834 of the radio signal and to provide the delay 841, 842, 843 to the position detection unit 850 that is configured to determine, based on the delay, the spatial location of the receiver within a wireless communication network.

Besides ToA determination, the inventive principle may also be used for Time Difference of Arrival (TDoA) or Relative Signal Timing Difference (RSTD) calculations.

According to an example, the position detection unit 850 is configured to compute the spatial position of the receiver by using the delay 841, 842, 843 for at least one of a time of arrival (ToA), a Time Difference of Arrival (TDoA) and a Relative Signal Timing Difference (RSTD) calculation, Summarizing the example of FIG. 8, a differential phase between the channel hops may be determined from the overlapping channel estimations 801, 802, 803, even though the actual pilot carriers do not overlap in the frequency domain. Based thereon, the overall channel is estimated at 820, either in the time or in the frequency domain, from which the time of arrival may be determined at 821 which can be used, for instance, as input of a TDoA position detection processor 850. The sequence as depicted in FIG. 8 is equivalent to the usage of user data and a channel estimation preamble, as previously described with reference to FIG. 7.

The reconstructed phase coherency or phase basis 834 may be used for a phase-based (relative) TDoA at 850. If ambiguities remain, they can be resolved in a similar fashion as for high-precision satellite navigation (Precise Point Positioning). According to the Real-Time-Kinetics-method (RTK) particularly the relative phases (as double differences) are considered. For a two-dimensional position detection, at least four spatially distributed synchronized receivers are needed.

Also the reversal, such as known for observed TDoA (OTDoA) in GPS, is a possible embodiment. However, in this case the distributed base stations may have to transmit the frequency hopping signal.

Figure 9:
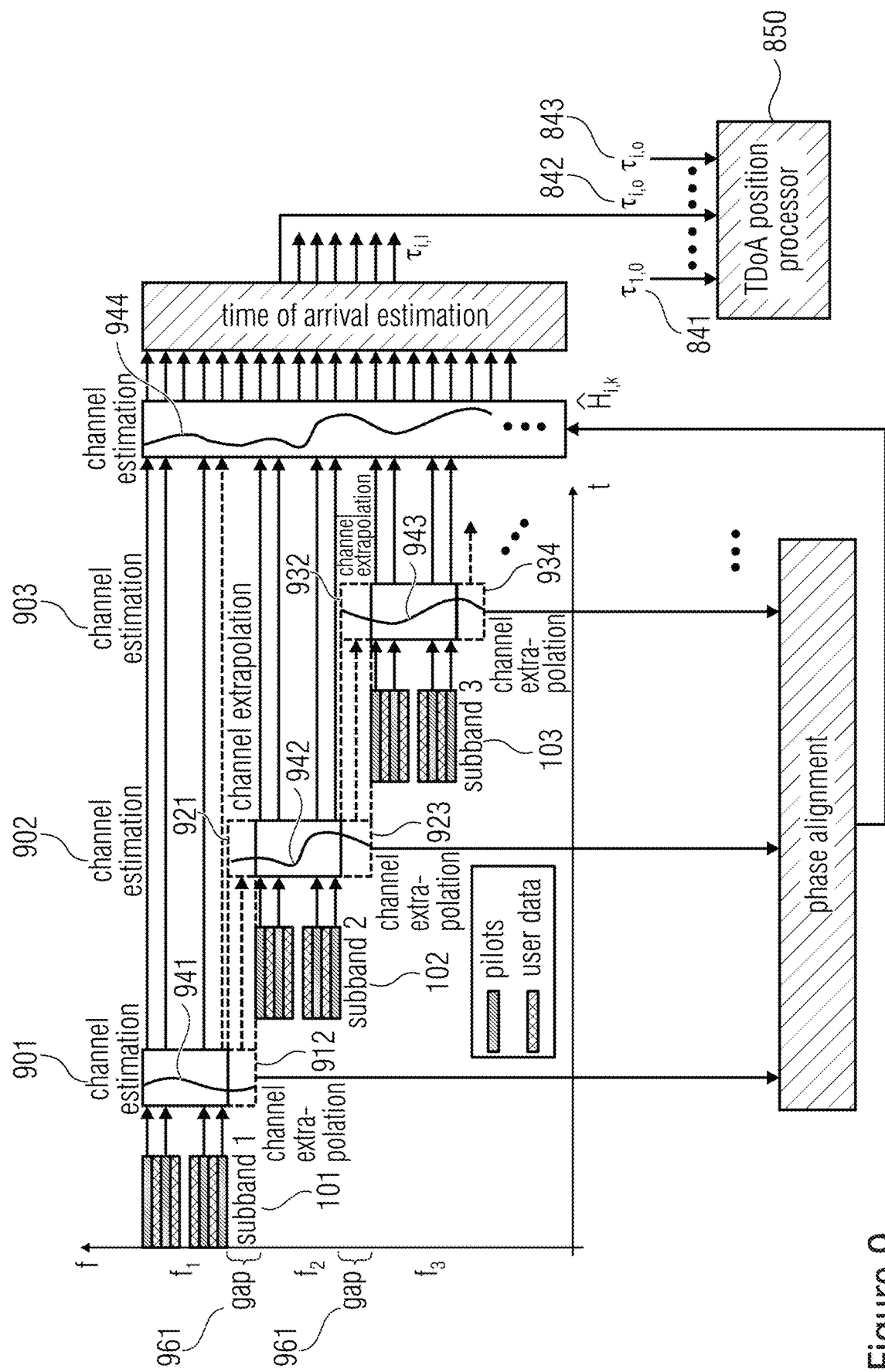
FIG. 9 shows a channel estimation and phase alignment by means of extrapolation according to an embodiment.

Examples of the present invention may also provide for sub bands 101, 102 103 that do not overlap. Such an example is shown in FIG. 9 which shows an inventive pilot-based channel extrapolation method. The example of FIG. 9 is similar to the example that has been previously described with reference to FIG. 8, except that in FIG. 9 the sub bands 101, 102, 103 do not overlap. Thus, the description of all of the common features, which have been previously described with reference to FIG. 8, are also valid for FIG. 9.

The above described method of channel transfer function alignment for broadband signals that hop over overlapped sub bands is extended herein. In the example shown in FIG. 9 non-overlapping broadband frequency sub bands 101, 102, 103 are used allowing for a wider use of the invention.

To do so the channel transfer function i.e. the channel in the (discrete) frequency domain has to be extrapolated—and not interpolated or smoothed like in the above described examples of the inventive concept. The extrapolated channels 901, 902, 903, 904 at frequency bins beyond the signal bandwidth now overlap again and allow for an alignment again.

Methods for the extrapolation of the channel transfer function may be a low pass filter, the dedicated Wiener filter or adaptive approximations of the previous.

The first may be chosen from a set of predefined extrapolators according to statistical characteristics like especially the maximum delay spread, root-mean-square delay spread or the coherence bandwidth as determined from the channel impulse response or the channel transfer function in the observation bandwidth. Note that in all frequency ranges the characteristics (delay spreads, coherence bandwidth and model order) have to be the same.

The Wiener extrapolator is adapted to the channel and signal statistic and represents the optimum linear extrapolation filter with respect to the mean square error (linear minimum mean square error). It is also generally optimal—i.e. minimum mean square error—for Gaussian observations (Gaussian channel and noise). The general basis for the Wiener filter based estimator of the channel transfer function is the power delay profile (PDP) that is the inverse discrete Fourier transform of the frequency correlation function. At least, the maximum delay spread or the coherence bandwidth shall be provided (i.e. estimated) [KayEstTheory].

Adaptive filters may be used to approximate the Wiener Filter where the channel statistics are inherently estimated (via the adaptation of the filter coefficients.). Suitable adaptive Methods are Least Mean Square (LMS) error and Recursive Least Squares (RLS) where the latter directly uses an estimate for the channel statistics.

As can be seen in the example shown in FIG. 9, the overall frequency band of the radio signal comprises a frequency band gap that is located between each adjacent sub band, i.e. there is a frequency gap 961 between the first sub band 101 and the second sub band 102, and there is a further frequency gap 962 between the second sub band 102 and the third sub band 103. Accordingly, the respective frequency sub bands 101, 102, 103 do not overlap in this example.

In order to determine the phase correlations between each frequency hop, the receiver is configured to execute a phase extrapolation 912, 921, 923, 932, 934 in order to construct virtual overlapping portions. Said extrapolation may be done during a respective channel estimation process 901, 902, 903.

Thus, according to an example, the overall frequency band of the radio signal may comprise a frequency band gap 961 that is located between the first frequency sub band 101 and the second frequency sub band 102, wherein the receiver is configured to estimate the first phase 941 within the frequency band gap 961 and the second phase 942 within the frequency band gap 961 by means of extrapolation.

According to a further example, the receiver may be configured to compare an extrapolated portion 912 of the first phase 941 within the frequency band gap 961 with an extrapolated portion 921 of the second phase 942 within the frequency band gap 961 in order to determine the overall phase basis 944 of the radio signal.

The extrapolated portions 912, 921 may comprise a relative phase shift between each other, i.e. a relative phase error. The receiver is configured to determine said phase error and to correct or compensate the phase error when combining the first and second phases 941, 942 in order to reconstruct the overall phase basis 944.

Thus, according to an example, the receiver may be configured to determine a relative phase error between the first phase 941 and the second phase 942, and to determine the overall phase basis 944 of the radio signal under compensation of the relative phase error.

In this regard, according to a further example, the receiver may be configured to coherently align the first phase 941 and the second phase 942 by a phase shift, wherein one of the first and the second phases 941, 942 serves as a reference phase for the phase shift of the other one of the first and the second phases 941, 942, in order to determine a coherent overall phase basis 944 of the radio signal.

As mentioned before, in this example the sub bands 101, 102, 103 comprise one or more pilot data being spread over the spectrum of the respective frequency sub band 101, 102, 103. As can be seen in FIG. 9, the pilot data may be evenly distributed in each of the frequency sub bands 101, 102 103. The receiver may determine a relative phase error between each hop even though the pilot data do not overlap. This is achieved by means of the above described extrapolation.

As also mentioned above, a position detection processor 850 may be configured to detect the spatial position of the receiver within a wireless communication network.

In order to achieve this, it may be possible that at least one of the first portion of the information carried in the first frequency sub band 101 or the second portion of the information in the second frequency sub band 102 contains a predetermined radio signal.

Such a predetermined radio signal may be a dedicated radio signal provided for predetermined tasks, such as a Position Reference Signal (PRS) in the downlink or a Sounding Reference Signal (SRS) in the uplink, for example.

According to an example of the present invention, such a predetermined radio signal may comprise spectral overlapping portions which may be exploited for determining the overall phase basis of two or more sub bands, as explained above. Said predetermined radio signal may be used additionally or alternatively to the embodiments described above, for example additionally or alternatively to the overlapping sub bands 101, 102 and/or additionally or alternatively to the overlapping extrapolated portions 901, 912, 921, 923, 932, 934.

Using a predetermined radio signal for reconstructing a coherent overall phase basis will be explained in the following with reference to FIGS. 17A to 21. In these Figures, a Position Reference Signal (in the following briefly referred to as PRS or M-PRS), will be discussed as one of several non-limiting examples of a predetermined radio signal. Of course other predetermined radio signals than PRS may be used instead or in addition to an exemplarily depicted PRS.

A predetermined radio signal may be characterized in that it may, for instance, be broadband with respect to the bandwidth at hand and it may allow for sampling the propagation channel in sufficient spacing in time and frequency. To do so it may, for example, be periodically inserted in the signal stream. However for instantaneous location demand (e.g. for an emergency call) it may also be non-periodic and it may be merged instantaneously in the signal stream. A sequence of predetermined radio signals may advantageously be specifically designed and defined and may optimally be unique to a radio transmitter or at least to one radio transmitter in the larger neighbourhood in terms of signal coverage for minimizing interference.

In LTE, for instance, a PRS may be transmitted over a bandwidth of up to one hundred Physical Resource Blocks (PRBs). One PRB corresponds to a bandwidth of 180 kHz. Such a PRS may in the following be referred to as a broadband PRS or simply a PRS.

In other scenarios, such as in the so-called MTC (Machine Type Communication) or mMTC (massive Machine Type Communication), a PRS may be transmitted over a bandwidth of six PRBs. In the so-called NB-IOT (Narrow Band Internet of Things) a PRS may even be transmitted over a bandwidth of only one PRB. This may represent the maximum effective bandwidth (for data transmission as well as for signaling and synchronizing tasks) that may be available for the respective MTC UEs, NB-IOT UEs. Thus, a PRS in MTC, mMTC, NB-IOT and the like may in the following also be referred to as a narrow band PRS or an M-PRS.

Furthermore, a base station (e.g. BS, eNB, gNB, etc.) may be configured for transmitting a broadband PRS and a narrow band M-PRS. For example in LTE Rel. 14 both signals are created such that they are identical in their overlapping spectral portions. In other words, the M-PRS is based on the (LTE) PRS, i.e., the M-PRS represents a section or a snippet of the PRS in the frequency domain.

While the base station may transmit one or more broadband PRS, the MTC UEs may only comprise a reduced receiving bandwidth compared to the base station. Thus, in order to receive the complete transmitted broadband radio signal a frequency hopping method may be used in which portions of the radio signal are transmitted in narrow frequency sub bands, wherein the receiver is configured to receive said narrow frequency sub bands. The receiver may have to detune its PLL to receive different narrow frequency sub bands. However, said detuning may result in a random phase shift, also referred to as a relative phase error, between two received narrow frequency sub bands.

According to the invention, the receiver may be configured to determine the relative phase error between the received signals on these two narrow frequency sub bands and to determine a phase coherency, also referred to as a coherent overall phase basis, under compensation of the relative phase error. According to this aspect of the invention the receiver may exploit spectrally overlapping spectral portions of predetermined radio signals, such as PRS, M-PRS and the like, for determining the relative phase error between two narrow frequency sub bands and to establish the coherent overall phase basis.

In result, the bandwidth may be virtually broadened over several frequency hops. According to theory, the bandwidth enlargement allows for a more precise estimation of times of arrival (ToA or TDoA). Also the estimation of the direction or angle (Angle of Arrival; AoA), and combined estimations of times of arrival and angles of arrival, as well as direct position detection may profit from an enlargement of bandwidth and measurement frequency.

For example a frequency hopping method similar or identical to the ones described above may be used for providing a more robust and reliable estimation of the receiving timing of a PRS or an M-PRS. Transmission and receipt of a PRS and/or an M-PRS may take place during the first time period $T_1$ in the first narrow frequency sub band 101, while it may take place during the second time period $T_2$ in the second narrow frequency sub band 102. Currently, up to four narrow frequency sub bands 101, 102, 103, 104 may be defined whereas it may be periodically switched between those four frequency sub bands 101, 102, 103, 104. However, even though only two narrow frequency sub bands 101, 102 may be discussed in the following as non-limiting examples, the present invention may cover more than two and even more than four frequency sub bands which will be useable in forthcoming radio networks and standards.

In the examples which will be described in the following, it is assumed that the coherency time of the radio channel may be greater than the depicted signal period.

Figure 17A:
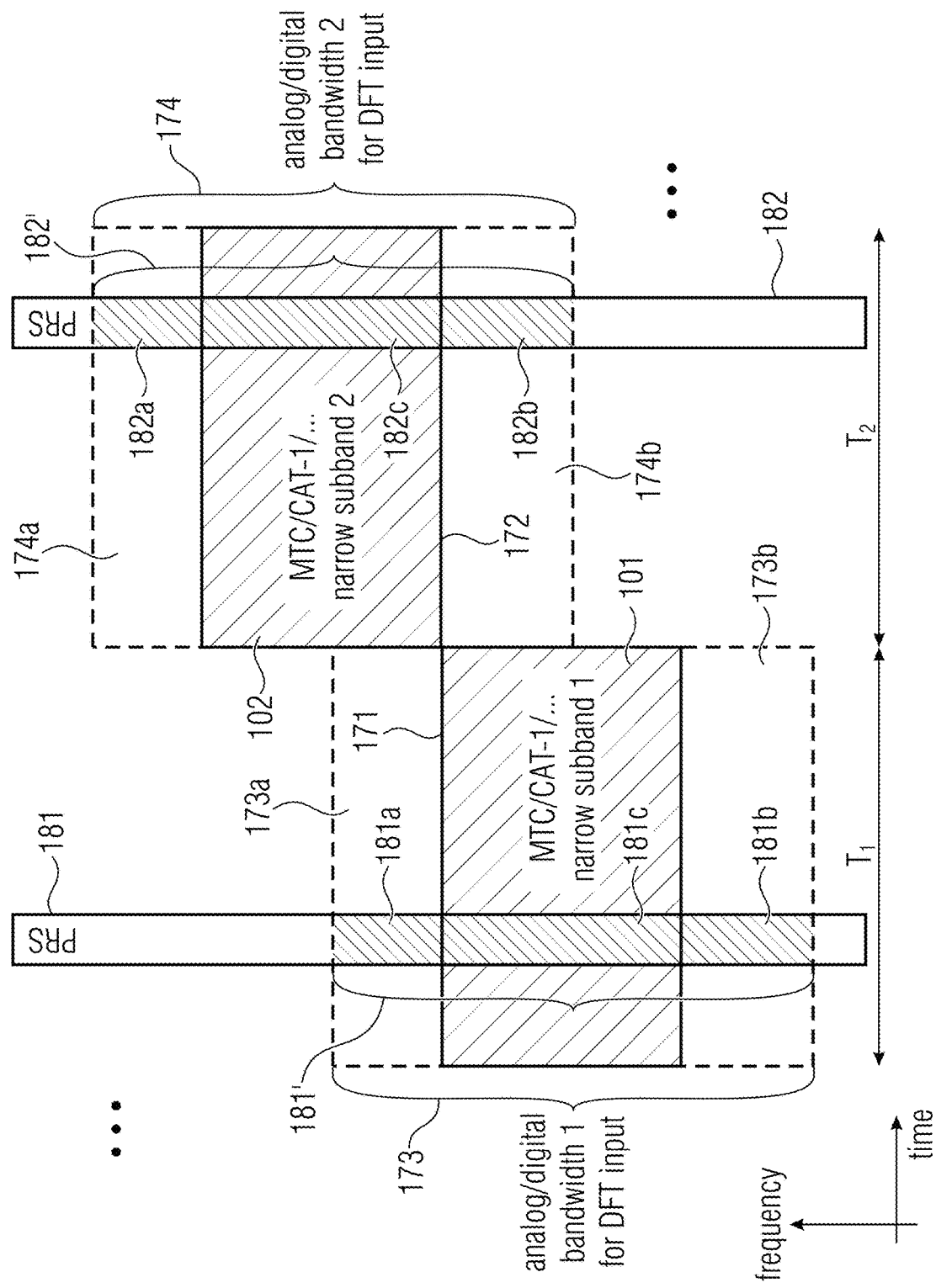
FIG. 17A shows a first example of an inventive receiver using predetermined broadband radio signals.

FIG. 17A shows a first example in which two broadband PRS may be used for establishing a coherent overall phase basis in frequency hopping transmission schemes according to the inventive principle.

FIG. 17A shows a first frequency sub band 101 and a second frequency sub band 102 which may correspond to the frequency sub bands 101, 102 discussed above. As can be seen, the first and second frequency sub bands 101, 102 may, however, not spectrally overlap in the frequency domain. Instead, an upper bandwidth-end 171 of the first frequency sub band 101 may abut to a lower bandwidth-beginning 172 of the second frequency sub band 102. It may also be possible that a band gap (not explicitly shown here) may exist between the first and second frequency sub bands 101, 102. However, as mentioned above, according to this specific example of the invention, the frequency sub bands 101, 102 themselves may not comprise any spectral overlapping portions.

As can be seen in FIG. 17A, two predetermined radio signals 181, 182, which may have been previously transmitted by a base station, may be received by the inventive receiver. The predetermined radio signals 181, 182 are exemplarily depicted as non-limiting examples by means of two PRS 181, 182. A first PRS 181 may be received during the first time period $T_1$. In this example, the first PRS 181 is received during receipt of the first frequency sub band 101. A second PRS 182 may be received during the second time period $T_2$. In this example, the second PRS 182 is received during receipt of the second frequency sub band 102.

The first PRS 181 may comprise a bandwidth that is larger than the bandwidth of the first frequency sub band 101. Furthermore, the second PRS 182 may comprise a bandwidth that is larger than the bandwidth of the second frequency sub band 102. In the example shown in FIG. 17A both PRS 181, 182 comprise the same bandwidth. Furthermore, both PRS 181, 182 may comprise a bandwidth that is larger than the bandwidth of the first and second frequency sub bands 101, 102 together.

The receiver of this example of the invention is tuneable to at least the center frequencies $f_1$ and $f_2$ of the first and second frequency sub bands 101, 102 covering a bandwidth of at least the bandwidth of the first and second frequency sub bands 101, 102 and optionally a reserve. For example, the receiver may comprise a first receiving bandwidth 173 that may cover the first frequency sub band 101 and optionally a spectral portion 173a above the first frequency sub band 101 and/or a spectral portion 173b below the first frequency sub band 101. In case a DFT is used, the overall bandwidth 173 comprising the first frequency sub band 101 and optionally the spectral portions 173a, 173b above and/or below the first frequency sub band 101 may also be referred to as a first DFT bandwidth 173 around the first center frequency $f_1$ of the first frequency sub band 101.

The same holds true for the second frequency sub band 102. Accordingly, the receiver may comprise a second receiving bandwidth 174 to which it may be detuned. The second receiving bandwidth 174 may cover the second frequency sub band 102 and optionally a spectral portion 174a above the second frequency sub band 102 and/or a spectral portion 174b below the second frequency sub band 102. In case a DFT is used, the overall bandwidth 174 comprising the second frequency sub band 102, and optionally the spectral portions 174a, 174b above and/or below the second frequency sub band 102, may also be referred to as a second DFT bandwidth 174 around the second center frequency $f_2$ of the second frequency sub band 102.

Furthermore, the first frequency sub band 101 and the second frequency sub band 102 may each comprise zero-carriers in their upper and lower frequency zones 173a, 173b, 174a, 174b.

As can be seen, the first receiving bandwidth 173 and the second receiving bandwidth 174 may spectrally overlap. For example, the upper spectral portion 173a of the first receiving bandwidth 173 may spectrally overlap with the lower spectral portion 174b of the second receiving bandwidth 174. These spectrally overlapping portions 173a, 174b may be used for determining the overall phase coherency or coherent overall phase base, as will be described in more detail in the following passages.

Referring back to the PRS 181, 182 depicted in FIG. 17A, it can be seen that the two PRS 181, 182 have a larger bandwidth than each of the above discussed respective first and second receiving bandwidths 173, 174 of the inventive receiver.

Accordingly, the inventive receiver may be configured to receive at least a spectral portion 181' of the first PRS 181. Said spectral portion 181' of the first PRS 181 is the spectral portion that is covered by the first receiving bandwidth 173 of the receiver. Said spectral portion 181' of the first PRS 181 is indicated with hatched lines in FIG. 17A.

The inventive receiver may also be configured to receive at least a spectral portion 182' of the second PRS 182. Said spectral portion 182' of the second PRS 182 is the spectral portion that is covered by the second receiving bandwidth 174 of the receiver. Said spectral portion 182' of the second PRS 182 is indicated with hatched lines in FIG. 17A.

Thus, according to an embodiment, the receiver may be configured to receive at least a spectral portion 181' of the first predetermined radio signal 181 during the first time period $T_1$, and to receive at least a spectral portion 182' of the second predetermined radio signal 182 during the second time period $T_2$, wherein the bandwidth of the first predetermined radio signal 181 is larger than the bandwidth of the first frequency sub band 101 and includes the first frequency sub band 101, and wherein the bandwidth of the second predetermined radio signal 182 is larger than the bandwidth of the second frequency sub band 102 and includes the second frequency sub band 102.

In other words, the first PRS 181 may be a broadband PRS having a broader bandwidth than the bandwidth of the first frequency sub band 101. Accordingly, the fist PRS 181 and the first frequency sub band 101 may share a spectral portion of the bandwidth, which is depicted in FIG. 17A by the spectral portion 181c of the first PRS 181 extending through the first frequency sub band 101. Accordingly, the bandwidth of the first PRS 181 may include the bandwidth of the first frequency sub band 101.

Furthermore, the first PRS 181 may also comprise a broader bandwidth than the bandwidth of the first receiving frequency 173. Accordingly, the first PRS 181 and the first receiving frequency 173 may share the bandwidth of the first frequency sub band 101 and optionally one or more spectral portions 181*a*, 181*b* above and/or below the first frequency sub band 101. Thus, the bandwidth of the first PRS 181 may include the bandwidth of the first receiving frequency 173.

The second PRS 182 may also be a broadband PRS having a broader bandwidth than the bandwidth of the second frequency sub band 102. The second PRS 182 and the second frequency sub band 102 may share a spectral portion of the bandwidth, which is depicted in FIG. 17A by the spectral portion 182*c* of the second PRS 182 extending through the second frequency sub band 102. Accordingly, the bandwidth of the second PRS 182 may include the bandwidth of the second frequency sub band 102.

Furthermore, the second PRS 182 may also comprise a broader bandwidth than the bandwidth of the second receiving frequency 174. Accordingly, the second PRS 182 and the second receiving frequency 174 may share the bandwidth of the second frequency sub band 102 and optionally one or more spectral portions 182*a*, 182*b* above and/or below the second frequency sub band 102. Thus, the bandwidth of the second PRS 182 may include the bandwidth of the second receiving frequency 174.

It may also be possible that the bandwidth of the first broadband PRS 181 includes the bandwidth of both the first and second frequency sub bands 101, 102. Additionally or alternatively, the bandwidth of the second broadband PRS 182 may include the bandwidth of both the first and second frequency sub bands 101, 102.

As mentioned above, the receiver may be configured to receive the first frequency sub band 101 and a spectral portion 181*c* of the first PRS 181 which is located inside the first frequency sub band 101. Additionally, the receiver may receive one or more spectral portions 181*a*, 181*b* of the first PRS 181 located above and/or below the first frequency sub band 101 since the receiver's first receiving bandwidth 173 is larger than the bandwidth of the first frequency sub band 101. In other words, the receiver may receive one or more spectral portions 181*a*, 181*b* of the first PRS 181 which may be located outside the first frequency sub band 101 but inside of the receiver's first receiving bandwidth 173. In particular, the receiver may receive a spectral portion 181*a* of the first PRS 181 located outside and above (i.e. higher frequency) the first frequency sub band 101. Additionally or alternatively, the receiver may receive a spectral portion 181*b* of the first PRS 181 located outside and below (i.e. lower frequency) the first frequency sub band 101.

The same holds true for the second PRS 182 received in the second receiving bandwidth 174 of the receiver. In this example, the receiver may be configured to receive the second frequency sub band 102 and a spectral portion 182*c* of the second PRS 182 which is located inside the second frequency sub band 102. Additionally, the receiver may receive one or more spectral portions 182*a*, 182*b* of the second PRS 182 located above and/or below the second frequency sub band 102 since the receiver's second receiving bandwidth 174 is larger than the bandwidth of the second frequency sub band 102. In other words, the receiver may receive one or more spectral portions 182*a*, 182*b* of the second PRS 182 which are located outside the second frequency sub band 102 but inside of the receiver's second receiving bandwidth 174. In particular, the receiver may receive a spectral portion 182*a* of the second PRS 182 located outside and above (i.e. higher frequency) the second frequency sub band 102. Additionally or alternatively, the receiver may receive a spectral portion 182*b* of the second PRS 182 located outside and below (i.e. lower frequency) the second frequency sub band 102.

The inventive receiver may be configured to perform a channel estimation in each of its above described first and second receiving bandwidths 173, 174 for determining the relative phase error between the first and second frequency sub bands 101, 102 and to determine the overall coherent phase basis under compensation of the relative phase error. Spectrally overlapping spectral portions 181*a*, 181*b*, 181*c*, 182*a*, 182*b*, 182*c* of the first and second PRS 181, 182 may be used for determining the coherent overall phase basis, as will be described in more detail in the following passages.

According to an example for exploiting said spectrally overlapping spectral portions 181*a*, 181*b*, 181*c*, 182*a*, 182*b*, 182*c* of the PRS 181, 182, an inventive receiver may be configured to perform the channel estimation of the first frequency sub band 101 in its first receiving frequency band 173 spectrally covering the first frequency sub band 101 and at least a spectral portion 181*a*, 181*b* of the first predetermined radio signal 181 located outside the first frequency sub band 101, and to perform the channel estimation of the second frequency sub band 102 in its second receiving frequency band 174 spectrally covering the second frequency sub band 102 and at least a spectral portion 182*c* of the second predetermined radio signal 182 located inside the second frequency sub band 102, wherein said spectral portion 181*a*, 181*b* of the first predetermined radio signal 181 located outside the first frequency sub band 101 spectrally overlaps with said spectral portion 182*c* of the second predetermined radio signal 182 located inside the second frequency sub band 102.

Figure 17B:
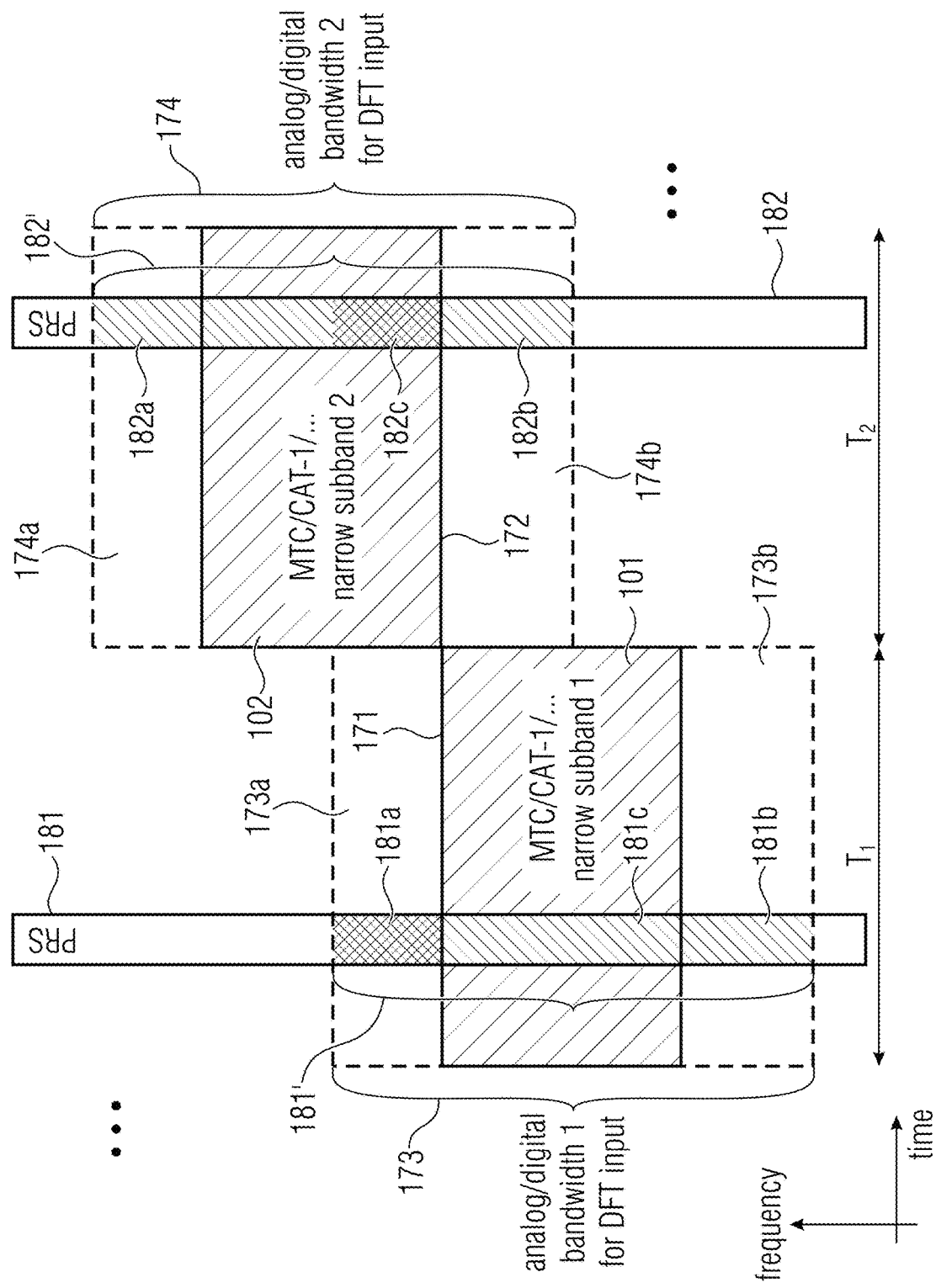
FIG. 17B shows a second example of an inventive receiver using predetermined broadband radio signals.

Such an example is shown in FIG. 17B, wherein the above mentioned spectrally overlapping spectral portions 181*a*, 182*c* of the first and second PRS 181, 182 which may spectrally overlap in (at least parts of) e.g. the second frequency sub band 102 are highlighted with cross-hatched lines, while any spectral portions of the PRS 181, 182 that may not spectrally overlap in (at least parts of) e.g. the second frequency sub band 102 may be indicated by simple single-hatched lines. For example, the spectral portion 181*a* of the first predetermined radio signal 181 located outside and above the first frequency sub band 101 and at least a portion of the spectral portion 182*c* of the second predetermined radio signal 182 located inside the second frequency sub band 102 may spectrally overlap.

Figure 17C:
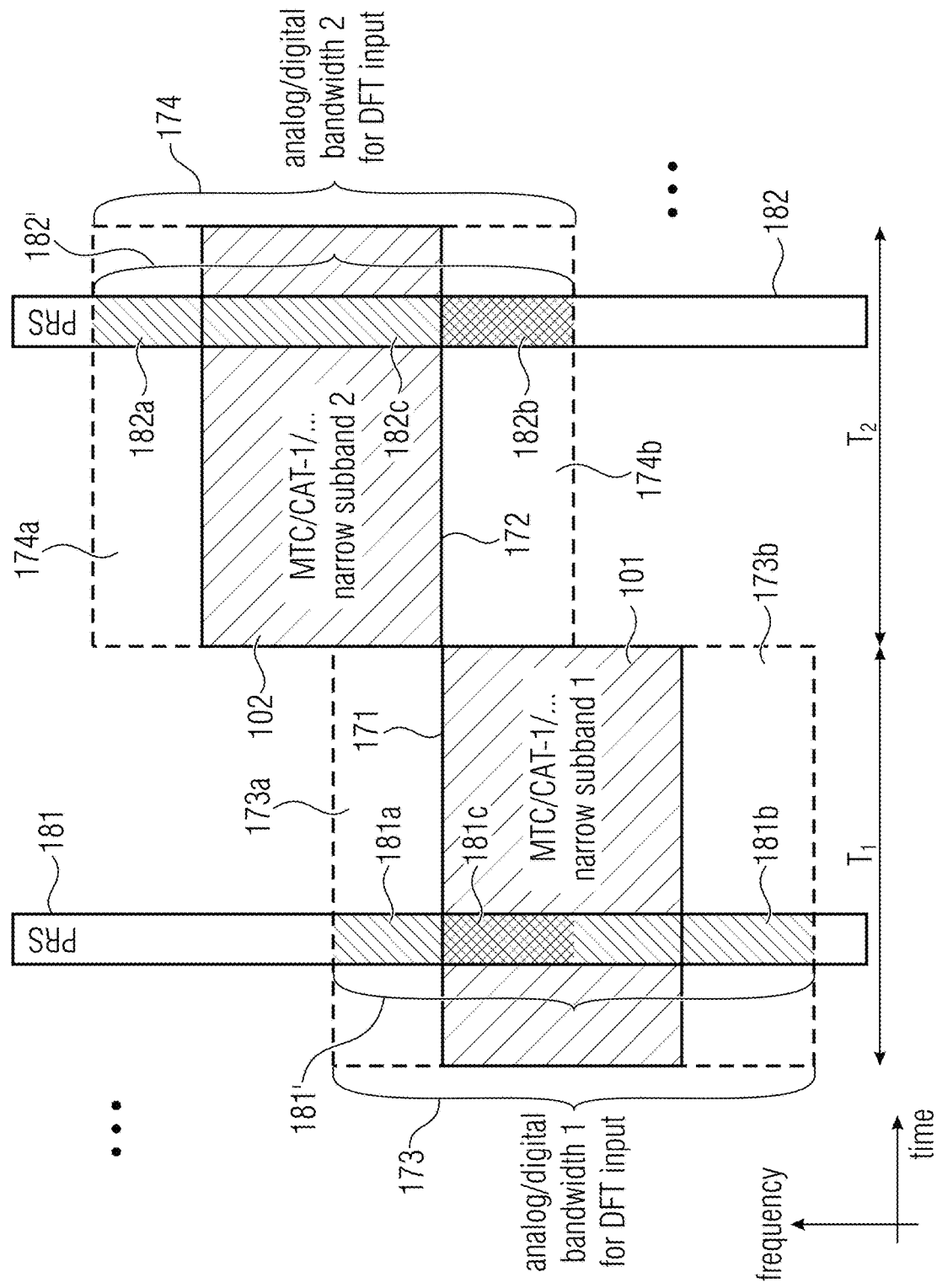
FIG. 17C shows a third example of an inventive receiver using predetermined broadband radio signals.

According to a further example, which is shown in FIG. 17C, the receiver may be configured to perform the channel estimation of the first frequency sub band 101 in its first receiving frequency band 173 spectrally covering the first frequency sub band 101 and at least a spectral portion 181*c* of the first predetermined radio signal 181 located inside the first frequency sub band 101, and to perform the channel estimation of the second frequency sub band 102 in its second receiving frequency band 174 spectrally covering the second frequency sub band 102 and at least a spectral portion 182*a*, 182*b* of the second predetermined radio signal 182 located outside the second frequency sub band 102, wherein said spectral portion 181*c* of the first predetermined radio signal 181 located inside the first frequency sub band 101 spectrally overlaps with said spectral portion 182*a*, 182*b* of the second predetermined radio signal 182 located outside the second frequency sub band 102.

In FIG. 17C, the above mentioned spectrally overlapping spectral portions 181*c*, 182*b* of the first and second PRS 181, 182 which may spectrally overlap in (at least parts of) the first frequency sub band 101 are highlighted with cross-hatched lines, while any spectral portions of the PRS 181, 182 that may not spectrally overlap in (at least parts of) e.g. the first frequency sub band 101 may be indicated by simple single-hatched lines. For example, the spectral portion 182*b* of the second predetermined radio signal 182 located outside and below the second frequency sub band 102 and at least a portion of the spectral portion 181*c* of the first predetermined radio signal 181 located inside the first frequency sub band 101 may spectrally overlap.

In both examples shown in FIGS. 17B and 17C the receiver may receive spectral portions 181*a*, 181*b*, 181*c*, 182*a*, 182*b*, 182*c* of the two PRS 181, 182 which are at least partially spectrally overlapping themselves. The receiver may use said spectrally overlapping portions 181*a*, 181*b*, 181*c*, 182*a*, 182*b*, 182*c* of the PRS 181, 182 for determining the relative phase error and to determine the coherent overall phase basis.

In other words, the receiver may be configured to compare the first phase with the second phase and to align the first and second phases to determine the overall phase basis, said aligning being based on one or more of the spectrally overlapping spectral portions 181*a*, 181*b*, 181*c*, 182*a*, 182*b*, 182*c* of the first and second predetermined radio signals 181, 182.

It is comprehensible that establishing the phase coherency (i.e. the coherent overall phase basis) improves if the amount of spectral overlap between the first and second PRS 181, 182 increases. Thus, according to yet a further example, the inventive receiver may exploit two or more of the above described spectrally overlapping portions of the first and second PRS 181, 182.

Figure 17D:
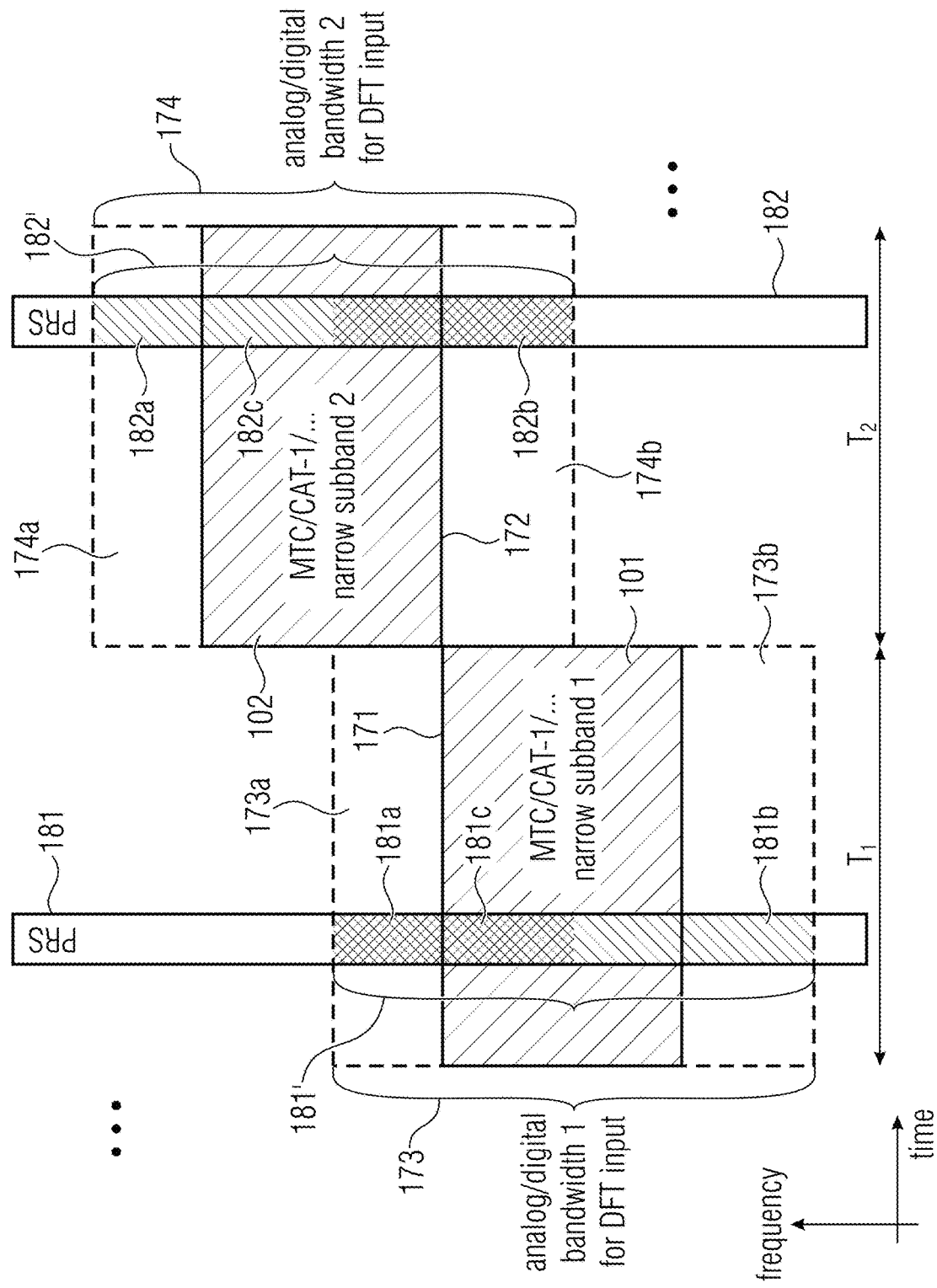
FIG. 17D shows a fourth example of an inventive receiver using predetermined broadband radio signals.

Such an example is depicted in FIG. 17D, wherein the spectrally overlapping spectral portions 181*a*, 181*c* of the first PRS 181 and the corresponding spectrally overlapping spectral portions 182*b*, 182*c* of the second PRS 182 which may spectrally overlap in (at least parts of) the first and second frequency sub bands 101, 102, respectively, are again highlighted by means of cross-hatched lines, while any spectral portions of the PRS 181, 182 that may not spectrally overlap in (at least parts of) the first and second frequency sub bands 101, 102, respectively, may be indicated by simple single-hatched lines.

According to this example, the receiver may be configured to perform the channel estimation of the first frequency sub band 101 in its first receiving frequency band 173 spectrally covering the first frequency sub band 101 and a spectral portion 181*c* of the first predetermined radio signal 181 located inside the first frequency sub band 101 and a spectral portion 181*a* of the first predetermined radio signal 181 located outside the first frequency sub band 101, and to perform the channel estimation of the second frequency sub band 102 in its second receiving frequency band 174 spectrally covering the second frequency sub band 102 and a spectral portion 182*b* of the second predetermined radio signal 182 located outside the second frequency sub band 102 and a spectral portion 182*c* of the second predetermined radio signal 182 located inside the second frequency sub band 102, wherein said spectral portion 181*c* of the first predetermined radio signal 181 located inside the first frequency sub band 101 spectrally overlaps with said spectral portion 182*b* of the second predetermined radio signal 182 located outside the second frequency sub band 102 and wherein said spectral portion 181*b* of the first predetermined radio signal 181 located outside the first frequency sub band 101 spectrally overlaps with said spectral portion 182*c* of the second predetermined radio signal 182 located inside the second frequency sub band 102.

Accordingly, the receiver may use said spectrally overlapping spectral portions 181*a*, 181*c*, 182*b*, 182*c* of the first and second PRS 181, 182 for determining the relative phase error and to determine the coherent overall phase basis. In all of the above described examples described with reference to FIGS. 17A to 17D the coherent overall phase basis may be established in the same way as previously discussed with reference to FIGS. 8 and 9 for example.

In other words, the receiver may be configured to compare the first phase with the second phase and to align the first and second phases to determine the overall phase basis, said aligning being based on one or more of the spectrally overlapping spectral portions 181*a*, 181*c*, 182*b*, 182*c* of the first and second predetermined radio signals 181, 182.

Figure 17E:
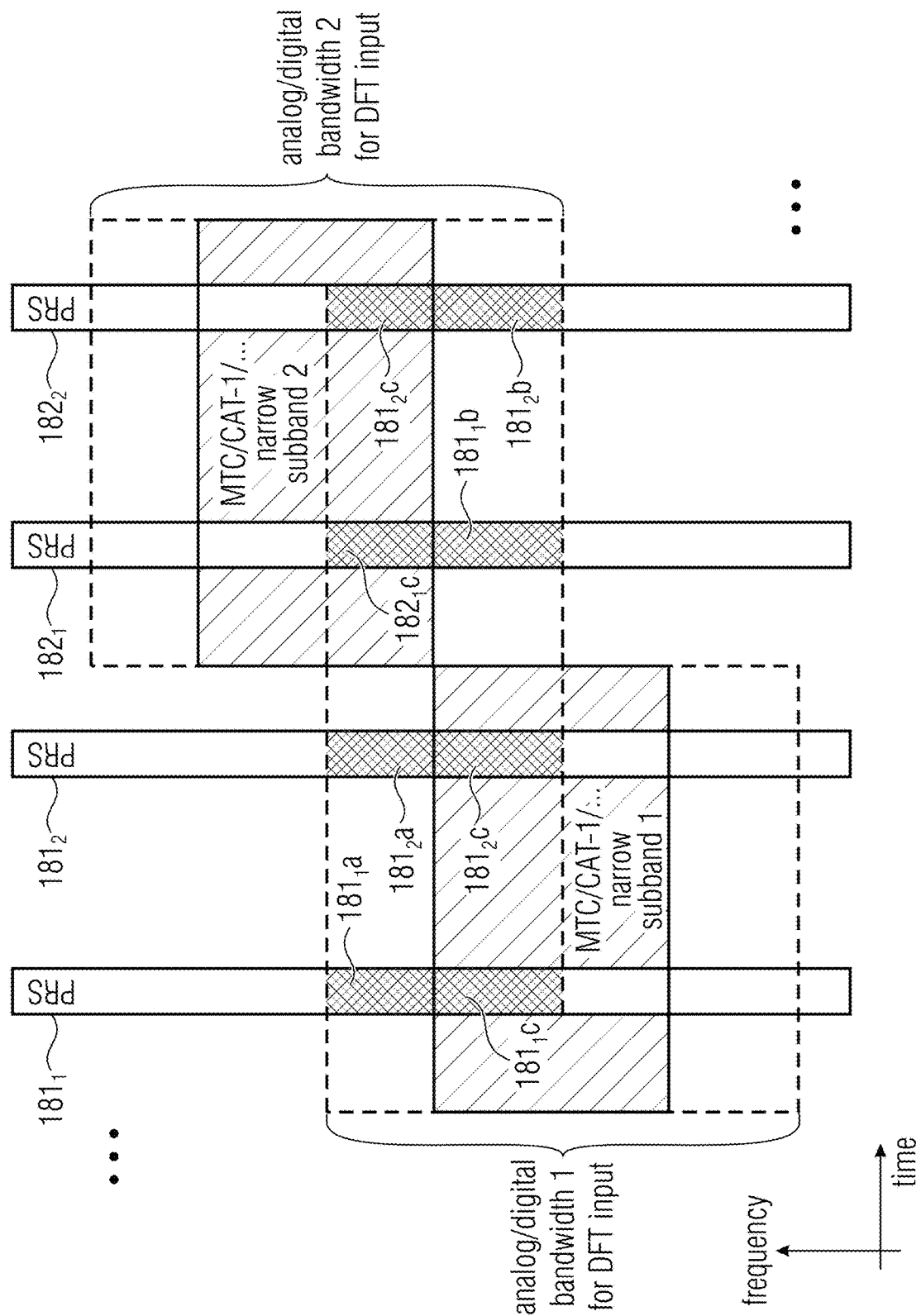
FIG. 17E shows a fifth example of an inventive receiver using predetermined broadband radio signals.

FIG. 17E shows a further example of an inventive receiver which may be configured to receive two predetermined radio signals $181_1$, $181_2$ during the first time period $T_1$, and to receive two predetermined radio signals $182_1$, $182_2$ during the second time period $T_2$. This example may substantially be similar or identical to the examples previously discussed above with reference to FIGS. 17A to 17D. Thus, same reference numerals are used for the same features. However, the example shown in FIG. 17E may differ from the previously described examples of FIGS. 17A to 17D by the two predetermined radio signals $181_1$, $181_2$, $182_1$, $182_2$ received during each of the time periods $T_1$, $T_2$.

The two predetermined radio signals $181_1$, $181_2$ received during the first time period $T_1$ comprise spectral portions $181_1a$, $181_1c$, $181_2a$, $181_2c$ which spectrally overlap with corresponding spectral portions $182_1b$, $182_1c$, $182_2b$, $182_2c$ of the two predetermined radio signals $182_1$, $182_2$ received during the second time period $T_2$. The spectrally overlapping spectral portions $181_1a$, $181_1c$, $181_2a$, $181_2c$, $182_1b$, $182_1c$, $182_2b$, $182_2c$ of the two predetermined radio signals $182_1$, $182_2$ which may spectrally overlap in (at least parts of) the first and second frequency sub bands 101, 102, respectively, are shown in FIG. 17E in cross-hatched lines, while any spectral portions of the PRS 181, 182 that may not spectrally overlap in (at least parts of) the first and second frequency sub bands 101, 102, respectively, may be indicated by simple single-hatched lines.

This example of an inventive receiver may be more robust since it is configured to receive double the amount of spectral overlapping portions of the predetermined radio signals compared with the examples described with reference to FIGS. 17A to 17D.

Figure 18:
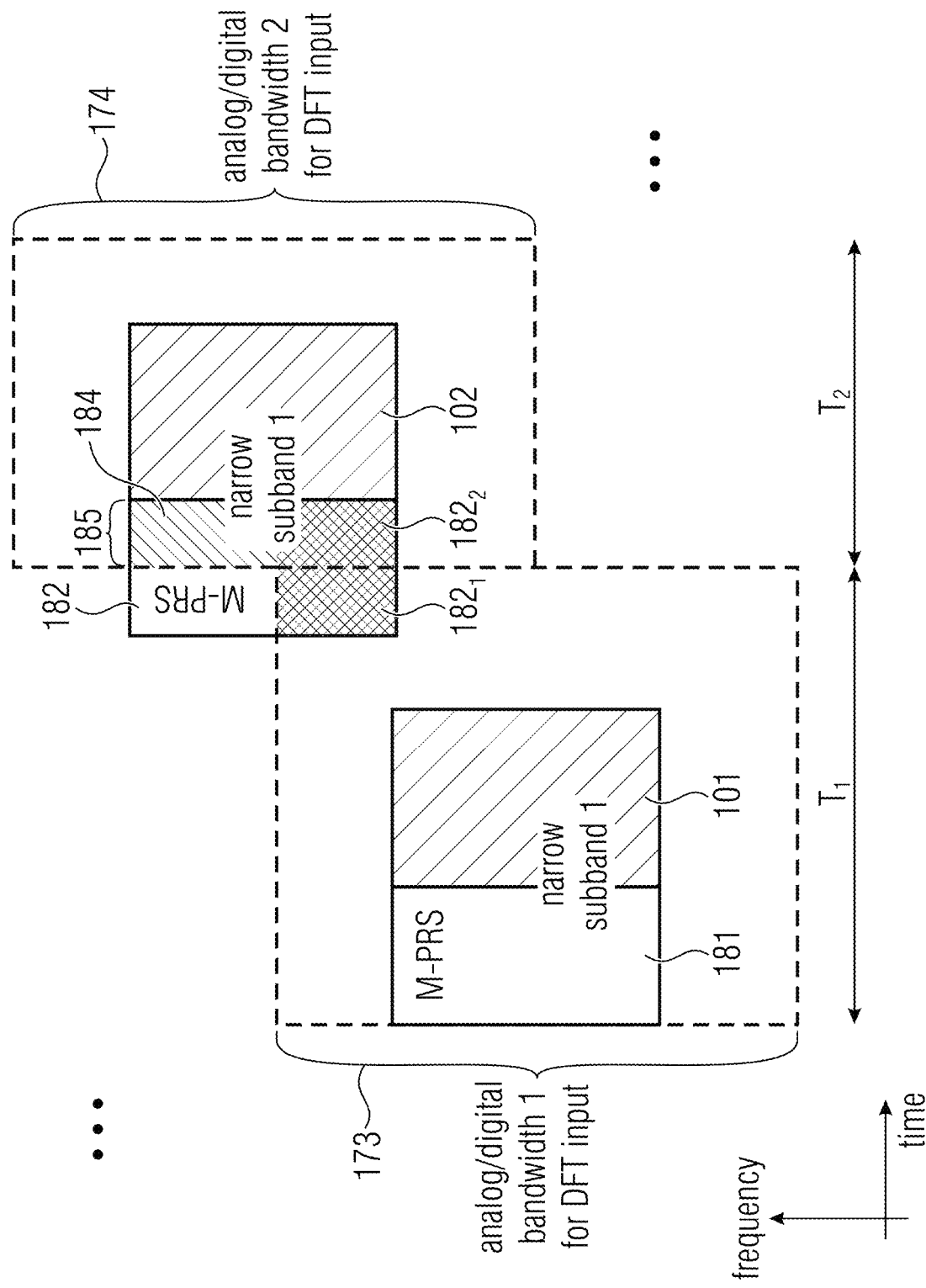
FIG. 18 shows an example of an inventive receiver using predetermined narrow band radio signals with overlapping spectral portions in the time domain.

FIG. 18 shows a further example of an inventive receiver. This inventive receiver may be configured to receive narrow band predetermined radio signals that may be referred to as M-PRS. The receiver may receive during the first time period $T_1$ a first narrow band M-PRS 181, and it may receive during the second time period $T_2$ a second narrow band M-PRS 182.

The first M-PRS 181 may be located inside the first frequency sub band 101. The first M-PRS 181 may comprise a bandwidth that is equal to or less than the bandwidth of the first frequency sub band 101.

The second M-PRS 182 may be located inside the second frequency sub band 102. The second M-PRS 182 may comprise a bandwidth that is equal to or less than the bandwidth of the second frequency sub band 102.

The first and second M-PRS 181, 182 may be located at least partially inside the first and second frequency sub bands 101, 102, respectively. Or stated in another way, the first and second M-PRS 181, 182 may at least partially extend beyond the first and second frequency sub bands 101, 102, respectively, with respect to the frequency domain.

However, in the non-limiting example shown in FIG. 18, the first M-PRS 181 is located inside the first frequency sub band 101 and the second M-PRS 182 is located inside the second frequency sub band 102.

Furthermore, the receiver may comprise a first receiving bandwidth 173 that is broader than the bandwidth of the first frequency sub band 101 and covers the first frequency sub band 101. Since the first M-PRS 181 may be located inside the first frequency sub band 101, the first receiving bandwidth 173 may also cover the first M-PRS 181. The receiver may further comprise a second receiving bandwidth 174 that is broader than the bandwidth of the second frequency sub band 102 and covers the second frequency sub band 102. Since the second M-PRS 182 may be located inside the second frequency sub band 102, the second receiving bandwidth 174 may also cover the second M-PRS 182.

In comparison to the examples discussed above with reference to FIGS. 17A to 17D the M-PRS 181, 182 may not comprise mutually spectrally overlapping spectral portions in the frequency domain. However, the second M-PRS 182 may comprise a spectral portion $182_1$, $182_2$ that may be included in the first receiving bandwidth 173 and included in the second receiving bandwidth 174 of the receiver. This spectral portion $182_1$, $182_2$ is highlighted in FIG. 18 by means of cross-hatched lines, while any non-overlapping spectral portions may be indicated by simple single-hatched lines.

As can be seen, the first receiving frequency bandwidth 173 spectrally covers a spectral portion $182_1$ of the second M-PRS 182 contained in the second frequency sub band 102. This spectral portion $182_1$ of the second M-PRS 182 is received during the first time period $T_1$. This can be achieved in that the PLL of the receiver is detuned with some delay such that the receiver is still configured to receive in the first receiving band 173 while the transmitter (e.g. Base Station, eNB) already transmitted the next signal, or signal portion, in the second frequency sub band 102. Since the bandwidth of the first receiving band 173 spectrally covers at least a portion of the second frequency sub band 102 comprising the second M-PRS 182, the receiver is configured to receive at least the aforementioned spectral portion $182_1$ of the second M-PRS 182 during the first time period $T_1$.

The receiver according to this example may further be configured to receive during the second time period $T_2$ at least a portion of the second M-PRS 182. In this example, the receiver is configured to receive during the second time period $T_2$ the complete spectrum 184 of the second M-PRS 182 in the frequency domain, but only a portion 185 of the second M-PRS 182 in the time domain.

As can be seen in FIG. 18, the receiver may be configured to receive during the second time period $T_2$ at least a spectral portion $182_2$ of the complete spectrum 184 of the second M-PRS 182 which spectrally overlaps with the first spectral portion $182_1$ of the second M-PRS 182 received during the first time period $T_1$.

According to this example, the receiver may be configured to receive during the second time period $T_2$ at least a spectral portion $182_2$ of a predetermined radio signal 182, the predetermined radio signal 182 being spectrally located inside the second frequency sub band 102, and to receive during the first time period $T_1$ a spectral portion $182_1$ of said predetermined radio signal 182, wherein the spectral portion $182_1$ received during the first time period $T_1$ spectrally overlaps with the spectral portion $182_2$ received during the second time period $T_2$.

Also in this example, the receiver may be configured to perform a channel estimation for each channel, i.e. for each frequency sub band 101, 102, using the first and second receiving frequency bands 173, 174.

Thus, according to an example, the receiver may be configured to perform the channel estimation of the first frequency sub band 101 in its first receiving frequency band 173 spectrally covering the first frequency sub band 101 and the spectral portion $182_1$ of the predetermined radio signal 182 received during the first time period $T_1$, and to perform the channel estimation of the second frequency sub band 102 in its second receiving frequency band 174 spectrally covering the second frequency sub band 102 and the spectral portion $182_2$ of the predetermined radio signal 182 received during the second time period $T_2$ which spectral portion $182_2$ spectrally overlaps with the spectral portion $182_1$ of the predetermined radio signal 182 received during the first time period $T_1$.

The receiver may use the spectrally overlapping portions $182_1$, $182_2$ of the second M-PRS 182 received during the first and second time periods $T_1$, $T_2$ for determining the relative phase error between the first and second sub bands 101, 102 in order to determine the coherent overall phase basis under compensation of the relative phase error.

Thus, according to yet a further example, the receiver may be configured to compare the first phase with the second phase and to align the first and second phases to determine the overall phase basis, said aligning being based on the spectrally overlapping spectral portions $182_1$, $182_2$ of the predetermined radio signal 182 received during the first and second time periods $T_1$, $T_2$.

Figure 19:
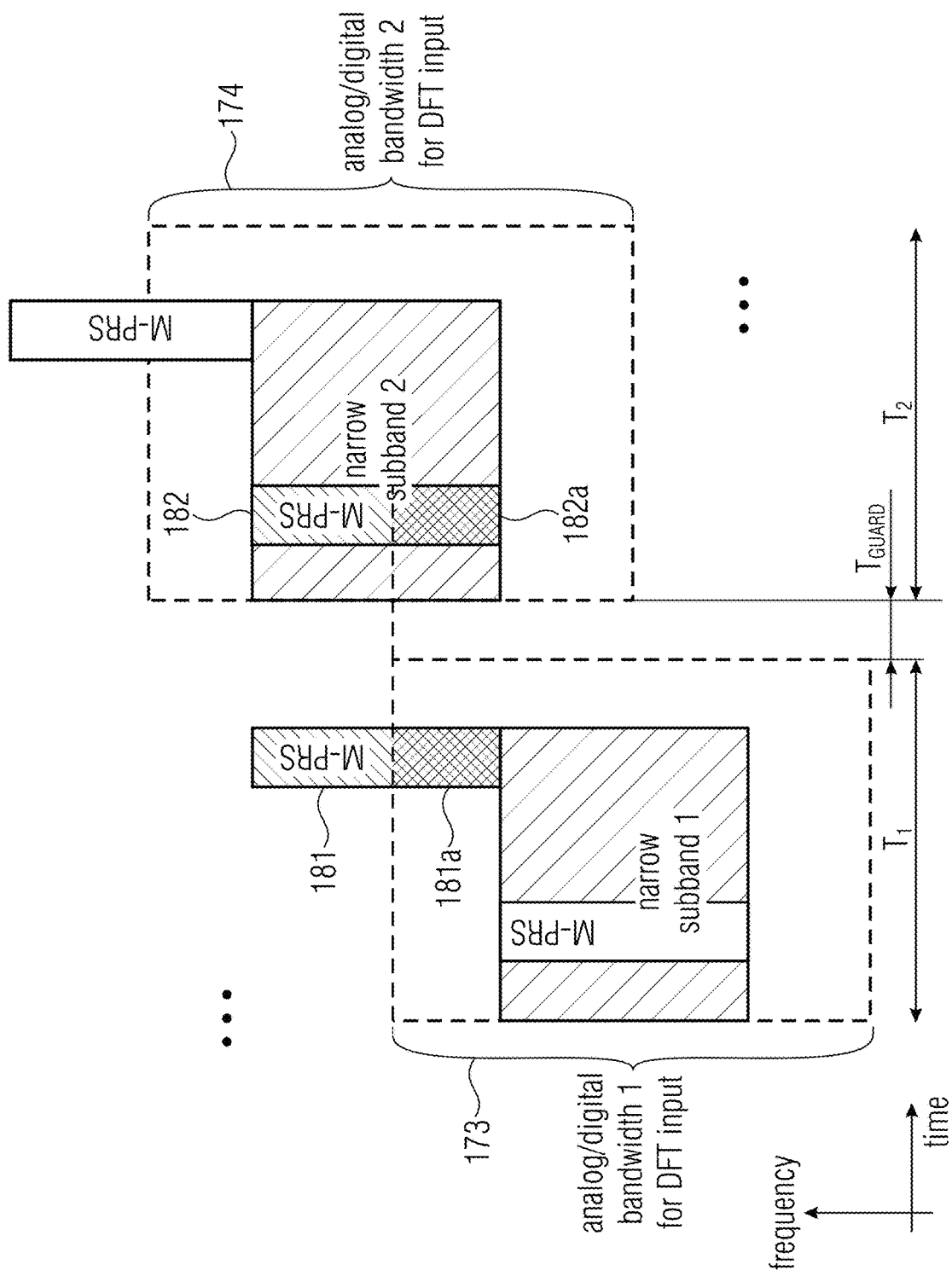
FIG. 19 shows an example of an inventive receiver using two predetermined narrow band radio signals with overlapping spectral portions.

FIG. 19 shows a further example of an inventive receiver, which may be a combination of at least some parts of the examples discussed above with reference to FIGS. 17A to 17E and at least some parts of the example discussed with reference to FIG. 18.

The example of FIG. 19 again shows a receiver configured for receiving narrow band M-PRS 181, 182. As can be seen, during the first time period $T_1$ at least a first M-PRS 181 may be received which may be spectrally located at least partially outside the first frequency sub band 101 but at least partially inside the first receiving band 173. That spectral portion of the first M-PRS 181 that is located inside the first receiving band 173 is referenced with numeral 181*a*.

Furthermore, the receiver may be configured to receive during the second time period $T_2$ at least a second M-PRS 182 which may be located at least partially inside the second sub band 102. The second M-PRS 182 may comprise a spectral portion 182*a* that spectrally overlaps with the above mentioned spectral portion $181_a$ of the first M-PRS 181.

These spectrally overlapping spectral portions 181*a*, 182*a* of the first and second M-PRS 181, 182 which may spectrally overlap in (at least parts of) e.g. the second frequency sub band 102 are highlighted in cross-hatched lines in FIG. 19, while any spectral portions of the PRS 181, 182 that may not spectrally overlap in (at least parts of) e.g. the second frequency sub band 102 may be indicated by simple single-hatched lines.

Thus, an inventive receiver according to this example may be configured to receive during the first time period $T_1$ at least a spectral portion 181*a* of a first predetermined radio signal 181 which spectral portion 181*a* is located outside the first frequency sub band 101, and to receive during the second time period $T_2$ a second predetermined radio signal 182, the second predetermined radio signal 182 being located at least partially inside the second frequency sub band 102 and comprising at least a spectral portion 182*a* spectrally overlapping with the spectral portion 181a of the first predetermined radio signal 181.

According to this example, the receiver may be configured to perform the channel estimation of the first frequency sub band 101 in its first receiving frequency band 173 spectrally covering the first frequency sub band 101 and the spectral portion 181a of the first predetermined radio signal 181 being located outside the first frequency sub band 101, and to perform the channel estimation of the second frequency sub band 102 in its second receiving frequency band 174 spectrally covering the second frequency sub band 102 and the spectral portion 182a of the second predetermined radio signal 182 spectrally overlapping with the spectral portion 181a of the first predetermined radio signal 181.

As can further be seen in FIG. 19, the first predetermined radio signal 181 received during the first time period $T_1$ may be located, as to the time domain, inside the first frequency sub band 101. In other words, the first M-PRS 181 may be located, with respect to the time domain inside the frame of the first frequency sub band 101.

Figure 20:
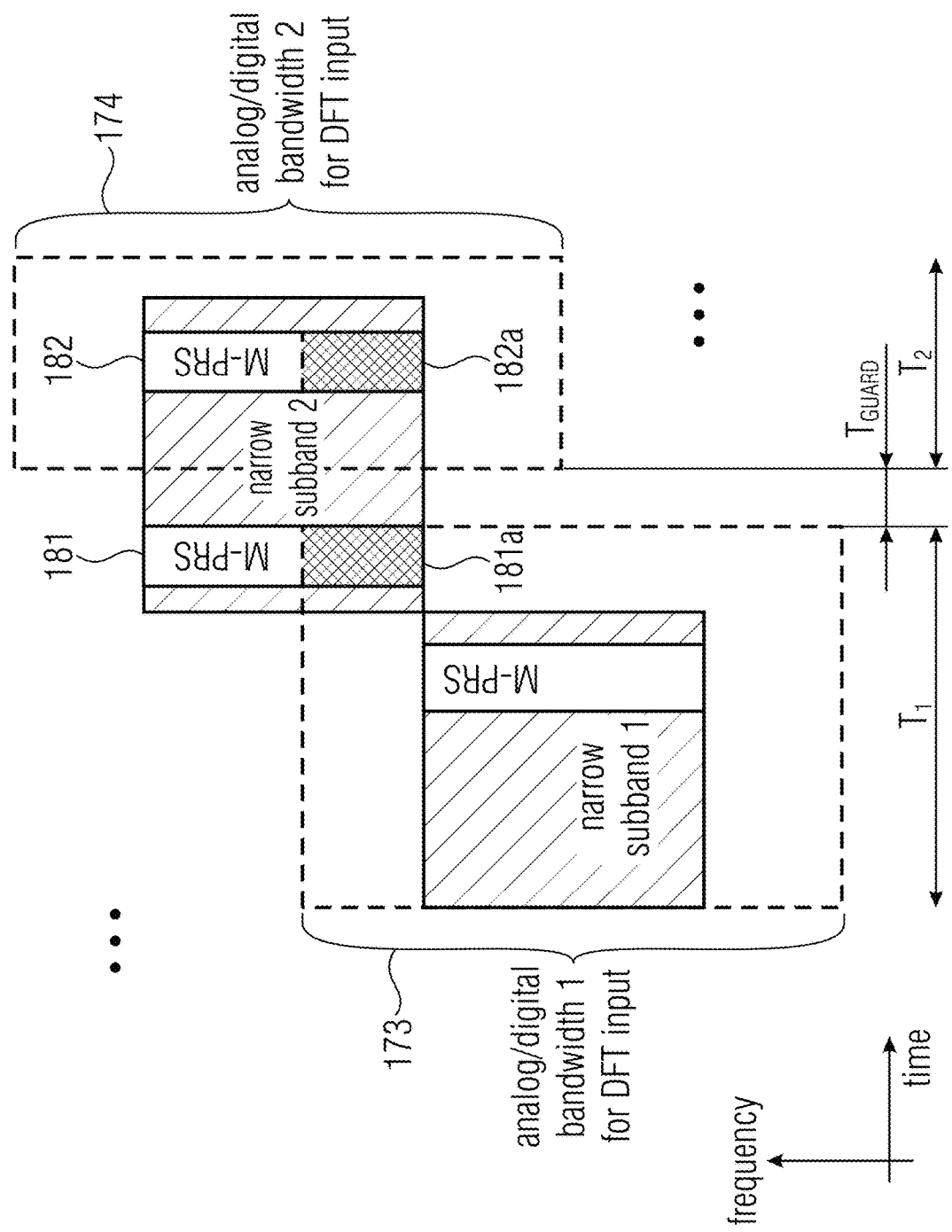
FIG. 20 shows a further example of an inventive receiver using two predetermined narrow band radio signals with overlapping spectral portions.

An alternative example is shown in FIG. 20 in which the first M-PRS 181 received during the first time period $T_1$ may be located, as to the time domain, outside the frame of the first frequency sub band 101.

However, as can also be seen in FIG. 20, the first receiving frequency band 173 may cover at least a spectral portion 181a of the first M-PRS 181. The receiver of this example may again be configured such that its PLL is detuned with a certain delay, i.e., while the first M-PRS 181 in the second frequency sub band 102 may already have been transmitted by the transmitter (Base Station, eNB, etc.). Accordingly, at least a spectral portion 181a of the first M-PRS 181 may be received by the receiver during the first time period $T_1$ even though the first M-PRS 181 may be located partially or entirely inside the second frequency sub band 102.

The second M-PRS 182 may be received during the second time period $T_2$ and may also be located partially or entirely inside the second frequency sub band 102. The first and the second M-PRS 181, 182 may be at least partially located inside the same frequency band. The first and the second M-PRS 181, 182 may also be completely located inside the same frequency band, as depicted in FIG. 20. The first and the second M-PRS 181, 182 may also be located in an identical frequency band.

However, as mentioned above, the first receiving frequency band 173 may cover at least a spectral portion 181a of the first M-PRS 181. Furthermore, the second receiving frequency band 174 may cover at least a spectral portion 182a of the second M-PRS 182 which spectral portion 182a spectrally overlaps with the aforementioned spectral portion 181a of the first M-PRS 181 received during the first time period $T_1$ in the first receiving frequency band 173.

Also in this example, the receiver may be configured to compare the first phase with the second phase and to align the first and second phases to determine the overall phase basis under compensation of the relative phase error, said aligning being based on the spectrally overlapping spectral portions 181a, 182a of the first and second predetermined radio signals 181, 182 received during the first and second time periods $T_1$, $T_2$.

In both the examples shown in FIGS. 19 and 20, a third time period bridging the first and second time periods $T_1$, $T_2$ is depicted. Said third time period may be a guard interval which may therefore be referenced as $T_{GUARD}$. This guard interval $T_{GUARD}$ provides for a possibility to reconfigure the phase locked loop (PLL) at the receiver side since this may not happen instantaneously. Even though not explicitly shown, such a guard interval may be provided in each of the examples and embodiments of the receivers discussed herein.

As mentioned above, the PRS and M-PRS were only mentioned as non-limiting examples for predetermined radio signals. According to an example, each of the first and the second predetermined radio signals 181, 182 may comprise repeating sequences, wherein at least a portion of a repeating sequence of the first predetermined radio signal 181 is identical to at least a portion of a repeating sequence of the second predetermined radio signal 182 in at least their spectrally overlapping spectral portions 181a, 181b, 181c, 182a, 182b, 182c for establishing a coherency of the overall phase basis.

That is, the first and second predetermined radio signals 181, 182 may comprise some identical portions in at least the spectrally overlapping spectral portions 181a, 181b, 181c, 182a, 182b, 182c such that these identical portions may be used to determine the relative phase difference or phase error between the first and second frequency sub bands 101, 102. Based on said relative phase error the coherent overall phase basis may be determined under compensation of said relative phase error.

For example, a PRS or an M-PRS may be advantageously used for this purpose in LTE since both the PRS and the M-PRS may be generated and transmitted such that they are identical in spectrally overlapping regions. However, in 5G or NewRadio other predetermined radio signals with the same or similar features as described above may additionally or alternatively be used in this invention.

Some further examples of an inventive receiver shall be discussed with reference to FIG. 21. According to these examples, the transmitter (e.g. a Base Station, eNB, etc.) may transmit the first and second frequency sub bands 101, 102 simultaneously. However, the receiver of this example of the present invention may only comprise a narrow receiving frequency band 173, 174 which may cover at least one of the frequency sub bands 101, 102 completely and at least a spectral portion of the other one of the frequency sub bands 101, 102.

Figure 21:
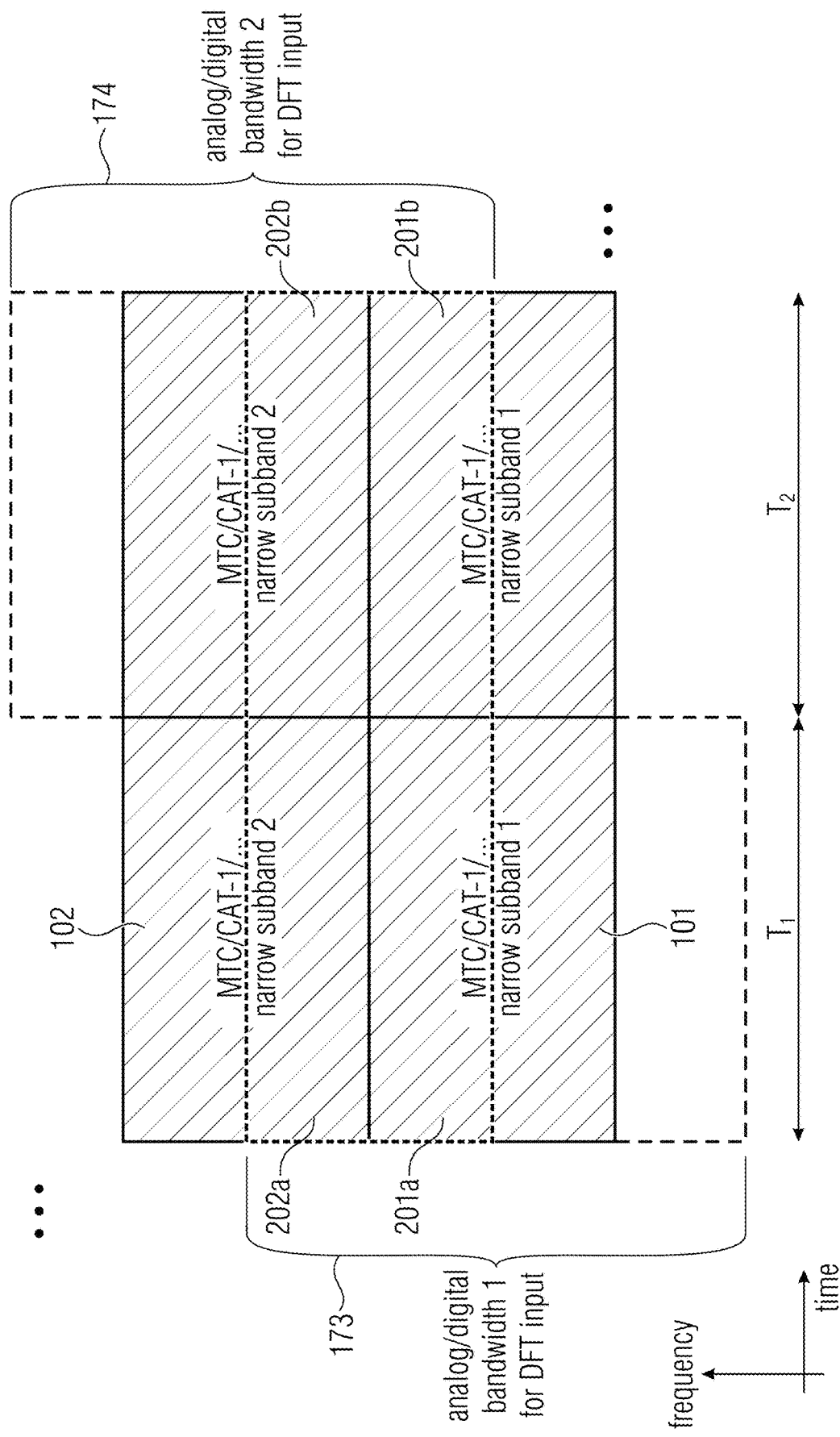
FIG. 21 shows an example of an inventive receiver using overlapping spectral portions of two simultaneously received frequency sub bands and two further simultaneously received frequency sub bands.

As can be seen in FIG. 21, the first receiving frequency band 173 may cover the first frequency sub band 101 and at least a spectral portion 202a of the second frequency sub band 102 that is transmitted simultaneously with the first frequency sub band 101 during the first time period $T_1$.

Furthermore, the second receiving frequency band 174 may cover the second frequency sub band 102 and at least a spectral portion 201b of the first frequency sub band 101 that is transmitted simultaneously with the second frequency sub band 102 during the second time period $T_2$.

Accordingly, the receiver may receive during the first time period $T_1$ the first frequency sub band 101 and a spectral portion 202a of the simultaneously transmitted second frequency sub band 102. Furthermore, the receiver may receive during the second time period $T_2$ the second frequency sub band 102 and at least a spectral portion 201b of the first frequency sub band 101.

As can be seen in FIG. 21, the spectral portion 202a of the second frequency sub band 102 received during the first time period $T_1$ may spectrally overlap with a spectral portion 202b of the second frequency sub band 102 received during the second time period $T_2$. Furthermore, the spectral portion 201b of the first frequency sub band 101 received during the second time period $T_2$ may spectrally overlap with a spectral portion 201a of the first frequency sub band 101 received during the first time period $T_1$.

The receiver of this example may be configured to perform the channel estimation of the first frequency sub band 101 in its first receiving frequency band 173 spectrally covering the first frequency sub band 101 and the spectral portion 202a of the second frequency sub band 102 both received during the first time period $T_1$, and to perform the channel estimation of the second frequency sub band 102 in its second receiving frequency band 174 spectrally covering the second frequency sub band 102 and the spectral portion 201b of the first frequency sub band 101 both received during the second time period $T_2$, wherein the spectral portion 201b of the first frequency sub band 101 received during the second time period $T_2$ spectrally overlaps with a frequency-corresponding spectral portion 201a of the first frequency sub band 101 received during the first time period $T_1$ and/or wherein the spectral portion 202a of the second frequency sub band 102 received during the first time period $T_1$ spectrally overlaps with a frequency-corresponding spectral portion 202b of the second frequency sub band 102 received during the second time period $T_2$.

The receiver may use said spectral overlapping portions 201a, 201b, 202a, 202b of the first and the second frequency sub bands 101, 102 for determining the relative phase error. Based on this relative phase error, the receiver may determine the coherent overall phase basis under compensation of the relative phase error.

Accordingly, the receiver may be configured to compare the first phase with the second phase and to align the first and second phases to determine the overall phase basis, said aligning being based on the spectral overlapping portions 201a, 201b, 202a, 202b of the first and second frequency sub bands 101, 102 respectively received during the first and second time periods $T_1$, $T_2$.

Even though not explicitly depicted in FIG. 21, one or more predetermined radio signals, such as PRS or M-PRS, may be received in the first and/or second frequency sub bands 101, 102 during the first and the second time periods $T_1$, $T_2$ and be used in the same way as described in the examples above. Thus, the example shown in FIG. 21 may be combined with any of the embodiments and examples described herein.

The features and advantages of the above described inventive receiver using a predetermined radio signal shall be briefly summarized in the following.

A transmitter (e.g. base station, eNb, gNB, etc.) may be configured to transmit broadband predetermined radio signals (e.g. PRS, M-PRS, etc.) and narrow band predetermined radio signals (e.g. PRS, M-PRS, etc.). An inventive receiver may comprise a receiving bandwidth being more narrow compared to the base station's transmission bandwidth. Thus, an inventive receiver (e.g. MTC UE) may be configured to receive signal portions being distributed over several frequency sub bands. For example:

- an inventive receiver (e.g. MTC UE) may be configured to receive signals on the first narrow frequency sub band 101 OR on the second narrow frequency sub band 102, and the receiver may profit from an improved time estimation by using the frequency diversity (if the channel properties on both narrow frequency sub bands 101, 102 may be sufficiently uncorrelated)
- an inventive receiver may also use signal portions and/or sub carriers of the predetermined radio signal which may be located outside the narrow frequency sub band 101, 102 but inside der receiving bandwidths 173, 174. The receiving bandwidths may be characterized by the digital sampling rate and, where applicable, by a preceding analogous low-pass filtering.

In the FIGS. 17A to 20 the spectrally overlapping spectral portions are highlighted by means of cross-hatched lines, while any non-overlapping spectral portions of the PRS 181, 182 may be indicated by simple single-hatched lines The behaviour of the inventive receiver may be summarized as follows:

1) adjustment of the receiving frequency of the receiver for receiving narrow frequency sub bands
2) This reconfiguration (retuning and/or detuning of the PLL) may cause a random (or at least unknown) phase shift in the base band signal between the first and second narrow frequency sub bands 101, 102
3) since the transmitter (e.g. base station) may create and transmit a broadband signal the PLL on the transmitter side may not have to be reconfigured
4) thus, the receiver may, by means of observation of one or more sub carriers in the spectrally overlapping portions before and after a change of the channels, determine the random phase shift (relative phase error) and may compensate it
5) with the compensated relative phase error each signal portion may be used in a "phase-coherent" manner for channel estimation and/or estimation of the signal delay by exploiting the extended bandwidth For example, as previously discussed with reference to FIGS. 17A to 17E, the receiver may use available predetermine broadband signals (e.g. PRS), receiver may cut out some portions thereof, and may perform a phase alignment by means of portions in sub carriers that may otherwise remain unused by the receiver.

For example, as previously discussed with reference to FIG. 18, an overlap in one PRS may be exploited. In this example, the spectrally overlapping spectral portions are again highlighted by cross-hatched lines, while any non-overlapping spectral portions of the PRS 181, 182 may be indicated by simple single-hatched lines. The transmitter may create and transmit a broadband predetermined signal, i.e., a reconfiguration of the transmitter-sided PLL may not be needed between transmitting the first and second frequency sub bands 101, 102. However, the receiver may reconfigure its PLL with the above described implications.

If the receiver may retune with some delay, namely after the transmitter may already have been switched to the second frequency sub band 102, a compensation of the relative phase error is possible since the receiver may observe the same sub carrier before and after reconfiguration of its PLL.

For example, as previously discussed with reference to FIG. 19, a narrow band M-PRS may be transmitted and received twice, and the receiver may perform a phase alignment between first and second M-PRS in the same band while the receiver may already be jumped to a different band. According to this example, the transmitter may transmit, at least for a short time period, simultaneously at two adjacent sub bands.

For example, the example previously discussed with reference to FIG. 20 may be similar to the example of FIG. 19. However, in FIG. 20 the PRS may be located outside the sub band frame, and only one sub band may be active.

For example, as previously discussed with reference to FIG. 21, the transmitter may transmit simultaneously on two sub bands. The potentially usable overlapping area is highlighted with a box in dashed lines. This configuration may be interesting for NB-IoT since in this case several sub bands may be active at the same time.

As mentioned above, the inventive principle may be used for detecting a position of a receiver within a wireless communication network. In order to achieve this, the receiver may, for instance, determine a time of arrival of the reconstructed overall signal based on the reconstructed overall phase basis of the overall signal.

Again with reference to FIG. 8, the overall phase basis 834 may be determined by means of a channel estimation 804, wherein each channel or sub band 101, 102, 103 is estimated separately in a separate channel estimation 801, 802, 803. Accordingly, the receiver may determine a time of arrival of the overall signal based on the phase of the reconstructed phase basis 834 of the overall signal, which may be reconstructed, for example, by using spectrally overlapping portions of predetermined radio signals as described with reference to FIGS. 17A to 21.

The result of the channel estimation of the overall channel may be fed to a position detection unit 850, as is shown in FIGS. 8 and 9.

Additionally or alternatively, according to a further example that is depicted in FIG. 9, the receiver may be configured to determine a delay 841, 842, 843 of the information carried by the radio signal by using the overall phase basis 944 of the radio signal and to provide the delay to a position detection unit 850 that is configured to determine, based on the delay, the spatial location of the receiver within a wireless communication network.

The position detection unit 850 may be arranged remote from the receiver. According to another example, the position detection unit 850 may be integrated into the receiver.

According to an example, the position detection unit 850 may be configured to compute the spatial position of the receiver by using the delay 841, 842, 843 for at least one of a time of arrival (ToA), a Time Difference of Arrival (TDoA) and a Relative Signal Timing Difference (RSTD) calculation.

Besides that, the position detection unit 850 may also be configured to execute an angle of arrival estimation in order to determine a spatial position of the receiver in a wireless communication network.

For this purpose, the receiver according to a further example may comprise at least two antennas and the receiver may be configured to determine an Angle of Arrival (AoA) and to provide the AoA-information to the position detection unit 850 that is configured to determine, based on the AoA-Information, the spatial location of the receiver within a wireless communication network.

Angle of Arrival (AoA) Estimation

For the purpose of position detection, not only times of arrival may be estimated as described in the examples above. The inventive principle also allows to execute a position detection based on an AoA estimation, or even based on a combination of times of arrival and AoA estimations.

Regarding AoA estimations, when some receivers or their antennas are closely tied together and arranged in one line, an AoA estimator may be realized. For such AoA estimators, multi-carrier methods are helpful in order to resolve multi-paths. The bandwidth may be broadened over non-coherent frequency hops by means of the above described linking of multi tone signals. The AoAs may then be estimated coherently over all frequency tones by means of, e.g. MUSIC [schmidt83], ESPRIT [roy89], Matrix Pencil [Yilmazer10] or other methods.

The equation for the receiving signal over P frequency hops may serve as the starting point $$R_{i,m} = \begin{pmatrix} R_{i,1,m} \\ \vdots \\ R_{i,p,m} \\ \vdots \\ R_{i,P,m} \end{pmatrix} = A_{total,i} \begin{pmatrix} 1_L \otimes S_{1,m} \\ \vdots \\ 1_L \otimes S_{p,m} \\ \vdots \\ 1_L \otimes S_{P,m} \end{pmatrix} + \begin{pmatrix} W_{i,1;m} \\ \vdots \\ W_{i,p;m} \\ \vdots \\ W_{i,P;m} \end{pmatrix}.$$

$S_{p,m}$ and $R_{i,p,m}$ represent the transmission-vector and the receiving-vector of the $p^{th}$ hop signal and $W_{i,p;m}$ are the respective noise portions. $1_L \otimes S_{1,m}$ describes, by means of the Kronecker-multiplication, the spreading of the signal to each channel paths.

The generalized steering matrix is $$A_{total,i} = \begin{pmatrix} A_i(\theta, f_{k_{1,1}})B_{i,1}\Phi_{i,1} & 0 & 0 & \cdots & 0 \\ \vdots & \ddots & \vdots & \cdots & \vdots \\ A_i(\theta, f_{k_{1,K}})B_K\Phi_{i,1} & 0 & 0 & \cdots & 0 \\ & \ddots & & & \\ 0 & \cdots & A_i(\theta, f_{k_{p,1}})B_{i,k_{p,1}}\Phi_{i,p} & \cdots & 0 \\ \vdots & & \vdots & \ddots & \vdots \\ 0 & \cdots & A_i(\theta, f_{k_{p,K}})B_{i,k_{p,1}}\Phi_{i,p} & & 0 \\ & & & \ddots & \vdots \\ 0 & 0 & & \cdots & A_i(\theta, f_{k_{P,1}})B_{i,k_{P,1}}\Phi_P \\ \vdots & \vdots & & & \vdots \\ 0 & \cdots & 0 & \cdots & A_i(\theta, f_{k_{P,K}})B_{i,k_{P,K}}\Phi_P \end{pmatrix}$$

with the diagonal channel weight and phasor matrices $$B_{i,k} = \text{diag}(\beta_{i,1,k}, \ldots, \beta_{i,l,k}, \ldots, \beta_{i,L,k}) \approx B_i$$

(for limited bandwidth, the channel weights in the time domain are approximately constant over the observed frequency range)

$$\Phi_{i,p} = \text{diag}(\exp(j\phi_{i,p,0}), \ldots, \exp(j\phi_{i,p,l}), \ldots, \exp(j\phi_{i,p,L-1})).$$

The relative phase portions $\Delta\phi_{i,p_1p_2,l} = \phi_{i,p_2,l} - \phi_{i,p_1,l}$ may be estimated, e.g. by means of a local maximum search in the overlapping signal portions $$(\Delta\phi_{i,p_1p_2}) = \max_{\Delta\phi} \sum_{m=0}^{N_{OFDM}-1} \sum_{k=0}^{K_{ovl}-1} R_{i,p_1,m,\kappa_{p_1 \to p_2}}(k) + \exp(j\Delta\phi) \cdot R_{i,p_2,m,\kappa_{p_2 \to p_1}}(k)$$

After compensation, the phase difference of the frequency portions $$\phi_{i,k_2,l} - \Delta\phi_{i,k_1k_2,0} - \phi_{i,k_1,l} = 2\pi[f_{k_2}\tau_{i,l} - 2(f_{k_2} - f_{k_1})\tau_{i,0} - f_{k_1}\tau_{i,l}] = 2\pi(f_{k_2} - f_{k_1})(\tau_{i,l} - \tau_{i,0})$$

for all multi paths with l>0 is the larger or rather independently distributed in [0,2π], the higher the variation of the path delays between $\tau_{i,0}$ and $\tau_{i,l}$ or of the frequencies between $f_{k_1}$ and $f_{k_2}$ is. After compensation of the phase portions of the direct path $\phi_{i,p,0}$ by means of the phase difference $\Delta\phi_{i,p_1p_2,0} = \phi_{i,p_2,0} - \phi_{i,p_1,0}$, the following form results:

$$\tilde{R}_{i,p,m} = \beta_{i,0} \cdot \exp(j\phi_{i,l}) \begin{pmatrix} a(\theta_0, f_{k_{p,1}}) \\ a(\theta_0, f_{k_{p,2}}) \\ \vdots \\ a(\theta_0, f_{k_{p,K}}) \end{pmatrix} S_{p,m} \to$$

user data portion + $\sum_{l=1}^{L} \beta_{i,l} \begin{pmatrix} \exp(j\phi_{i,p_1,l}) a(\theta_l, f_{k_{p,1}}) \\ \exp(j(\phi_{i,l} - \Delta\phi_{i,k_1k_2,0})) a(\theta_l, f_{k_{p,2}}) \\ \vdots \\ \exp(j(\phi_{i,l} - \Delta\phi_{i,k_1k_P,0})) a(\theta_l, f_{k_{p,K}}) \end{pmatrix} S_{p,m} +$ $$\begin{pmatrix} w_{k_1,m} \\ w_{k_2,m} \\ \vdots \\ w_{k_P,m} \end{pmatrix} \to \text{noise portion}$$

The demodulated data vector $\overline{R}_{i,m} = (\overline{R}_{i,0,m}^T, \ldots \overline{R}_{i,p,m}^T, \ldots \overline{R}_{i,P,m}^T)^T$ results after elementwise division of the subcarriers in the $\overline{R}_{i,p,m}$ through $S_{p,m}$. Accordingly, a pseudo-coherency is reconstructed, which may be used for a precise estimation by means of MUSIC, ESPRIT, Matrix Pencil or similar algorithms. Differential phase and angle may also be determined iteratively, such that the respective estimation values may be used for focusing the other estimation.

A combination of an angle estimation and time of arrival (ToA) estimation in order to exploit the acquired signal data (or phases) is also referred to as Joint Angle and Delay Estimation (JADE) [vanderveen07]. It is also known as SI-JADE [van der Veen07] or 2D-MUSIC [schmidt86b]. With the acquired delay differences a Time Difference of Arrival (TDoA)-method may be executed at several measurement knots, such that the position may be estimated from a mixture of differences of the times of arrival (hyperbolas 1010) and angles of arrival (beams 1020, 1030), as shown exemplarily in FIG. 10. At least one further synchronized receiver with at least one antenna element may be needed (see FIG. 10).

The invention may further be used in methods for direct position detection (Direct Positioning) [weiss05], in which the position of a transmitter may be determined directly, similar to the above mentioned RTK-method, from the received and sampled signals. A combination of synchronized receivers with stand-alone antennas or group antennas may be used.

The inventive modulation is also helpful for direct position detection methods as described in [weiss05] or [hadaschik15]. The possibility to use a plurality of coherent subcarriers provides for a higher preciseness in position detection. The mathematical model does not substantially differ from a multitone-angle-estimation. Adding coherent frequency tones leads to a gain of preciseness also for direct position detection according to a spatial MUSIC-spectrum [hadaschik15]. Adding a coherent tone, a (ambiguous) distance may be extractable. Further frequency tones delete these ambiguities and a larger bandwidth sharpens the angle spectrum.

Figure 11:
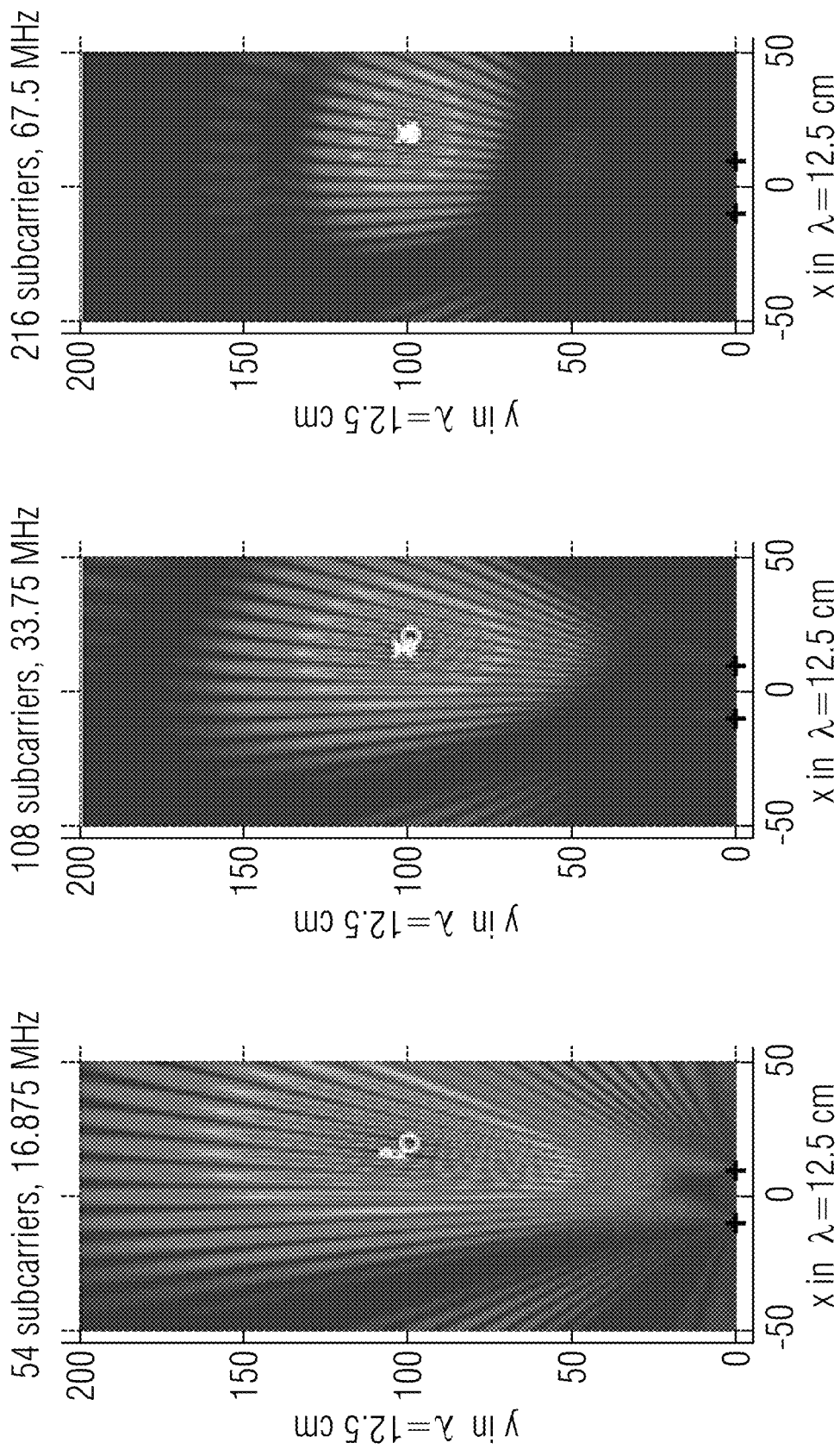
FIG. 11 shows three different MUSIC-spectra for two coupled group antennas a six elements and OFDM signals in the 2.4 GHz band in a subband, in the doubled bandwidth and in the quadrupled bandwidth, according to an embodiment.

FIG. 11 shows the best achievable gain with the help of a reconstructed coherency over all phase portions by means of a MUSK-spectrum over all phase portions for phase-synchronized receivers at positions (0,−10) and (0,10).

Figure 12:
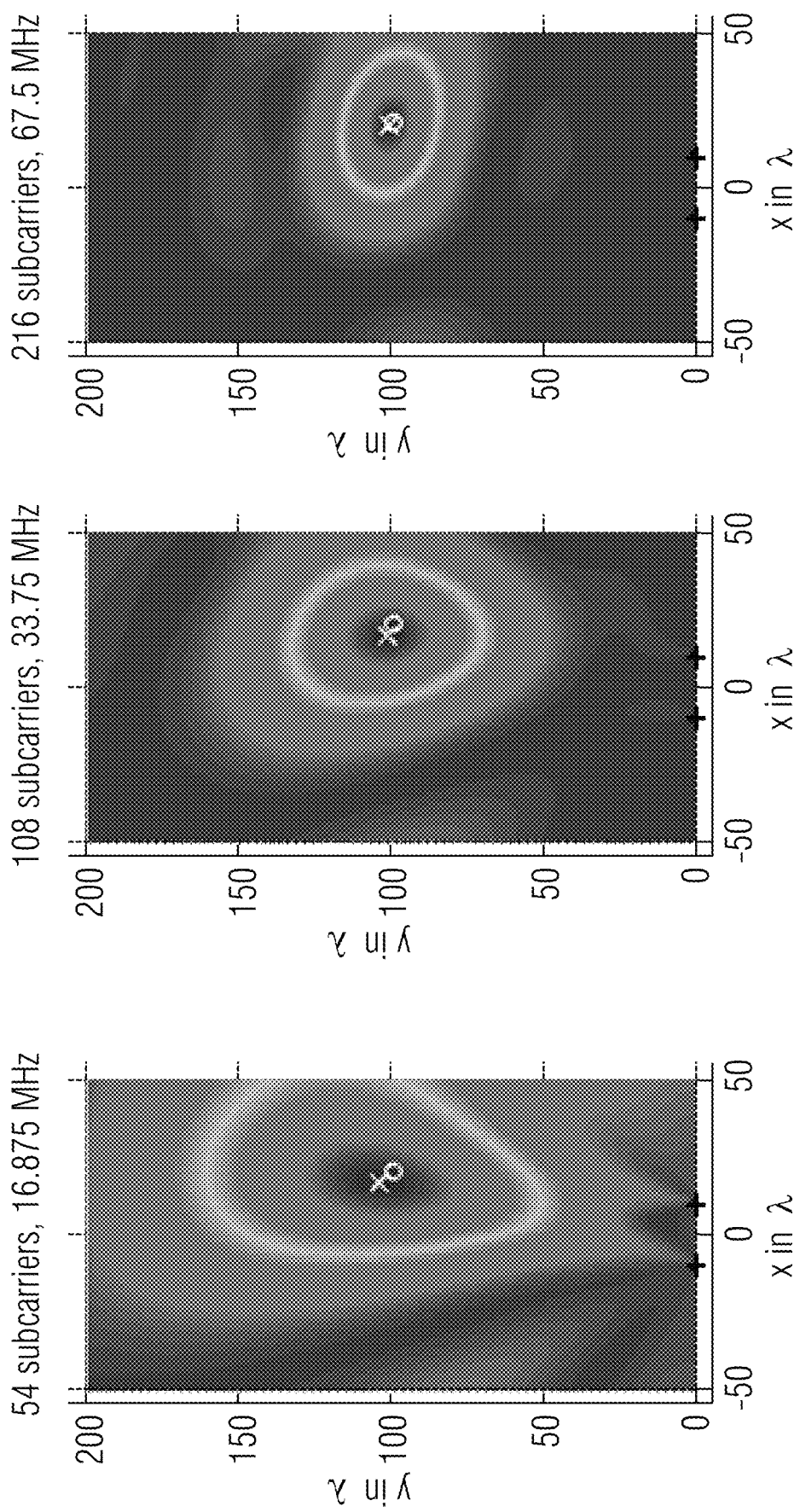
FIG. 12 shows uncoherent MUSIC-spectra for two group antennas à six elements and OFDM signals in the 2.4 GHz band in a subband, in the doubled bandwidth and in the quadrupled bandwidth, according to an embodiment.

FIG. 12 shows the ideal achievable gain with the help of a reconstructed coherency over all phase portions by means of a MUSIC spectrum for receivers with non-synchronized phase and frequency according to [hadaschik15]. The small expansion of the maxima in FIG. 11 and FIG. 12 leads to stable estimation values in radial and tangential direction.

With respect to each of the above described Figures, the receiver according to examples may be configured to receive at least the first frequency sub band 101 and the second frequency sub band 102, and advantageously each of the frequency sub bands, at different discrete points of time in the time domain. Thus, frequency hops are realized.

Each frequency band may be hopped subsequently, such that a frequency stair results as shown in FIGS. 1 to 4 and 7 to 9.

The frequency staircase may be realized as an ascending or descending staircase. The frequency staircase may also be realized non-strictly and time-sequentially. Instead, it may deviate from the sequence, as shown in FIG. 5 and FIG. 6, such that phase-fixing is done subsequently after re-sorting. In this case, however, the advantage of a short settling time during the synthesis of the center frequencies in the receiver and the transmitter is omitted.

The settling times of the frequency synthesis determine the guard intervals $T_{guard}$, i.e. fast settling times allow for fast switching and a better channel utilization. The guard interval may be selected variably, but it shall not fall below the settling time. Furthermore, the particular duration of the guard interval shall be known to the receiver.

Furthermore, in each of the examples shown in the Figures, except the channel-bundling example of FIG. 6, each sub band 101 to 105 comprised the same bandwidth. However, the bandwidth of the sub bands 101 to 105 may vary.

Receiver-Variants
1) with one antenna
   a. with broadband receiver covering the totality of the frequency spectrum $B_{overall}$
      i. Further processing with digital numerical frequency synthesis and digital mixer
      ii. Further processing with DFT
   b. with narrow band receiver covering the bandwidth of at least one OFDM-symbol (of a sub band/sub channel) plus a reserve. This receiver shall be tunable to different center frequencies
   c. with two narrow band receiver systems, such as under item b, such that one receiver system may be de-tuned for the next hop while the other one receives a hop.
2) with a group antenna comprising M antenna elements
   a. with broadband receiver comprising M coherent systems covering the total spectrum $B_{overall}$.
      i. Further processing with digital numerical frequency synthesis and digital mixer
      ii. Further processing with DFT
   b. with a coherent narrow band receiver comprising M receiver systems, which receiver covers the maximum distance of the tones plus the bandwidth of the signals modulated onto the tones including a reserve. The receiver systems shall be tunable to different center frequencies.

As mentioned above, the receiver may be a node within a wireless communication network. An example of a network is shown in FIGS. 13A and 13B.

Figure 13A:
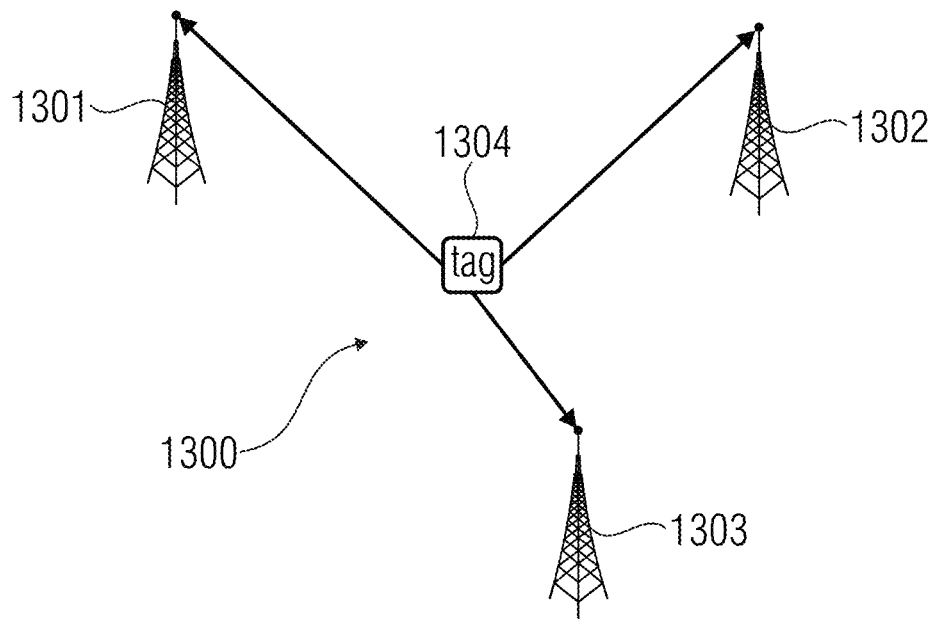
FIG. 13A shows a wireless communication network according to an embodiment in an uplink mode.

FIG. 13A shows a wireless communication network 1300 comprising three base stations, 1301, 1302, 1303, which are also referred to as eNodeB or eNB in case of LTE networks.

The wireless communication network 1300 may also comprise a user equipment 1304, abbreviated with UE, which may be a mobile device, such as a smartphone, a notebook, a tablet or the like.

Figure 13B:
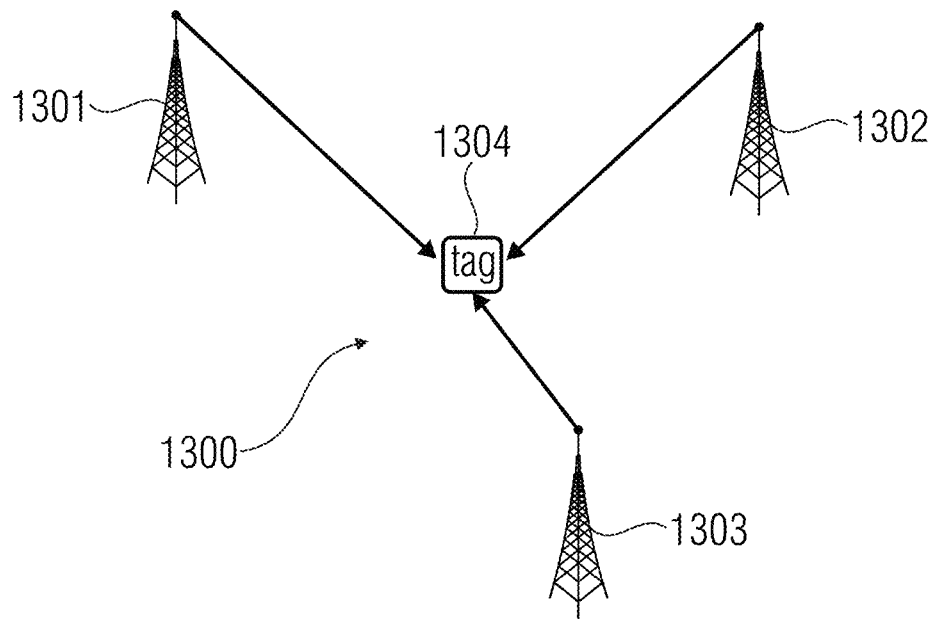
FIG. 13B shows a wireless communication network according to an embodiment in a downlink mode.

The difference between FIGS. 13A and 13B is the way of communication. That is, in FIG. 13A the nodes 1301, 1302, 1303, 1304 communicate in the uplink, i.e. the UE 1304 is the transmitter while the base stations 1301, 1302, 1303 work as receivers.

In FIG. 13B, the nodes 1301, 1302, 1303, 1304 communicate in the downlink, i.e. the UE 1304 is the receiver while the base stations 1301, 1302, 1303 work as transmitters.

According to an example, the present invention also provides a wireless communication network 1300 comprising a receiver 1301, 1302, 1303, 1304 of one of the preceding claims and a transmitter 1301, 1302, 1303, 1304.

For the purpose of spatial position detection of the UE 1304, it may be advantageous if the UE 1304 works in the downlink as shown in FIG. 13B. That is, the UE 1304 acts as an inventive receiver while the base stations 1301, 1302, 1303 acts as transmitters. The transmitters 1301, 1302, 1303 may transmit a PRS signal, for example.

According to an example of the invention, the wireless communication network 1300 may work in a downlink mode, wherein the receiver is a mobile terminal (UE) 1304 and the transmitter (eNB$_1$-eNB$_3$) is a base station 1301, 1302, 1303, and wherein the wireless communication network 1300 uses an IFFT (Inverse Fast Fourier Transform) based radio signal.

In order to provide for a precise position detection, radio localization of frequency hopping radio transmitters needs to exploit the entire bandwidth of the frequency hopping radio signal in order to achieve high accuracy and robustness. In order to achieve this goal, the radio signal has to be coherent with respect to its phase throughout each and every frequency. Otherwise, the coherency of the phase shall be at least producible or reconstructible, for example by means of a calibration as suggested by the present invention. However, a minimum effort is desired for this purpose. OFD M (Orthogonal Frequency Division Multiplex) is a commonly known and widely available kind of modulation which is supported in many standards today (e.g. IEEE 802.11a/g/h/ . . . , WIMAX, LTE, 5G, DVB-T, DVB-T2, DMB).

A particular problem that can be solved with the present invention concerns the localization for an emergency call (e.g. E-911 Phase 2). In the United States the regulation of the FCC involves for wireless users a localization of a 911-caller with a preciseness of at least 50 meters since September 2012 [fcc911]. In this regard, Enhanced FCC911, Phase II states; "For network-based technologies: 100 meters for 67 percent of calls, 300 meters for 90 percent of calls; (2) For handset-based technologies: 50 meters for 67 percent of calls, 150 meters for 90 percent of calls". This is preliminarily only valid for outdoor operation. However, there is also a need for an improvement of the indoor localization of persons inside buildings because the majority of emergency calls originates from inside buildings or other such structures.

With the help of a particular kind of signalization, which may be based on the signalization as commonly used during normal operation, the present invention is enabled to support a more accurate localization by means of a pseudo-coherent bandwidth extension in order to improve a localization based on satellite navigation systems (GNSS) outside of buildings and inside of buildings with an acceptable accuracy.

The conventional technology suggests methods wherein the coherency of signals is to be realized by means of Phase-Locked-Loops (PLLs) using a certain reference. A precise timing control (detuning of the PLL) is used to precisely adjust the phase. However, this entails a highly precise and stable reference generation (TCXO, . . . ) and deterministic switching times at temporal accuracies of sub-nanoseconds.

Otherwise, a coherency of a carrier phase may not be needed in frequency hopping methods for communications. For example, Bluetooth [bluetooth40] and Wimedia Multiband-OFDM [wimedia15] describe frequency hops over several sub bands such that a band gap remains between the starting frequency band (source) and the pounced frequency band (sink). The intention behind the band gap is to avoid or reduce interference.

Scholand et al. [scholand05] suggests a fast frequency hopping method for OFDM in order to optimize and entirely exploit time-frequency diversity for information coding.

In the present invention, orthogonal frequency division, such as OFDM (Orthogonal Frequency Division Multiplex) may be used for the frequency hopping signal. For multi-user (e.g. LTE, 5G, IEEE 802.11 a/g/h/ . . . ) or multi-cell or multi-channel operation (e.g. DVB-T, DVB-T2, DMB), which is practically given for nearly each and every common broadband radio system, a multi-frequency/multi-channel-approach is given in the supporting devices, such as shown in FIG. 14.

Figure 14:
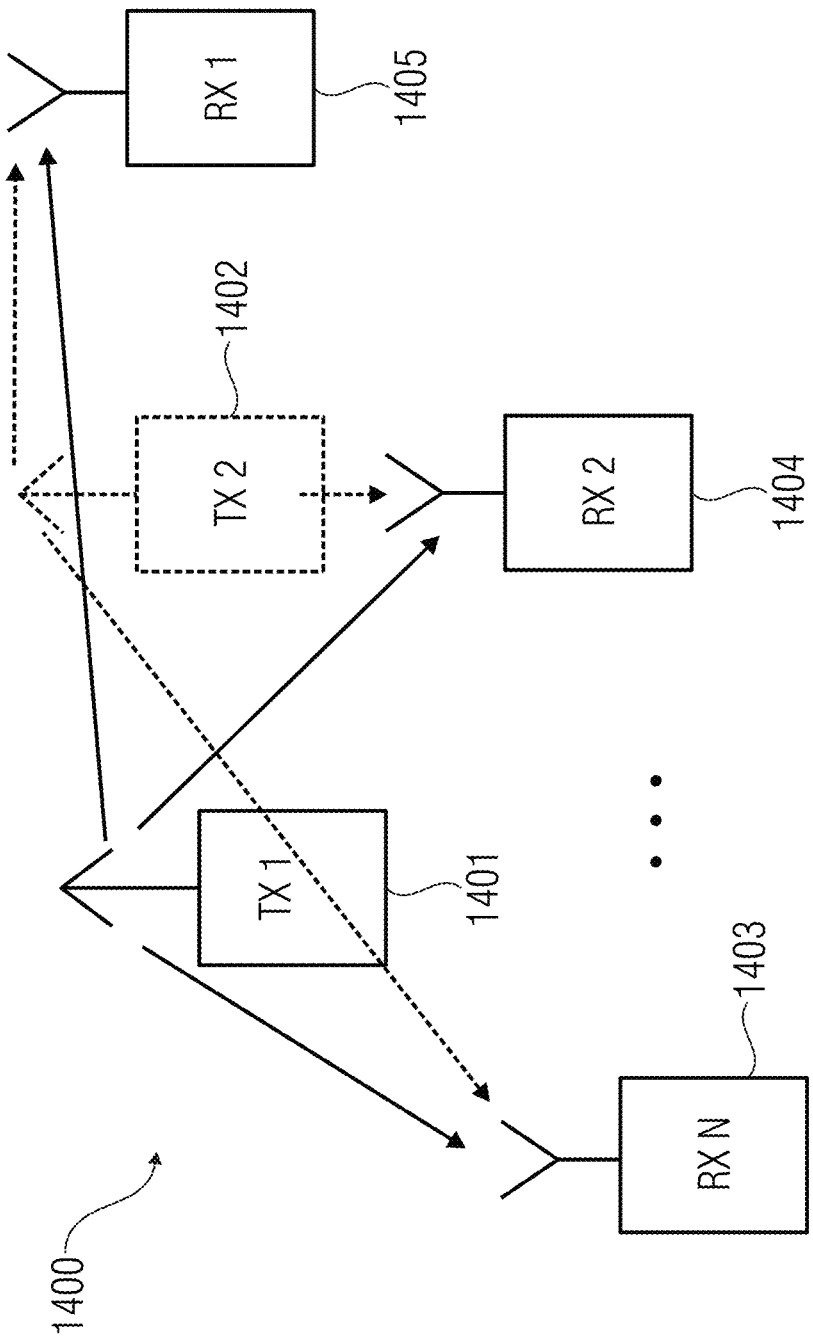
FIG. 14 shows a multi-user wireless communication network with multiple knots according to an embodiment.

FIG. 14 shows a wireless communication network 1400 similar to the one described above with reference to FIG. 13. However, in this example, a plurality of transmitters 1401, 1402 and a plurality of receivers 1403, 1404, 1405 are present in the network 1400. As mentioned before, the UEs and the base stations may either act as transmitters or as receivers, depending on the mode (downlink or uplink) of the wireless communication network 1400.

According to the inventive principle, the overall transmission channel is estimated over all available sub bands. A particular focus for localization is the so-called Time of Arrival. In case that group antennas are available at one or more receivers, also the estimation of the direction of incidence of the first propagation path will become more precise. These time-related information or data are fed into a position detection unit or localization unit, respectively, in order to detect the position of the receiver within a wireless communication network. Methods that can be used are computations using time differences, e.g. TDoA (Time Difference of Arrival), incident angles, e.g. DoA (Direction of Arrival), as well as mixed forms of both types.

A further method is the direct position detection wherein the position is estimated directly from raw data. Such raw data may, for instance, be a complex output of an Analog-Digital-Converter (ADC) or of a digital mixer in Inphase- and Quadrature phase components.

Additionally or alternatively, a channel estimation in amplitude, phase and direction may serve as an observation from which the times of arrival of detected channel paths can be estimated. Demodulated OFDM-subcarrier represent the simplest special case of such a channel estimation.

It is advantageous for the present invention when the transmission channel between the first and the last frequency hopping transmission only alters to an insignificant extent or does not alter at all.

Figure 15:
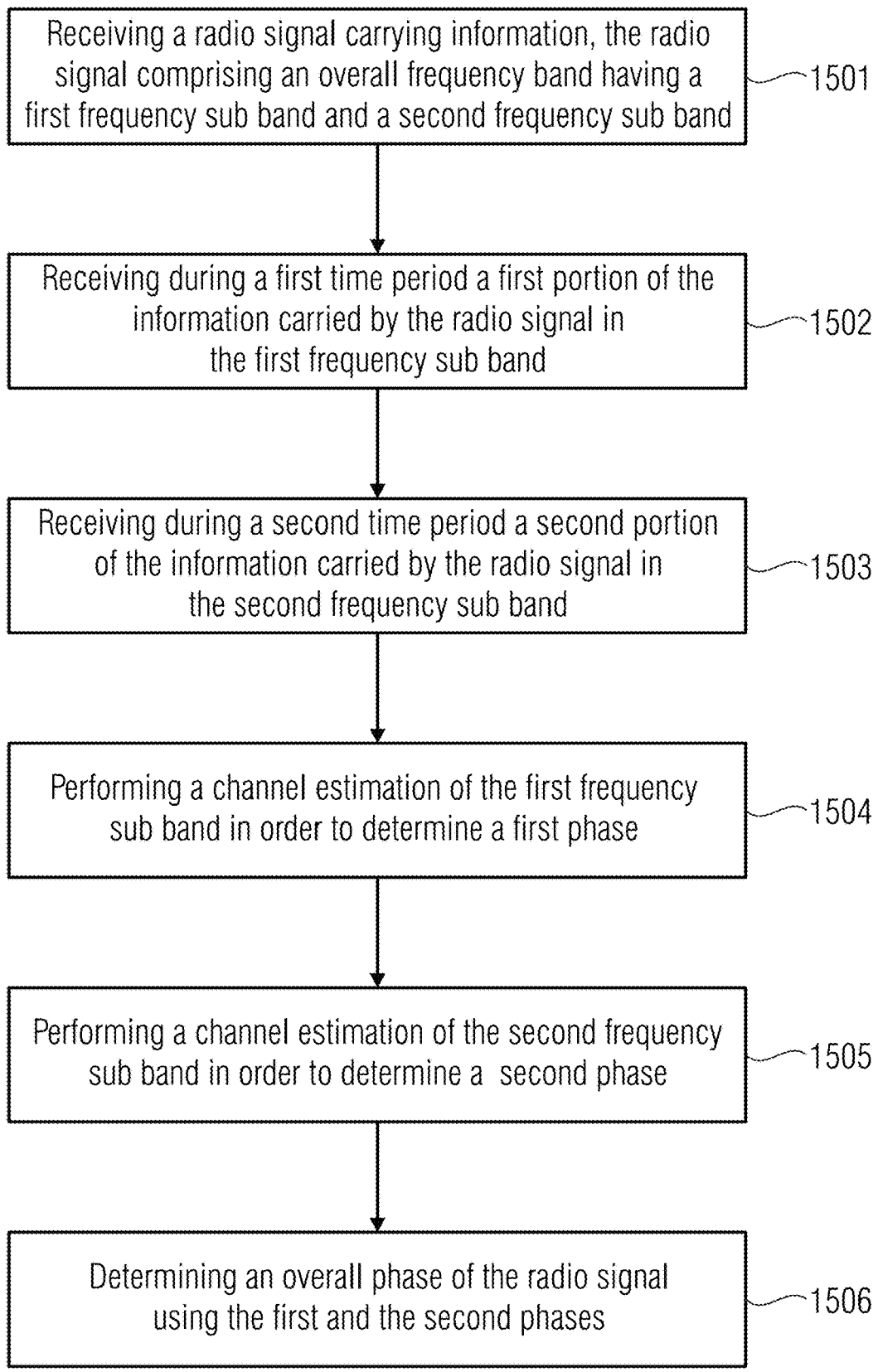
FIG. 15 shows a block diagram of an inventive method.
Figure 16:
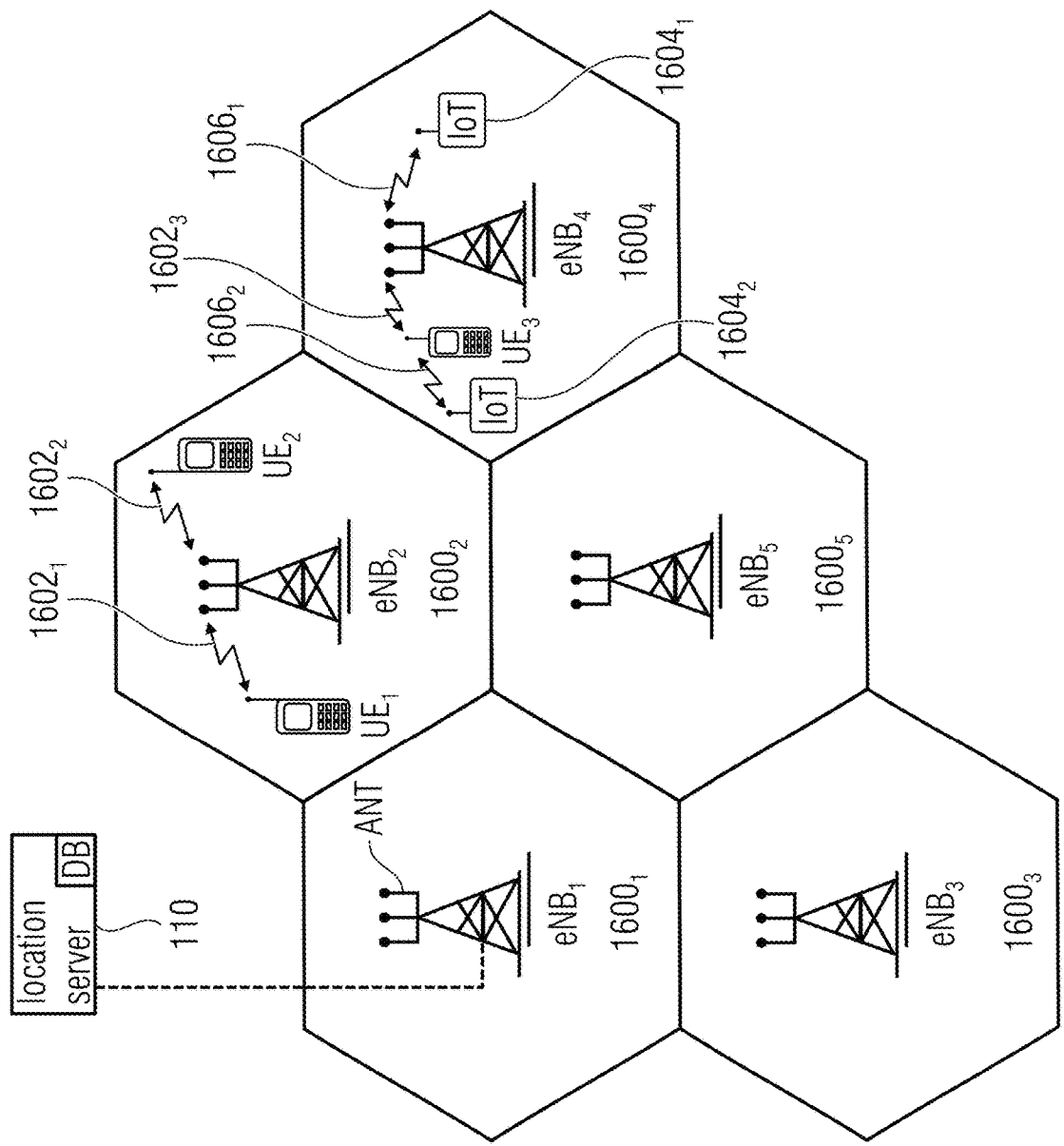
FIG. 16 shows a commonly known cellular wireless communication network.

The invention further concerns a method as shown in FIG. 15.

In block 1501, a radio signal carrying information is received, wherein the radio signal comprises an overall frequency band having a first frequency sub band and a second frequency sub band.

In block 1502, a first portion of the information carried by the radio signal is received during a first time period in the first frequency sub band.

In block 1503, a second portion of the information carried by the radio signal is received during a second time period in the second frequency sub band.

In block 1504, a channel estimation of the first frequency sub band is performed in order to determine a first phase.

In block 1505, a channel estimation of the second frequency sub band is performed in order to determine a second phase.

In block 1056, an overall phase basis of the radio signal is determined using the first and the second phases.

The inventive principle may, for example, be used in the following fields of application:

Position estimation for emergency calls (E911).

Other occasions where the position of a mobile user is needed, e.g., for navigation, for business or advertisement, and for other personal or public causes. The invented algorithm may also help to synchronise networks e.g. for use in a cellular communication network or a locating system.

Application examples come also from cellular radio networks.

1) example (beyond WiFi) is the LTE downlink
   one user employs multiple LTE resource blocks at the same time (resource block aggregation) or even multiple carriers at the same time (carrier aggregation)
   channel estimation e.g. based on PRS (position reference symbols) PSRS, SSRS or CSI-RS (channel state information reference signals)
   overlapping or non overlapping resource blocks may be aligned according to the described method
   the channel or the delay estimated is refined based on the aligned channel reference data 2) example LTE uplink
   the eNodeB user allocates multiple LTE resource blocks at the same time to the same user (resource block aggregation) or even multiple carriers at the same time (carrier aggregation)
   the channel estimation (time synchronization) is performed based on reference symbols sounding reference signals (e.g. SRS)
   the channel estimates are aligned (or the synchronization sequences are aligned)
   the channel or the delay estimated is refined based on the aligned channel reference data 3) 5G
   current ideas intend dynamic frequency and time allocation in FRG (contiguous frequency resource blocks)
   thus overlapping FRGs may occur (at least in the uplink) anyway
   channel and delay may be computed based on aligned synchronization sequences In the following, additional embodiments and aspects of the invention will be described which can be used individually or in combination with any of the features and functionalities and details described herein.

According to a first aspect, a receiver is configured to receive a radio signal carrying information, the radio signal 100 comprising an overall frequency band $f_{overall}$ having a first frequency sub band 101 and a second frequency sub band 102, wherein the receiver is further configured to receive during a first time period $T_1$ a first portion 111 of the information carried by the radio signal in the first frequency sub band 101, and to receive during a second time period $T_2$ a second portion 112 of the information carried by the radio signal in the second frequency sub band 102, to perform a channel estimation 121 of the first frequency sub band 101 in order to determine a first phase 131 and to perform a channel estimation 122 of the second frequency sub band 102 in order to determine a second phase 132, to determine a relative phase error $\Delta\Phi_{Pa,Pb}$ between the first phase 131 and the second phase 132, and to determine an overall phase basis 133 of the radio signal under compensation of the relative phase error $\Delta\Phi_{Pa,Pb}$.

According to a second aspect when referring back to the first aspect, the first frequency sub band 101 and the second frequency sub band 102 at least partially overlap in the frequency domain.

According to a third aspect when referring back to the second aspect, the first frequency sub band 101 and the second frequency sub band 102 comprise a spectral overlap 202 to 205 of at least 10%, advantageously of at least 20% and more advantageously between 20% to 50%.

According to a fourth aspect when referring back to any one of the second or third aspects, the receiver is configured to compare the first phase 131 with the second phase 132 within the spectral overlap 201 to 206 in order to determine the overall phase basis 133 of the radio signal.

According to a fifth aspect when referring back to the first aspect, the overall frequency band $f_{overall}$ of the radio signal comprises a frequency band gap 961 that is located between the first frequency sub band 101 and the second frequency sub band 102, wherein the receiver is configured to estimate the first phase 912 within the frequency band gap 961 and the second phase 921 within the frequency band gap 961 by means of extrapolation.

According to a sixth aspect when referring back to the fifth aspect, the receiver is configured to compare an extrapolated portion 912 of the first phase 941 within the frequency band gap 961 with an extrapolated portion 921 of the second phase 942 within the frequency band gap 961 in order to determine the overall phase basis 944 of the radio signal.

According to a seventh aspect when referring back to any one of the preceding aspects, the receiver is configured to coherently align the first phase 131 and the second phase 132 by a phase shift, wherein one of the first and the second phases 131, 132 serves as a reference phase for the phase shift of the other one of the first and the second phases 131, 132, in order to determine a coherent overall phase basis 133 of the radio signal.

According to an eighth aspect when referring back to any one of the preceding aspects, the first frequency band 101, 102 and the second frequency band comprise the same bandwidth.

According to a ninth aspect when referring back to any one of the preceding aspects, the receiver is configured to receive the first frequency sub band 101 and the second frequency sub band 102 at different discrete points of time in the time domain.

According to a tenth aspect when referring back to the ninth aspect, the receiver is configured to receive the first frequency sub band 101 and the second frequency sub band 102 sequentially one after another in the time domain.

According to an eleventh aspect when referring back to the ninth aspect, the receiver is configured to receive a plurality of consecutive frequency sub bands 101 to 105 sequentially one after another in the time domain, wherein the plurality of frequency sub bands 101 to 105 contains the first and second frequency sub bands 101, 102 and at least one further frequency sub band 103, 104, 105 containing a further portion of the information carried by the radio signal.

According to a twelfth aspect when referring back to the ninth aspect, the receiver is configured to receive a plurality of consecutive frequency sub bands 101 to 106 in a randomized order in the time domain, wherein the plurality of frequency sub bands 101 to 105 contains the first and second frequency sub bands 101, 102 and at least one further frequency sub band 103, 104, 105 containing a further portion of the information carried by the radio signal.

According to a thirteenth aspect when referring back to any one of the preceding aspects, at least one of the first and the second frequency sub bands 101, 102 is channel-bundled together with at least one further consecutive frequency sub band 103 to form a channel-bundled frequency band, wherein the receiver is configured to receive the channel-bundled frequency band.

According to a fourteenth aspect when referring back to the thirteenth aspect, the second frequency sub band 102 has a larger bandwidth than the first frequency sub band 101, wherein the bandwidth of the second frequency sub band 102 covers the first frequency sub band 101 and optionally at least one further sub band 103 to form a channel-bundled frequency sub band.

According to a fifteenth aspect when referring back to any one of the preceding aspects, the first portion of the information carried by the radio signal in the first frequency sub band 101 and the second portion of the information carried by the radio signal in the second frequency sub band 102 each contains a preamble portion 701 to 705 and optionally a user data portion 711 to 715, wherein the receiver is configured to perform the channel estimation for each of the first and the second frequency sub bands 101, 102, wherein the channel estimation is based on the respective preamble portion 701 to 705.

According to a sixteenth aspect when referring back to the fifteenth aspect, at least one of the first sub band 101 and the second sub band 102 comprises one or more pilot data, wherein said pilot data is spread over the spectrum of the respective frequency sub band 101, 102.

According to a seventeenth aspect when referring back to any one of the preceding aspects, at least one of the first portion of the information carried in the first frequency sub band 101 or the second portion of the information in the second frequency sub band 102 contains a Position Reference Signal PRS.

According to an eighteenth aspect when referring back to any one of the preceding aspects, the receiver is configured to receive at least a spectral portion 181' of a first predetermined radio signal 181 during the first time period $T_1$, and to receive and at least a spectral portion 182' of a second predetermined radio signal 182 during the second time period $T_2$, wherein the bandwidth of the first predetermined radio signal 181 is larger than the bandwidth of the first frequency sub band 101 and includes the first frequency sub band 101, and wherein the bandwidth of the second predetermined radio signal 182 is larger than the bandwidth of the second frequency sub band 102 and includes the second frequency sub band 102.

According to a nineteenth aspect when referring back to the eighteenth aspect, the receiver is configured to perform the channel estimation of the first frequency sub band 101 in a frequency band 173 spectrally covering the first frequency sub band 101 and at least a spectral portion 181a, 181b of the first predetermined radio signal 181 located outside the first frequency sub band 101, and to perform the channel estimation of the second frequency sub band 102 in a frequency band 174 spectrally covering the second frequency sub band 102 and at least a spectral portion 182c of the second predetermined radio signal 182 located inside the second frequency sub band 102, wherein said spectral portion 181a, 181b of the first predetermined radio signal 181 located outside the first frequency sub band 101 spectrally overlaps with said spectral portion 182c of the second predetermined radio signal 182 located inside the second frequency sub band 102.

According to a twentieth aspect when referring back to any one of the eighteenth or nineteenth aspects, the receiver is configured to perform the channel estimation of the first frequency sub band 101 in a frequency band 173 spectrally covering the first frequency sub band 101 and at least a spectral portion 181c of the first predetermined radio signal 181 located inside the first frequency sub band 101, and to perform the channel estimation of the second frequency sub band 102 in a frequency band 174 spectrally covering the second frequency sub band 102 and at least a spectral portion 182a, 182b of the second predetermined radio signal 182 located outside the second frequency sub band 102, wherein said spectral portion 181c of the first predetermined radio signal 181 located inside the first frequency sub band 101 spectrally overlaps with said spectral portion 182a, 182b of the second predetermined radio signal 182 located outside the second frequency sub band 102.

According to a twenty-first aspect when referring back to any one of the eighteenth to twentieth aspects, the receiver is configured to perform the channel estimation of the first frequency sub band 101 in a frequency band 173 spectrally covering the first frequency sub band 101 and a spectral portion 181*c* of the first predetermined radio signal 181 located inside the first frequency sub band 101 and a spectral portion 181*a* of the first predetermined radio signal 181 located outside the first frequency sub band 101, and to perform the channel estimation of the second frequency sub band 102 in a frequency band 174 spectrally covering the second frequency sub band 102 and a spectral portion 182*b* of the second predetermined radio signal 182 located outside the second frequency sub band 102 and a spectral portion 182*c* of the second predetermined radio signal 182 located inside the second frequency sub band 102, wherein said spectral portion 181*c* of the first predetermined radio signal 181 located inside the first frequency sub band 101 spectrally overlaps with said spectral portion 182*b* of the second predetermined radio signal 182 located outside the second frequency sub band 102, and wherein said spectral portion 181*b* of the first predetermined radio signal 181 located outside the first frequency sub band 101 spectrally overlaps with said spectral portion 182*c* of the second predetermined radio signal 182 located inside the second frequency sub band 102.

According to a twenty-second aspect when referring back to any one of the eighteenth to twenty-first aspects, the receiver is configured to compare the first phase 131 with the second phase 132 and to align the first and second phases 131, 132 to determine the overall phase basis 133, said aligning being based on one or more of the spectrally overlapping spectral portions 181*a*, 181*b*, 181*c*, 182*a*, 182*b*, 182*c* of the first and second predetermined radio signals 181, 182.

According to a twenty-third aspect when referring back to any one of the first to seventeenth aspects, the receiver is configured to receive during the second time period $T_2$ at least a spectral portion 182$_2$ of a predetermined radio signal 182 being spectrally located inside the second frequency sub band 102, and to receive during the first time period $T_1$ a spectral portion 182$_1$ of said predetermined radio signal 182, wherein the spectral portion 182$_1$ received during the first time period $T_1$ spectrally overlaps with the spectral portion 160$_2$ received during the second time period $T_2$.

According to a twenty-fourth aspect when referring back to the twenty-third aspect, the receiver is configured to perform the channel estimation of the first frequency sub band 101 within a frequency band 173 spectrally covering the first frequency sub band 101 and the spectral portion 182$_1$ of the predetermined radio signal 182 received during the first time period $T_1$, and to perform the channel estimation of the second frequency sub band 102 within a frequency band 174 spectrally covering the second frequency sub band 102 and the spectral portion 182$_2$ of the predetermined radio signal 182 received during the second time period $T_2$.

According to a twenty-fifth aspect when referring back to any one of the twenty-third to twenty-fourth aspects, the receiver is configured to compare the first phase 131 with the second phase 132 and to align the first and second phases 131, 132 to determine the overall phase basis 133, said aligning being based on the spectrally overlapping spectral portions 182$_1$, 182$_2$ of the predetermined radio signal 182 received during the first and second time periods $T_1$, $T_2$.

According to a twenty-sixth aspect when referring back to any one of the first to seventeenth aspects, the receiver is configured to receive during the first time period $T_1$ at least a spectral portion 181*a*, 181*b* of a first predetermined radio signal 181, which spectral portion 181*a*, 181*b* is located outside the first frequency sub band 101, and to receive during the second time period $T_2$ a second predetermined radio signal 182, the second predetermined radio signal 182 being located at least partially inside the second frequency sub band 102 and comprising at least a spectral portion 182*a* spectrally overlapping with the spectral portion 181*a*, 181*b* of the first predetermined radio signal 181.

According to a twenty-seventh aspect when referring back to the twenty-sixth aspect, the receiver is configured to perform the channel estimation of the first frequency sub band 101 within a frequency band 173 spectrally covering the first frequency sub band 101 and the spectral portion 181*a*, 181*b* of the first predetermined radio signal 181 outside the first frequency sub band 101, and to perform the channel estimation of the second frequency sub band 102 within a frequency band 174 spectrally covering the second frequency sub band 102 and the spectral portion 182*a* of the second predetermined radio signal 182 spectrally overlapping with the spectral portion 181*a*, 181*b* of the first predetermined radio signal 181.

According to a twenty-eighth aspect when referring back to any one of the twenty-sixth or twenty-seventh aspects, the first predetermined radio signal 181 received during the first time period $T_1$ is located, as to the time domain, inside the first frequency sub band 101.

According to a twenty-ninth aspect when referring back to any one of the twenty-sixth or twenty-seventh aspects, the first predetermined radio signal 181 received during the first time period $T_1$ is located, as to the time domain, outside the first frequency sub band 101.

According to a thirtieth aspect when referring back to any one of the eighteenth to twenty-ninth aspects, each of the first and the second predetermined radio signals 181, 182 comprises repeating sequences, wherein at least a portion of a repeating sequence of the first predetermined radio signal 181 is identical to at least a portion of a repeating sequence of the second predetermined radio signal 182 in at least their spectrally overlapping spectral portions 181*a*, 181*b*, 181*c*, 182*a*, 182*b*, 182*c* for establishing a coherency of the overall phase basis 133.

According to a thirty-first aspect when referring back to any one of the eighteenth to twenty-ninth aspects, the first and second predetermined radio signals 181, 182 are predetermined Positioning Reference Signals—PRS—.

According to a thirty-second aspect when referring back to any one of the first to seventeenth aspects, the receiver is configured to receive during the first time period $T_1$ the first frequency sub band 101 and a spectral portion 202*a* of the second frequency sub band 102, and to receive during the second time period $T_2$ the second frequency sub band 102 and a spectral portion 201*b* of the first frequency sub band 101.

According to a thirty-third aspect when referring back to the thirty-second aspect, the receiver is configured to perform the channel estimation of the first frequency sub band 101 in a frequency band 173 spectrally covering the first frequency sub band 101 and the spectral portion 202*a* of the second frequency sub band 102 both received during the first time period $T_1$, and to perform the channel estimation of the second frequency sub band 102 in a frequency band 174 spectrally covering the second frequency sub band 102 and the spectral portion 201*b* of the first frequency sub band 101 both received during the second time period $T_2$, wherein the spectral portion 201*b* of the first frequency sub band 101 received during the second time period $T_2$ spectrally overlaps with a frequency-corresponding spectral portion 201*a* of the first frequency sub band 101 received during the first time period $T_1$ and/or wherein the spectral portion 202*a* of the second frequency sub band 102 received during the first time period T$_1$ spectrally overlaps with a frequency-corresponding spectral portion 202b of the second frequency sub band 102 received during the second time period T$_2$.

According to a thirty-fourth aspect when referring back to the thirty-third aspect, the receiver is configured to compare the first phase 131 with the second phase 132 and to align the first and second phases 131, 132 to determine the overall phase basis 133, said aligning being based on the spectral overlapping portions 201a, 201b, 202a, 202b of the first and second frequency sub bands 101, 102 respectively received during the first and second time periods T$_1$, T$_2$.

According to a thirty-fifth aspect when referring back to any one of the preceding aspects, the receiver is configured to determine a delay 841, 842, 843 of the information carried by the radio signal by using the overall phase basis 834, 944 of the radio signal and to provide the delay 841, 842, 843 to a position detection unit 850 that is configured to determine, based on the delay 841, 842, 843, the spatial location of the receiver within a wireless communication network.

According to a thirty-sixth aspect when referring back to the thirty-fifth aspect, the position detection 850 unit is configured to compute the spatial position of the receiver by using the delay 841, 842, 843 for at least one of a time of arrival ToA, a Time Difference of Arrival TDoA and a Relative Signal Timing Difference RSTD calculation.

According to a thirty-seventh aspect when referring back to any one of the preceding aspects, the receiver comprises at least two antennas and wherein the receiver is configured to determine an Angle of Arrival AoA and to provide the AoA-information to a position detection unit 850 that is configured to determine, based on the AoA-Information, the spatial location of the receiver within a wireless communication network.

According to a thirty-eighth aspect when referring back to any one of the thirty-fifth to thirty-seventh aspects, the receiver comprises the position detection unit 850, or wherein the position detection unit 850 is arranged remote from the receiver.

According to a thirty-ninth aspect, a wireless communication network 1300, 1400 comprises a receiver 1301 to 1304 of one of the preceding claims and a transmitter 1301 to 1304.

According to a fortieth aspect when referring back to the thirty-ninth aspect, the receiver 1301 to 1304 is a mobile terminal UE and the transmitter 1301 to 1304 is a base station eNB$_1$-eNB$_3$, and wherein the wireless communication network 1300, 1400 uses an IFFT Inverse Fast Fourier Transform based radio signal.

According to a forty-first aspect when referring back to the fortieth aspect, the radio signal is an IFFT-based signal including at least one of Orthogonal Frequency Division Multiplex—OFDM—with Cyclic Prefix—CP—, Discrete Fourier Transform-Spread Orthogonal Frequency Division Multiplex—DFT-s-OFDM—with CP, Single Carrier Code Division Multiple Access—SC-FDMA—, Multi Carrier Code Division Multiple Access—MC-CDMA—, Code Division Multiple Access-CDMA—, Generalized Frequency Division Multiplexing-GDFM—, Filterbank-Multicarrier modulation-FBMC—, Offset Quadrature Amplitude Modulation-OFDM/OQAM—, or IFFT-based waveforms without CP.

According to a forty-second aspect, a method comprises: receiving a radio signal 100 carrying information, the radio signal 100 comprising an overall frequency band f$_{overall}$ having a first frequency sub band 101 and a second frequency sub band 102, receiving during a first time period T$_1$ a first portion 111 of the information carried by the radio signal 100 in the first frequency sub band 101, and receiving during a second time period T$_2$ a second portion 112 of the information carried by the radio signal 100 in the second frequency sub band 102, performing a channel estimation 121 of the first frequency sub band 101 in order to determine a first phase 131 and performing a channel estimation 122 of the second frequency sub band 102 in order to determine a second phase 132, determining a relative phase error $\Delta\Phi_{Pa,Pb}$ between the first phase 131 and the second phase 132, and determining an overall phase basis 133 of the radio signal under compensation of the relative phase error $\Delta\Phi_{Pa,Pb}$.

According to a forty-third aspect, a non-transitory computer program product comprises a computer readable medium storing instructions which, when executed on a computer, perform the method of the forty-second aspect.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[bluetooth40] Bluetooth SIG "Specification of the Bluetooth System" Version 4.0, December, 2009.

[capon69] Capon, J. "High-Resolution Frequency-Wavenumber Spectrum Analysis", Proceedings of the IEEE, vol. 57, No. 8, August 1969.

[chen10] Xi Chen; Qiao, D., "HaND: Fast Handoff with Null Dwell Time for IEEE 802.11 Networks," in IEEE Proceedings in INFOCOM, 2010, pp.1-9, 14-19 March 2010.

[farhang82] Farhang-Boroujeny, B., "OFDM Versus Filter Bank Multicarrier," in Signal Processing Magazine, IEEE , vol. 28, no.3, pp.92-112, May 2011.

[fcc911] Federal Communications Commission, "FCC 11-107, Notice of Proposed Rulemaking", Minutes & Report, July 2011.

[fettweis09] Fettweis, G.; Krondorf, M.; Bittner, S., "GFDM-Generalized Frequency Division Multiplexing," in IEEE Conference on Vehicular Technology, 2009, VTC Spring 2009. no. 69, April 2009.

[glisic00] Glisic, S.; Nikolic, Z.; Milosevic, N.; Pouttu, A., "Advanced frequency hopping modulation for spread spectrum WLAN," IEEE Journal on Selected Areas in Communications, vol. 18, no.1, pp.16-29, January 2000.

[goetz13] Gerald Götz, A. G., "Coherent Time Difference of Arrival Estimation Techniques for Frequency Hopping GSM Mobile Radio Signals", Oldenbourg Wissenschaftsverlag, Juni 2013. (online)

[hadaschik15] Hadaschik, N.; Sackenreuter, B.; Schäfer, M.; and M. Faßbinder, "Direct Positioning with Multiple Antenna Arrays." Proceedings of the International Conference on Indoor Positioning and Indoor Navigation (IPIN 2015), Banff, Calif., October 2015.

[krim96] Krim, H.; and M. Viberg, "Two decades of array signal processing research", in IEEE Transactions on Signal Processing Magazine, July 1996.

[myung06] Myung, H. G.; Junsung Lim; Goodman, D., "Single carrier FDMA for uplink wireless transmission," in IEEE Magazine on Vehicular Technology, vol.1, no.3, pp.30-38, September 2006.

[roy89] Roy, R., and T. Kailath. "ESPRIT-estimation of signal parameters via rotational invariance techniques." Acoustics, Speech and Signal Processing, IEEE Transactions on 37.7 (1989): 984-995.

[schmidt86a] Schmidt, R. O., "Multiple Emitter Location and Signal Parameter Estimation," IEEE Trans, Antennas Propagation, Vol. AP-34 (March 1986), pp.276-280.

[schmidt86b] Schmidt, R. O., and R. E. Franks. "Multiple source DF signal processing: an experimental system." Antennas and Propagation, IEEE Transactions on 34.3 (1986): 281-290.

[speth99] Speth, M.; Fechtel, S.; Fock, G.; and H. Meyr, "Optimum receiver design for OFDM-based broadband transmission .II. A case study," IEEE Transactions on in Communications, vol. 49, no. 4, pp. 571-578, April 2001.

[scholand05] Soholand, T.; Faber, T.; Juho Lee; Joonyoung Cho, Yunok Cho and Peter Jung "Physical Layer Performance of a Novel Fast Frequency Hopping-OFDM Concept", EURASIP, Proceedings of the IST Mobile Summit 2005, pp. 19-23, Dresden, 2005.

[siohan02] Siohan, P.; Siclet, C.; Lacaille, N., "Analysis and design of OFDM/OQAM systems based on filterbank theory," in IEEE Transactions on Signal Processing, vol. 50, no.5, pp.1170-1183, May 2002.

[stadius07] Stadius, K.; Rapinoja, T.; Kaukovuori, J.; Ryynanen, J.; Halogen, K. A. I., "Multitone Fast Frequency-Hopping Synthesizer for UWB Radio," IEEE Transactions on Microwave Theory and Techniques, vol. 55, no. 8, pp. 1633-1641, August 2007.

[timor82] Timor, Uzi, "Multitone frequency-hopped MFSK system for mobile radio," in The Bell System Technical Journal, vol. 61, no. 10, pp.3007-3017, December 1982.

[vanderveen97] Vanderveen, Michaela C., Constantinos B. Papadias, and Arogyaswami Paulraj. "Joint angle and delay estimation (JADE) for muitipath signals arriving at an antenna array." Communications Letters, IEEE 1.1 (1997): 12-14.

[van der Veen 97] van der Veen, A-J.; Michaela C. Vanderveen; and A. Paulraj, "SI-JADE: an algorithm for joint angle and delay estimation using shift-invariance properties," Signal Processing Advances in Wireless Communications, First IEEE Signal Processing Workshop on. IEEE, 1997.

[weiss05] Weiss, Anthony J.; and Alon Amar, "Direct position determination of multiple radio signals." EURASIP Journal on Applied Signal Processing 2005.1 (2005): 37-49.

[wimedia15] WiMEDIA Alliance "Muitiband OFDM Physical Layer Specificaton", Version 1.5, August 2009.

[Yilmazer10] Yilmazer, N.; Sarkar, T. K.; and M. Salazar-Palma, "DOA Estimation using Matrix Pencil and ESPRIT methods using single and multiple snapshots," International Symposium on Electromagnetic Theory (EMTS), 2010 URSI, pp. 215-218, 16-19 August 2010.

The invention claimed is:

1. A receiver configured to receive, by means of a frequency hopping method, a radio signal carrying information, the radio signal comprising an overall frequency band $f_{overall}$ comprising a first frequency sub band and a second frequency sub band,
   wherein the receiver is further configured
      to receive during a first time period $T_1$ a first portion of the information carried by the radio signal in the first frequency sub band, and to receive, after a frequency hop and during a second time period $T_2$ a second portion of the information carried by the radio signal in the second frequency sub band, to perform a channel estimation of the first frequency sub band in order to determine a first channel estimation result and to perform a channel estimation of the second frequency sub band in order to determine a second channel estimation result, to estimate a relative phase error $\Delta\Phi_{Pa,Pb}$ based on the first channel estimation result and the second channel estimation result, and to determine an overall phase basis of the radio signal under compensation of the relative phase error $\Delta\Phi_{Pa,Pb}$, wherein the first frequency sub band and the second frequency sub band comprise a spectral overlap in the frequency domain, and wherein the receiver is configured to superimpose the first channel estimation result and the second channel estimation result within the spectral overlap after determining the overall phase basis of the radio signal from the channel estimates in the spectral overlap.

2. The receiver according to claim 1, wherein the first frequency sub band and the second frequency sub band comprise a spectral overlap of at least 10%, or of at least 20%, or between 20% to 50%.

3. The receiver of claim 1, wherein the receiver is configured to coherently align the phase of the first sub band and the phase of the second sub band by a phase shift, wherein one of the phases serves as a reference phase for the phase shift of the other one of the phases, in order to determine a coherent overall phase basis of the radio signal.

4. The receiver of claim 1, wherein the first frequency band and the second frequency band comprise the same bandwidth.

5. The receiver of claim 1, wherein the receiver is configured to receive the first frequency sub band and the second frequency sub band at different discrete points of time in the time domain.

6. The receiver of claim 5, wherein the receiver is configured to receive the first frequency sub band and the second frequency sub band sequentially one after another in the time domain.

7. The receiver of claim 5, wherein the receiver is configured to receive a plurality of consecutive frequency sub bands sequentially one after another in the time domain, wherein the plurality of frequency sub bands comprises the first and second frequency sub bands and at least one further frequency sub band comprising a further portion of the information carried by the radio signal.

8. The receiver of claim 5, wherein the receiver is configured to receive a plurality of consecutive frequency sub bands in a randomized order in the time domain, wherein the plurality of frequency sub bands comprises the first and second frequency sub bands and at least one further frequency sub band comprising a further portion of the information carried by the radio signal.

9. The receiver of claim 1, wherein at least one of the first and the second frequency sub bands is channel-bundled together with at least one further consecutive frequency sub band to form a channel-bundled frequency band, wherein the receiver is configured to receive the channel-bundled frequency band.

10. The receiver of claim 9, wherein the second frequency sub band comprises a larger bandwidth than the first frequency sub band, wherein the bandwidth of the second frequency sub band covers the first frequency sub band and optionally at least one further sub band to form a channel-bundled frequency sub band.

11. The receiver of claim 1, wherein the first portion of the information carried by the radio signal in the first frequency sub band and the second portion of the information carried by the radio signal in the second frequency sub band each comprises a preamble portion and optionally a user data portion, wherein the receiver is configured to perform the channel estimation for each of the first and the second frequency sub bands, wherein the channel estimation is based on the respective preamble portion.

12. The receiver of claim 11, wherein at least one of the first sub band and the second sub band comprises one or more pilot data, wherein said pilot data is spread over the spectrum of the respective frequency sub band.

13. The receiver of claim 1, wherein at least one of the first portion of the information carried in the first frequency sub band or the second portion of the information in the second frequency sub band comprises a Position Reference Signal PRS.

14. The receiver of claim 1, wherein the receiver is configured to determine a delay of the information carried by the radio signal by using the overall phase basis of the radio signal and to provide the delay to a position detection unit that is configured to determine, based on the delay, the spatial location of the receiver within a wireless communication network.

15. The receiver of claim 14, wherein the position detection unit is configured to compute the spatial position of the receiver by using the delay for at least one of a time of arrival ToA, a Time Difference of Arrival TDoA and a Relative Signal Timing Difference RSTD calculation.

16. The receiver of claim 1, wherein the receiver comprises at least two antennas and wherein the receiver is configured to determine an Angle of Arrival AoA and to provide the AoA-information to a position detection unit that is configured to determine, based on the AoA-Information, the spatial location of the receiver within a wireless communication network.

17. The receiver of claim 14, wherein the receiver comprises the position detection unit, or wherein the position detection unit is arranged remote from the receiver.

18. A wireless communication network comprising a receiver of claim 1 and a transmitter.

19. The wireless communication network of claim 18, wherein the receiver is a mobile terminal UE and the transmitter is a base station $eNB_1$-$eNB_3$, and wherein the wireless communication network uses an IFFT Inverse Fast Fourier Transform based radio signal.

20. The wireless communication network according to claim 18, wherein the radio signal is an IFFT-based signal comprising at least one of Orthogonal Frequency Division Multiplex—OFDM—with Cyclic Prefix—CP—, Discrete Fourier Transform-Spread Orthogonal Frequency Division Multiplex—DFT-s-OFDM—with CP, Single Carrier Code Division Multiple Access—SC-FDMA—, Multi Carrier Code Division Multiple Access—MC-CDMA—, Code Division Multiple Access—CDMA—, Generalized Frequency Division Multiplexing—GDFM—, Filterbank-Multicarrier modulation—FBMC—.

Offset Quadrature Amplitude Modulation—OFDM/OQAM—, or

IFFT-based waveforms without CP.

21. A receiver configured to receive, by means of a frequency hopping methnod, a radio signal carrying information, the radio signal comprising an overall frequency band $f_{overall}$ comprising a first frequency sub band and a second frequency sub band, wherein the receiver is further configured to receive during a first time period $T_1$ a first portion of the information carried by the radio signal in the first frequency sub band, and to receive, after a frequency hop and during a second time period $T_2$ a second portion of the information carried by the radio signal in the second frequency sub band, to perform a channel estimation of the first frequency sub band in order to determine a first channel estimation result and to perform a channel estimation of the second frequency sub band in order to determine a second channel estimation result, to estimate a relative phase error $\Delta\Phi_{Pa,Pb}$ based on the first channel estimation result and the second channel estimation result, and to determine an overall phase basis of the radio signal under compensation of the relative phase error $\Delta\Phi_{Pa,Pb}$, wherein the overall frequency band $f_{overall}$ of the radio signal comprises a frequency band gap that is located between the first frequency sub band and the second frequency sub band, wherein the receiver is configured to extrapolate the channel transfer function of the first channel estimation result within the frequency band gap and to extrapolate the channel transfer function of the second channel estimation result within the frequency band gap, and wherein the receiver is configured to determine the overall phase basis of the radio signal based on the extrapolated channel transfer functions within the frequency band gap.

22. A receiver configured to receive, by means of a frequency hopping method, predetermined radio signals carrying information, the predetermined radio signals comprising an overall frequency band $f_{overall}$ comprising a first frequency sub band and a second frequency sub band, wherein the receiver is configured to receive at least a spectral portion of a first predetermined radio signal during a first time period $T_1$, and to receive, after a frequency hop, at least a spectral portion of a second predetermined radio signal during a second time to period $T_2$, wherein the bandwidth of the first predetermined radio signal is larger than the bandwidth of the first frequency sub band and comprises the first frequency sub band, and wherein the bandwidth of the second predetermined radio signal is larger than the bandwidth of the second frequency sub band and comprises the second frequency sub band, wherein the receiver is configured to perform a first channel estimation in order to determine a first channel estimation result and to perform a second channel estimation in order to determine a second channel estimation result, to estimate a relative phase error $\Delta\Phi_{Pa,Pb}$ based on the first channel estimation result and the second channel estimation result, and to determine an overall phase basis of the first and second predetermined radio signals under compensation of the relative phase error $\Delta\Phi_{Pa,Pb}$,

AND a) wherein the receiver is configured to perform the first channel estimation in a frequency band spectrally covering the first frequency sub band and at least a spectral portion of the first predetermined radio signal located outside the first frequency sub band, and to perform the second channel estimation in a frequency band spectrally covering the second frequency sub band and at least a spectral portion of the second predetermined radio signal located inside the second frequency sub band, wherein said spectral portion of the first predetermined radio signal located outside the first frequency sub band spectrally overlaps with at least a portion of said spectral portion of the second predetermined radio signal located inside the second frequency sub band, and to use the spectrally overlapping spectral portions for determining the overall phase basis

OR b) wherein the receiver is configured to perform the first channel estimation in a frequency band spectrally covering the first frequency sub band and at least a spectral portion of the first predetermined radio signal located inside the first frequency sub band, and to perform the second channel estimation in a frequency band spectrally covering the second frequency sub band and at least a spectral portion of the second predetermined radio signal located outside the second frequency sub band, wherein said spectral portion of the first predetermined radio signal located inside the first frequency sub band spectrally overlaps with said spectral portion of the second predetermined radio signal located outside the second frequency sub band, and to use the spectrally overlapping spectral portions for determining the overall phase basis,

OR c) wherein the receiver is configured to perform the first channel estimation in a frequency band spectrally covering the first frequency sub band and a spectral portion of the first predetermined radio signal located inside the first frequency sub band and a spectral portion of the first predetermined radio signal located outside the first frequency sub band, and to perform the second channel estimation in a frequency band spectrally covering the second frequency sub band and a spectral portion of the second predetermined radio signal located outside the second frequency sub band and a spectral portion of the second predetermined radio signal located inside the second frequency sub band, wherein said spectral portion of the first predetermined radio signal located inside the first frequency sub band spectrally overlaps with said spectral portion of the second predetermined radio signal located outside the second frequency sub band, and wherein said spectral portion of the first predetermined radio signal located outside the first frequency sub band spectrally overlaps with said spectral portion of the second predetermined radio signal located inside the second frequency sub band, and to use the spectrally overlapping spectral portions for determining the overall phase basis.

23. The receiver of claim 22, wherein the receiver is configured to superimpose the first channel estimation result and the second channel estimation result after determining the overall phase basis based on one or more of the spectrally overlapping spectral portions of the first and second predetermined radio signals.

24. The receiver of claim 22, wherein each of the first and the second predetermined radio signals comprises repeating sequences, wherein at least a portion of a repeating sequence of the first predetermined radio signal is identical to at least a portion of a repeating sequence of the second predetermined radio signal in at least their spectrally overlapping spectral portions for establishing a coherency of the overall phase basis.

25. The receiver of claim 22, wherein the first and second predetermined radio signals are predetermined Positioning Reference Signals—PRS—.

26. A receiver configured to receive, by means of a frequency hopping method, a predetermined radio signal carrying information, the predetermined radio signal comprising an overall frequency band $f_{overall}$ comprising a first frequency sub band and a second frequency sub band,
  wherein the receiver is configured
    to receive, after a frequency hop and during a second time period $T_2$ at least a spectral portion of the predetermined radio signal being spectrally located inside the second frequency sub band, and to receive during a first time period T1 a spectral portion of the predetermined radio signal, wherein the spectral portion received during the first time period $T_1$ spectrally overlaps with the spectral portion received during the second time period $T_2$,
    to perform a first channel estimation within a frequency band spectrally covering the first frequency sub band and the spectral portion of the predetermined radio signal received during the first time period $T_1$,
    to perform a second channel estimation within a frequency band spectrally covering the second frequency sub band and the spectral portion of the predetermined radio signal received during the second time period $T_2$,
    to estimate a relative phase error $\Delta\Phi_{Pa,Pb}$ based on a channel estimation result of the first channel estimation and on a channel estimation result of the second channel estimation, and
    to use the spectrally overlapping spectral portions for determining an overall phase basis of the predetermined radio signal under compensation of the relative phase error $\Delta\Phi_{Pa,Pb}$.

27. The receiver of claim 26, wherein the receiver is configured to superimpose the channel estimation result of the first channel estimation and the channel estimation result of the second channel estimation after determining the overall phase basis based on the spectrally overlapping spectral portions of the predetermined radio signal received during the first and second time periods $T_1$, $T_2$.

28. A receiver configured to receive, by means of a frequency hopping methd, predetermined radio signals carrying information, the predetermined radio signals comprising an overall frequency band $f_{overall}$ comprising a first frequency sub band and a second frequency sub band,
  wherein the receiver is configured
    to receive during a first time period $T_1$ at least a spectral portion of a first predetermined radio signal, which spectral portion is located outside the first frequency sub band,
    to receive, after a frequency hop and during a second time period $T_2$ a second predetermined radio signal, the second predetermined radio signal being located at least partially inside the second frequency sub band and comprising at least a spectral portion spectrally overlapping with the spectral portion of the first predetermined radio signal,
    to perform a first channel estimation within a frequency band spectrally covering the first frequency sub band and the spectral portion of the first predetermined radio signal outside the first frequency sub band,
    to perform a second channel estimation within a frequency band spectrally covering the second frequency sub band and the spectral portion of the second predetermined radio signal spectrally overlapping with the spectral portion of the first predetermined radio signal,
    to estimate a relative phase error $\Delta\Phi_{Pa,Pb}$ based on a channel estimation result of the first channel estimation and on a channel estimation result of the second channel estimation, and
    to use the spectrally overlapping spectral portions for determining an overall phase basis of the predetermined radio signal under compensation of the relative phase error $\Delta\Phi_{Pa,Pb}$.

29. The receiver of claim 28, wherein the first predetermined radio signal received during the first time period $T_1$ is located, as to the time domain, inside the first frequency sub band.

30. The receiver of claim 28, wherein the first predetermined radio signal received during the first time period $T_1$ is located, as to the time domain, outside the first frequency sub band.

31. A receiver configured to receive, by means of a frequency hopping method, during a first time period $T_1$ a first frequency sub band and a spectral portion of a second frequency sub band, and to receive, after a frequency hop and during a second time period $T_2$ a second frequency sub band and a spectral portion of the first frequency sub band,
  wherein the receiver is configured
    to perform a first channel estimation in a frequency band spectrally covering the first frequency sub band and the spectral portion of the second frequency sub band both received during the first time period $T_1$,
    to perform a second channel estimation in a frequency band spectrally covering the second frequency sub band and the spectral portion of the first frequency sub band both received during the second time period $T_2$,
    wherein the spectral portion of the first frequency sub band received during the second time period $T_2$ spectrally overlaps with a frequency-corresponding spectral portion of the first frequency sub band received during the first time period $T_1$ and/or wherein the spectral portion of the second frequency sub band received during the first time period $T_1$ spectrally overlaps with a frequency-corresponding spectral portion of the second frequency sub band received during the second time period $T_2$,
    to estimate a relative phase error $\Delta\Phi_{Pa,Pb}$ based on a channel estimation result of the first channel estimation and on a channel estimation result of the second channel estimation, and
    to use said spectral overlapping portions of the first and second frequency sub bands for determining an overall phase basis of the predetermined radio signal under compensation of the relative phase error $\Delta\Phi_{Pa,Pb}$.

32. The receiver of claim 31, wherein the receiver is configured to superimpose the channel estimation result of the first channel estimation and the channel estimation result of the second channel estimation after determining the overall phase basis based on the spectral overlapping portions of the first and second frequency sub bands respectively received during the first and second time periods $T_1$, $T_2$.

33. A method comprising
  receiving, by means of a frequency hopping method, a radio signal carrying information, the radio signal comprising an overall frequency band $f_{overall}$ comprising a first frequency sub band and a second frequency sub band, wherein the first frequency sub band and the second frequency sub band comprise a spectral overlap in the frequency domain, receiving during a first time period $T_1$ a first portion of the information carried by the radio signal in the first frequency sub band, and receiving, after a frequency hop and during a second time period $T_2$ a second portion of the information carried by the radio signal in the second frequency sub band, performing a channel estimation of the first frequency sub band in order to determine a first channel estimation result and performing a channel estimation of the second frequency sub band in order to determine a second estimation result, estimating a relative phase error $\Delta\Phi_{Pa,Pb}$ based on the first channel estimation result and the second channel estimation result, and determining an overall phase basis of the radio signal under compensation of the relative phase error $\Delta\Phi_{Pa,Pb}$, and superimposing the first channel estimation result and the second channel estimation result within the spectral overlap after determining the overall phase basis of the radio signal from the channel estimates in the spectral overlap.

34. A non-transitory digital storage medium having a computer program stored thereon to perform the method of claim 33 when said computer program is run by a computer.

35. A method comprising receiving, by means of a frequency hopping method, a radio signal carrying information, the radio signal comprising an overall frequency band $f_{overall}$ comprising a first frequency sub band and a second frequency sub band, receiving during a first time period $T_1$ a first portion of the information carried by the radio signal in the first frequency sub band, and receiving, after a frequency hop and during a second time period $T_2$ a second portion of the information carried by the radio signal in the second frequency sub band, performing a channel estimation of the first frequency sub band in order to determine a first channel estimation result and performing a channel estimation of the second frequency sub band in order to determine a second channel estimation result, estimating a relative phase error $\Delta\Phi_{Pa,Pb}$ based on the first channel estimation result and the second channel estimation result, and determining an overall phase basis of the radio signal under compensation of the relative phase error $\Delta\Phi_{Pa,Pb}$, wherein the overall frequency band $f_{overall}$ of the radio signal comprises a frequency band gap that is located between the first frequency sub band and the second frequency sub band, wherein the method comprises extrapolating the channel transfer function of the first channel estimation result within the frequency band gap and extrapolating the channel transfer function of the second channel estimation result within the frequency band gap, and determining the overall phase basis of the radio signal based on the extrapolated channel transfer functions within the frequency band gap.

36. A non-transitory digital storage medium having a computer program stored thereon to perform the method of claim 35 when said computer program is run by a computer.

37. A method comprising receiving, by means of a frequency hopping method, predetermined radio signals carrying information, the predetermined radio signals comprising an overall frequency band $f_{overall}$ comprising a first frequency sub band and a second frequency sub band, receiving at least a spectral portion of a first predetermined radio signal during a first time period $T_1$, and receiving at least a spectral portion of a second predetermined radio signal after a frequency hop and during a second time period $T_2$, wherein the bandwidth of the first predetermined radio signal is larger than the bandwidth of the first frequency sub band and comprises the first frequency sub band, and wherein the bandwidth of the second predetermined radio signal is larger than the bandwidth of the second frequency sub band and comprises the second frequency sub band, wherein the method further comprises performing a first channel estimation in order to determine a first channel estimation result and performing a second channel estimation in order to determine a second channel estimation result, estimating a relative phase error $\Delta\Phi_{Pa,Pb}$ based on the first channel estimation result and the second channel estimation result, and determining an overall phase basis of the first and second predetermined radio signals under compensation of the relative phase error $\Delta\Phi_{Pa,Pb}$,

AND a) wherein the first channel estimation is performed in a frequency band spectrally covering the first frequency sub band and at least a spectral portion of the first predetermined radio signal located outside the first frequency sub band, and wherein the second channel estimation is performed in a frequency band spectrally covering the second frequency sub band and at least a spectral portion of the second predetermined radio signal located inside the second frequency sub band, wherein said spectral portion of the first predetermined radio signal located outside the first frequency sub band spectrally overlaps with said spectral portion of the second predetermined radio signal located inside the second frequency sub band, and using the spectrally overlapping spectral portions for determining the overall phase basis,

OR b) wherein the first channel estimation is performed in a frequency band spectrally covering the first frequency sub band and at least a spectral portion of the first predetermined radio signal located inside the first frequency sub band, and wherein the second channel estimation is performed in a frequency band spectrally covering the second frequency sub band and at least a spectral portion of the second predetermined radio signal located outside the second frequency sub band, wherein said spectral portion of the first predetermined radio signal located inside the first frequency sub band spectrally overlaps with said spectral portion of the second predetermined radio signal located outside the second frequency sub band, and using the spectrally overlapping spectral portions for determining the overall phase basis,

OR c) wherein the first channel estimation is performed in a frequency band spectrally covering the first frequency sub band and a spectral portion of the first predetermined radio signal located inside the first frequency sub band and a spectral portion of the first predetermined radio signal located outside the first frequency sub band, and wherein the second channel estimation is performed in a frequency band spectrally covering the second frequency sub band and a spectral portion of the second predetermined radio signal located outside the second frequency sub band and a spectral portion of the second predetermined radio signal located inside the second frequency sub band, wherein said spectral portion of the first predetermined radio signal located inside the first frequency sub band spectrally overlaps with said spectral portion of the second predetermined radio signal located outside the second frequency sub band, and wherein said spectral portion of the first predetermined radio signal located outside the first frequency sub band spectrally overlaps with said spectral portion of the second predetermined radio signal located inside the second frequency sub band, and using the spectrally overlapping spectral portions for determining the overall phase basis.

38. A non-transitory digital storage medium having a computer program stored thereon to perform the method of claim 37 when said computer program is run by a computer.

39. A method comprising
receiving, by means of a frequency hopping method, a predetermined radio signal carrying information, the predetermined radio signal comprising an overall frequency band $f_{overall}$ comprising a first frequency sub band and a second frequency sub band,
receiving during a second time period $T_2$ at least a spectral portion of the predetermined radio signal being spectrally located inside the second frequency sub band, and receiving during a first time period $T_1$ a spectral portion of the predetermined radio signal, wherein the spectral portion received during the first time period $T_1$ spectrally overlaps with the spectral portion received during the second time period $T_2$,
performing a first channel estimation within a frequency band spectrally covering the first frequency sub band and the spectral portion of the predetermined radio signal received during the first time period $T_1$,
performing a second channel estimation within a frequency band spectrally covering the second frequency sub band and the spectral portion of the predetermined radio signal received during the second time period $T_2$,
estimating a relative phase error $\Delta\Phi_{Pa,Pb}$ based on a channel estimation result of the first channel estimation and on a channel estimation result of the second channel estimation, and
using the spectrally overlapping spectral portions for determining an overall phase basis of the predetermined radio signal under compensation of the relative phase error $\Delta\Phi_{Pa,Pb}$.

40. A non-transitory digital storage medium having a computer program stored thereon to perform the method of claim 39 when said computer program is run by a computer.

41. A method comprising
receiving predetermined radio signals carrying information, the predetermined radio signals comprising an overall frequency band $f_{overall}$ comprising a first frequency sub band and a second frequency sub band,
receiving during a first time period $T_1$ at least a spectral portion of a first predetermined radio signal, which spectral portion is located outside the first frequency sub band,
receiving during a second time period $T_2$ a second predetermined radio signal, the second predetermined radio signal being located at least partially inside the second frequency sub band and comprising at least a spectral portion spectrally overlapping with the spectral portion of the first predetermined radio signal,
performing a first channel estimation within a frequency band spectrally covering the first frequency sub band and the spectral portion of the first predetermined radio signal outside the first frequency sub band,
performing a second channel estimation within a frequency band spectrally covering the second frequency sub band and the spectral portion of the second predetermined radio signal spectrally overlapping with the spectral portion of the first predetermined radio signal,
estimating a relative phase error $\Delta\Phi_{Pa,Pb}$ based on a channel estimation result of the first channel estimation and on a channel estimation result of the second channel estimation, and
use the spectrally overlapping spectral portions for determining an overall phase basis of the predetermined radio signal under compensation of the relative phase error $\Delta\Phi_{Pa,Pb}$.

42. A non-transitory digital storage medium having a computer program stored thereon to perform the method of claim 41 when said computer program is run by a computer.

43. A method comprising
receiving during a first time period $T_1$ a first frequency sub band and a spectral portion of a second frequency sub band, and receiving during a second time period $T_2$ a second frequency sub band and a spectral portion of the first frequency sub band,
performing a first channel estimation in a frequency band spectrally covering the first frequency sub band and the spectral portion of the second frequency sub band both received during the first time period $T_1$,
performing a second channel estimation in a frequency band spectrally covering the second frequency sub band and the spectral portion of the first frequency sub band both received during the second time period $T_2$,
wherein the spectral portion of the first frequency sub band received during the second time period $T_2$ spectrally overlaps with a frequency-corresponding spectral portion of the first frequency sub band received during the first time period $T_1$ and/or wherein the spectral portion of the second frequency sub band received during the first time period $T_1$ spectrally overlaps with a frequency-corresponding spectral portion of the second frequency sub band received during the second time period $T_2$,
estimating a relative phase error $\Delta\Phi_{Pa,Pb}$ based on a channel estimation result of the first channel estimation and on a channel estimation result of the second channel estimation, and
using said spectral overlapping portions of the first and second frequency sub bands for determining an overall phase basis of the predetermined radio signal under compensation of the relative phase error $\Delta\Phi_{Pa,Pb}$.

44. A non-transitory digital storage medium having a computer program stored thereon to perform the method of claim 43 when said computer program is run by a computer.

\* \* \* \* \*